(12) United States Patent
Tsuchiya et al.

(10) Patent No.: US 12,540,944 B2
(45) Date of Patent: Feb. 3, 2026

(54) RECOMBINANT AMEBOCYTE CLOTTING FACTORS AND USES THEREOF

(71) Applicant: Charles River Laboratories, Inc., Wilmington, MA (US)

(72) Inventors: Masakazu Tsuchiya, Mount Pleasant, SC (US); Norman R. Wainwright, Skaneateles, NY (US)

(73) Assignee: Charles River Laboratories, Inc., Wilmington, MA (US)

(*) Notice: Subject to any disclaimer, the term of this patent is extended or adjusted under 35 U.S.C. 154(b) by 0 days.

(21) Appl. No.: 18/953,525

(22) Filed: Nov. 20, 2024

(65) Prior Publication Data

US 2025/0085289 A1 Mar. 13, 2025

Related U.S. Application Data

(63) Continuation of application No. PCT/US2024/032663, filed on Jun. 5, 2024.

(60) Provisional application No. 63/506,271, filed on Jun. 5, 2023.

(51) Int. Cl.
G01N 33/579 (2006.01)
B01L 3/00 (2006.01)
C12Q 1/34 (2006.01)
G01N 33/92 (2006.01)

(52) U.S. Cl.
CPC ...... G01N 33/579 (2013.01); B01L 3/502715 (2013.01); C12Q 1/34 (2013.01); G01N 33/92 (2013.01); B01L 2200/16 (2013.01); B01L 2300/0654 (2013.01); G01N 2333/195 (2013.01); G01N 2333/942 (2013.01); G01N 2400/50 (2013.01)

(58) Field of Classification Search
None
See application file for complete search history.

(56) References Cited

U.S. PATENT DOCUMENTS

| | | |
|---|---|---|
| 4,322,217 A | 3/1982 | Dikeman |
| 5,155,032 A | 10/1992 | Tanaka et al. |
| 5,179,006 A | 1/1993 | Matuura et al. |
| 5,310,657 A | 5/1994 | Berzofsky |
| 5,318,893 A | 6/1994 | Matuura et al. |
| 5,474,984 A | 12/1995 | Tanaka et al. |
| 5,605,806 A | 2/1997 | Tanaka et al. |
| 5,641,643 A | 6/1997 | Tanaka et al. |
| 5,712,144 A | 1/1998 | Ding et al. |
| D390,661 S | 2/1998 | Foggia |
| 5,716,834 A | 2/1998 | Ding et al. |
| 5,858,706 A | 1/1999 | Ding et al. |
| 5,985,590 A | 11/1999 | Ding et al. |
| 6,077,946 A | 6/2000 | Iwanaga et al. |
| 6,270,982 B1 | 8/2001 | Jordan et al. |
| 6,391,570 B1 | 5/2002 | Jordan et al. |
| D472,324 S | 3/2003 | Rumore et al. |
| 6,645,724 B1 | 11/2003 | Ding et al. |
| 7,329,538 B2 | 2/2008 | Wainwright et al. |
| 7,479,375 B2 | 1/2009 | Wainwright et al. |
| 7,673,704 B2 | 3/2010 | Phan et al. |
| 7,901,899 B1 | 3/2011 | Wainwright et al. |
| 7,939,291 B2 | 5/2011 | Wainwright et al. |
| 7,968,280 B2 | 6/2011 | Wainwright et al. |
| 8,440,394 B2 | 5/2013 | Wainwright et al. |
| 10,119,969 B2 | 11/2018 | Wainwright et al. |
| 10,473,663 B2 | 11/2019 | Tsuchiya |
| 10,473,664 B2 | 11/2019 | Tsuchiya |
| 11,221,335 B2 | 1/2022 | Tsuchiya |
| 11,236,318 B2 | 2/2022 | Mizumura et al. |
| 11,499,177 B2 | 11/2022 | Kobayashi et al. |
| 12,158,471 B2 | 12/2024 | Wainwright et al. |
| 2009/0286692 A1 | 11/2009 | Wainwright et al. |
| 2018/0264463 A1* | 9/2018 | Biesbrouck .......... G01N 33/491 |
| 2019/0241629 A1 | 8/2019 | Mizumura et al. |
| 2019/0270977 A1 | 9/2019 | Mizumura et al. |
| 2021/0215695 A1 | 7/2021 | Ogura et al. |
| 2021/0363564 A1 | 11/2021 | Kobayashi et al. |
| 2024/0125789 A1 | 4/2024 | Wainwright et al. |

FOREIGN PATENT DOCUMENTS

| | | | |
|---|---|---|---|
| EP | 2930241 A1 | 10/2015 | |
| EP | 3591049 A1 | 1/2020 | |
| EP | 3441466 B1 | 2/2020 | |
| JP | 2019004705 A | 1/2019 | |
| WO | 2566804 * | 5/2005 | ............... A61B 5/08 |
| WO | WO 2012118226 * | 9/2012 | ........... G01N 33/379 |
| WO | WO-2018/074498 A1 | 4/2018 | |
| WO | WO 2018074498 * | 4/2018 | ........... C07K 14/435 |
| WO | WO-2018/159771 A1 | 9/2018 | |

(Continued)

OTHER PUBLICATIONS

Andersen, Dana C, and Lynne Krummen. "Recombinant protein expression for therapeutic applications." Current opinion in biotechnology vol. 13,2 (2002): 117-23.
Breitbach, K. and Jarvis, D. L., "Improved glycosylation of a foreign protein by Tn-5B1-4 cells engineered to express mammalian glycosyltransferases," Biotechnol Bioeng. Aug. 5, 2001;74(3):230-9.
Carlesso, E. et al., "The rule regulating pH changes during crystalloid infusion", Intensive Care Med., 2011, 37(3): 461-468.
Chen, S., et al., "Production of Recombinant Proteins in Mammalian Cells", Current Protocols in Protein Science, 1998, 5.10.1-5.10.41.

(Continued)

Primary Examiner — Ann Montgomery
(74) Attorney, Agent, or Firm — Goodwin Procter LLP

(57) ABSTRACT

Provided are recombinant amebocyte clotting factors, their formulation and use in determining the presence and/or amount of a microbial endotoxin in a sample. Also provided is a cartridge containing the recombinant amebocyte clotting factors for determining the presence and/or amount of a microbial endotoxin in a sample.

24 Claims, 22 Drawing Sheets
Specification includes a Sequence Listing.

(56) References Cited

FOREIGN PATENT DOCUMENTS

| WO | WO-2020/071229 A1 | | 4/2020 | |
|---|---|---|---|---|
| WO | 3145414 | * | 2/2021 | ............... B01L 3/00 |
| WO | WO-2022/174082 A1 | | 8/2022 | |

OTHER PUBLICATIONS

Choo, K.H., et al., "A comprehensive assessment of N-terminal signal peptides prediction methods", BMC Bioinformatics, 2009, 10(Suppl 15):S2.
Croset et al. "Differences in the glycosylation of recombinant proteins expressed in HEK and CHO cells." Journal of biotechnology vol. 161,3 (2012): 336-48.
Demain and Vaishnav, "Production of recombinant proteins by microbes and higher organisms." Biotechnology advances vol. 27,3 (2009): 297-306.
Ding, J.L. and Navas, M.A.A, "Molecular cloning and sequence analysis of Factor C cDNA from the Singapore horseshoe crab, *Corcinoscorpius rotundicauda*", Malec. And Marine Biol. Biotechnol., 1995, 4(1), 90-103.
Ding, Jeak L. and Ho, Bow, "A new era in pyrogen testing", Trends in Biotech., 2001, 19(8): 277-281.
Dubczak et al, "Evaluation of limulus amebocyte lysate and recombinant endotoxin alternative assays for an assessment of endotoxin detection specificity." European journal of pharmaceutical sciences : official journal of the European Federation for Pharmaceutical Sciences vol. 159 (2021): 105716. doi:10.1016/j.ejps.2021. 105716.
Dwarakanath et al., "Recombinant COS-1 Cells express Carcinoscorpius rotundicauda Factor C," Biotechnology Letters, 19(4): 357-361, 1997.
Dwarakanath et al., "The Cys-rich and EGF-like domains of Carcinoscorpius rotundicauda Factor C yields soluble fusion with GFP," Biotechnology Letters, 19(1): 1147-1150, 1997.
Gerngross, Tillman U. "Advances in the production of human therapeutic proteins in yeasts and filamentous fungi." Nature biotechnology vol. 22,11 (2004): 1409-14.
Grallert et al. "EndoLISA®: A novel and reliable method for endotoxin detection" Nature Methods, 8:884, 2011.
Gray, David, "Overview of Protein Expression by Mammalian Cells", Current Protocols in Protein Science, 1997, 5.9.1-5.9.18.
Harada-Suzuki, T. et al., "Further Studies on the Chromogenic Substrate Assay Method for Bacterial Endotoxins Using Horseshoe Crab (*Tachypleus tridentatus*) Hemocyte Lysate", J. Biochem., 1982, 92(3): 793-800.
Hashiguchi et al., "Expression of Recombinant Protein Using Cultured Human Cells—Standard Protocol by 293-type cells"—, PSSJ Archives, 1, e017 (2008); with English Translation.
Hollister, J. R. and Jarvis, D. L., "Engineering lepidopteran insect cells for sialoglycoprotein production by genetic transformation with mammalian beta 1,4-galactosyltransferase and alpha 2,6-sialyltransferase genes," Glycobiology. Jan. 2001;11(1):1-9.
Hooker, A. D. et al, "Constraints on the transport and glycosylation of recombinant IFN-gamma in Chinese hamster ovary and insect cells," Biotechnol Bioeng. Jun. 5, 1999;63(5):559-572.
Hossler, Patrick et al. "Optimal and consistent protein glycosylation in mammalian cell culture." Glycobiology vol. 19,9 (2009): 936-49.
Inamori et al., "A horseshoe crab receptor structurally related to *Drosophila* Toll," J. Endotoxin Res. , 6(5):397-399, 2000.
International Search Report for International Application No. PCT/US2024/032663 mailed Jul. 22, 2024 (6 pages).
Iwanaga et al., "Biochemical principle of Limulus test for detecting bacterial endotoxins," Proc. Jpn. Acd., Ser. B., 83:110-119, 2007.
Kawabata et al., "The lipopolysaccharide-activated innate immune response network of the horseshoe crab," Invertebrate Survival Journal, 6:59-77, 2009.
Kingston et al., "Amplification Using CHO Cell Expression Vectors," Unit 16.23 in Current Protocols in Molecular Biology, John Wiley and Sons (1993), pp. 16.23.1-16.23.13.

Kobayashi et al., "Factor B Is the Second Lipopolysaccharide-binding Protease Zymogen in the Horseshoe Crab Coagulation Cascade." The Journal of biological chemistry vol. 290,31 (2015): 19379-86.
Kobayashi et al., "The N-terminal Arg residue is essential for autocatalytic activation of a lipopolysaccharide-responsive protease zymogen." The Journal of biological chemistry vol. 289,37 (2014): 25987-95.
Koshiba et al. "A structural perspective on the interaction between lipopolysaccharide and factor C, a receptor involved in recognition of Gram-negative bacteria." The Journal of biological chemistry vol. 282,6 (2007): 3962-7.
Levin et al. (1968), "Clottable Protein in Limulus: Its Localization and Kinetics of Its Coagulation by Endotoxin," Thromb. Diath. Haemorrh. 19: 186.
Lis et al. (1993), "Protein Glycosylation: Structural and functional aspects," Eur. J. Biochem. 218:1-27.
Loverock et al., "A Recombinant Factor C Procedure for the Detection of Gram-negative Bacterial Endotoxin," Pharmacopeial Forum, 35(6):1613-1621.
Mizumura, Hikaru et al. "Genetic engineering approach to develop next-generation reagents for endotoxin quantification." Innate immunity vol. 23,2 (2017): 136-146.
Muroi et al., "Application of a Recombinant Three-Factor Chromogenic Reagent, PyroSmart, for Bacterial Endotoxins Test Filed in the Pharmacopeias," Biol. Pharm. Bull, 42, 2024-2037, 2019.
Muta et al., "Limulus Factor C," J. Biol. Chem., 266(10): 6554-6561, 1991.
Nakamura et al. "Intracellular proclotting enzyme in limulus (Tachypleus tridentatus) hemocytes: its purification and properties." Journal of biochemistry vol. 97,6 (1985): 1561-74.
Nakamura et al. "Purification and properties of intracellular clotting factor, factor B, from horseshoe crab (*Tachypleus tridentatus*) hemocytes." Journal of biochemistry vol. 99,3 (1986): 847-57.
Nakamura et al. "Lipopolysaccharide-sensitive serine-protease zymogen (factor C) found in Limulus hemocytes. Isolation and characterization." European journal of biochemistry vol. 154,3 (1986): 511-521.
Navas et al., "Inactivation of Factor C by Dimethyl Sulfoxide Inhibits Coagulation of the Carcinscorpius Amoebocyte Lysate," Biochemistry International, 21 (5): 805-813; 1990.
Nettleship, Joanne E., "Structural Biology of Glycoproteins", Glycosylation, 2012, p. 41-62. Available from: https://www.intechopen.com/books/glycosylation/structural-biologyof- glycoproteins.
Nielson, H., et al., "Identification of prorkaryotic and eukaryotic signal peptides and prediction of their cleavage sites", Protein EnQineerinQ, 1997, 10(1 ): 1-6.
Parodi, A J. "Protein glucosylation and its role in protein folding." Annual review of biochemistry vol. 69 (2000): 69-93.Viswanathan et al. (2005) Biochem. 44:7526-7534.
Prior, 1990 "Clinical Applications of the Limulus Amebocyte Lysate Test" CRC Press 28-36 and 159-166.
Rietschel et al., "Bacterial endotoxin: Molecular relationship of structure to activity and function," FASEB J., 8:217-225, 1994.
Thomas, Philip, and Trevor G Smart. "HEK293 cell line: a vehicle for the expression of recombinant proteins." Journal of pharmacological and toxicological methods vol. 51,3 (2005):187-200.
Tokunaga et al., "Further Studies on Lipopolysaccharide-Sensitive Serine Protease Zymogen (Factor C): Its Isolation from Limulus polyphemus Hemocytes and Identification as an Intracellular Zymogen Activated by a-Chymotrypsin, Not by Trypsin," J. Biochem., 109:150-157, 1991.
Tomiya et al. "Comparing N-glycan processing in mammalian cell lines to native and engineered lepidopteran insect cell lines." Glycoconjugate journal vol. 21,6 (2004): 343-60.
Tomiya et al. "Humanization of lepidopteran insect-cell-produced glycoproteins." Accounts of chemical research vol. 36,8 (2003): 613-20.
Viswanathan, et al., "Engineering intracellular CMP-sialic acid metabolism into insect cells and methods to enhance its generation," Biochemistry, May 24, 2005;44(20):7526-34.

(56) References Cited

OTHER PUBLICATIONS

Wang et al., "Functional expression of full length Limulus Factor C in stably transformed Sf9 cells," Biotechnology Letters, 23:71-76, 2001.
Wang et al., "Modular arrangement and secretion of a multidomain Serine Protease," J. Biol. Chem., 277(39):36363-36372, 2002.
Written Opinion for International Application No. PCT/US2024/032663 mailed Jul. 22, 2024 (4 pages).
Piehler et al., "Comparison of LAL and rFC Assays—Participation in a Proficiency Test Program between 2014 and 2019," Microorganisms, Mar. 16, 2020;8(3):418.

\* cited by examiner

FIG. 4A
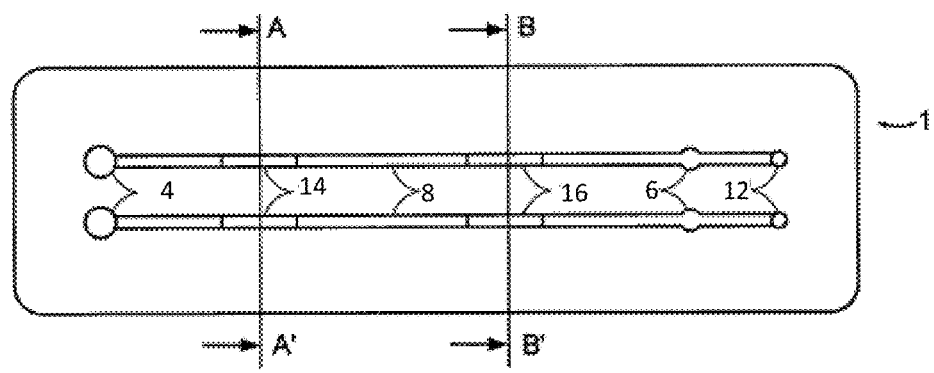
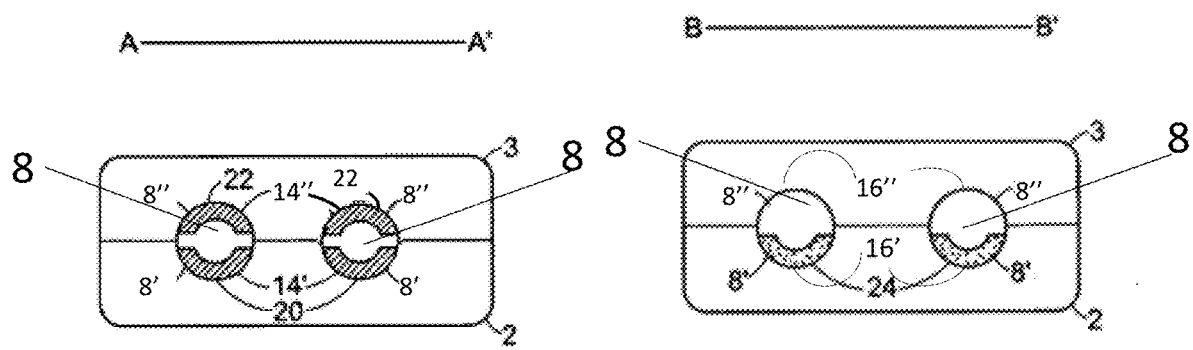
FIG. 4B

RECOMBINANT AMEBOCYTE CLOTTING FACTORS AND USES THEREOF

CROSS-REFERENCE TO RELATED APPLICATIONS

This application is a continuation of International Patent Application No. PCT/US2024/032663 filed Jun. 5, 2024, and designating the United States, which claims priority to and the benefit of U.S. Provisional Patent Application No. 63/506,271 filed Jun. 5, 2023, the contents of each of which are incorporated by reference herein in their entireties.

REFERENCE TO A SEQUENCE LISTING XML

This application contains a Sequence Listing which has been submitted electronically in XML format. The Sequence Listing XML is incorporated herein by reference. Said XML file, created on Jul. 12, 2024, is named CHR-051WO-_SL.xml and is 21,656 bytes in size.

FIELD

The present invention relates generally to methods and compositions for determining the presence and/or amount of microbial endotoxin in a sample. More particularly, the invention relates to recombinant amebocyte clotting factors, and their formulation and use in determining the presence and/or amount of a microbial endotoxin in a sample.

BACKGROUND

Microbial contamination by, for example, Gram negative bacteria, may cause severe illness and, in some cases, even death in humans. Manufacturers in certain industries, for example, the pharmaceutical, medical device, and food industries, must meet exacting standards to verify that their products do not contain levels of microbial contaminants that would otherwise compromise the health of the recipient. These industries require frequent, accurate, and sensitive testing for the presence of such microbial contaminants to meet certain standards, for example, standards imposed by the United States Food and Drug Administration (USFDA) or Environmental Protection Agency. By way of example, the USFDA requires certain manufacturers of pharmaceuticals and invasive medical devices to establish that their products are free of detectable levels of Gram negative bacterial endotoxin.

Endotoxins can be dangerous and even deadly to humans and animals. Symptoms of infection with bacterial endotoxins may range from fever, in mild cases, to sepsis, and even death. Humans or animals can be exposed to bacterial endotoxin by infection with Gram negative bacteria, whereby endotoxins are released from the cell wall of the bacteria upon death, mechanical damage, or during growth/division. Humans and animals may also be exposed to endotoxin through the environment, as gram negative bacteria, and therefore, environmental endotoxins, are ubiquitous.

To date, a variety of assays have been developed for determining the presence and/or amount of microbial endotoxin in a sample of interest. One family of assays uses hemocyte lysates prepared from the hemolymph of crustaceans, e.g., horseshoe crabs. These assays typically exploit, in one way or another, a clotting cascade that occurs when the hemocyte lysate is exposed to an endotoxin. A currently preferred hemocyte lysate is amebocyte lysate (AL) produced from the hemolymph of a horseshoe crab, e.g., *Limulus polyphemus, Tachypleus tridentatus, Tachypleus gigas*, and *Carcinoscorpius rotundicauda*.

These assays typically use blood harvested from horseshoe crabs, leading to concerns over the ecological sustainability of this practice. However, to date, fully synthetic or recombinant amebocyte lysate reagents have not performed comparably to a native amebocyte lysate (Dubczak et al., (2021) Eur. J. Pharm. Sci. 159:105716). Accordingly, there exists a need for new reagents and testing methods that do not rely on blood harvested from horseshoe crabs population while adequately detecting endotoxin at the same level of sensitivity and accuracy as naturally derived amebocyte lysates.

SUMMARY

The invention is based, in part, upon the discovery that, under certain conditions, isolated Factor C (FC), e.g., recombinant Factor C (rFC), and isolated Factor B (FB), e.g., recombinant Factor B (rFB), when mixed together can be unstable, even in the absence of exogenously added endotoxin. Based on this discovery, it is possible to create stable FC and FB containing compositions, e.g., stable rFC and rFB containing compositions, for use in endotoxin detection. This is achieved by maintaining the isolated FB and FC components separately from one another, e.g., prior to use in an endotoxin assay or prior to drying in one or more suitable vessels, e.g., an endotoxin detection/quantification cartridge or one or more vials.

In one aspect, the disclosure provides a cartridge for bacterial endotoxin testing of a test sample. An exemplary cartridge comprises (a) a housing defining a test sample inlet area (also referred to herein as a test sample inlet port); (b) a first composition comprising a first recombinant factor disposed on a first region of the cartridge; and (c) a second composition comprising a second recombinant factor disposed on a second region of the cartridge. The second region is spaced apart from the first region. Within the cartridge, the first region is in fluid flow communication with the test sample inlet area, and the first and second regions are in fluid communication with one another to permit mixing of the first and second compositions in the presence of a test sample deposited on the test sample inlet area. Furthermore, the first composition comprises recombinant Factor B or recombinant Factor C, and the second composition comprises recombinant Factor B or recombinant Factor C, but the first composition and second composition do not both contain recombinant Factor B or recombinant Factor C. The cartridge may further include an optical cell in fluid flow communication with the test sample inlet area, first region, and/or second region.

In another aspect, the disclosure provides a cartridge for bacterial endotoxin testing. The cartridge comprises (a) a housing defining a fluid inlet port, an optical cell, and a conduit having a fluid contacting surface providing fluid flow communication between the fluid inlet port and the optical cell; (b) a first composition disposed on a first region of the fluid contacting surface of the conduit; and (c) a second composition disposed on a second region of the fluid contacting surface the conduit. The first region is spaced apart from the second region, such that, when the sample is applied to the fluid inlet port, the sample traverses the first region and the second region and solubilizes the first and second compositions, during transport to the optical cell. The first and second compositions are selected from the group consisting of recombinant Factor B and recombinant Factor C, provided that the first composition is not the same as the second composition.

In these exemplary cartridges, the Factor C and/or Factor B can remain substantially inactive until contacted with microbial endotoxin in a liquid sample introduced into the cartridge via the fluid inlet port or test sample inlet area.

In one cartridge configuration, the first composition on the first region comprises recombinant Factor C but not recombinant Factor B, and the second composition on the second region comprises recombinant Factor B and not recombinant Factor C. In another cartridge configuration, the first composition on the first region comprises recombinant Factor B but not recombinant Factor C, and the second composition on the second region comprises recombinant Factor C but not recombinant Factor B.

In yet another cartridge configuration, the first composition further comprises recombinant pro-clotting enzyme. Alternatively or in addition, the second composition further comprises recombinant pro-clotting enzyme. In another configuration, a third composition comprising recombinant pro-clotting enzyme is disposed on a third region of the cartridge or the fluid contacting surface of the conduit spaced apart from the first and second regions, where the third region is in fluid communication with the first and/or second regions. The third composition may further comprise a chromogenic substrate. However, in some configurations, the third composition comprising a recombinant pro-clotting enzyme does not include a chromogenic substrate. In another configuration, a third composition comprising a chromogenic substrate is disposed on a third region of the cartridge or the fluid contacting surface of the conduit spaced apart from the first and second regions and the third region is in fluid flow communication with the first and/or second regions. The third composition comprising a chromogenic substrate, in some configurations, does not include a recombinant pro-clotting enzyme.

In other configurations, a fourth composition comprising a chromogenic substrate is disposed on a fourth region of the cartridge or the fluid contacting surface of the conduit where the fourth region is spaced apart from the first, second, and third regions, and is in fluid flow communication with the first, second, and/or third regions.

In other configurations, a fourth composition comprising a recombinant pro-clotting enzyme is disposed on a fourth region of the cartridge or the fluid contacting surface of the conduit where the fourth region is spaced apart from the first, second, and third regions, and is in fluid flow communication with the first, second, and/or third regions.

In certain configurations, the third region of the cartridge or fluid contacting surface of the conduit is positioned between the sample inlet area or fluid inlet port and the first region, and the second region is positioned on the cartridge or fluid contacting surface of the conduit between the first region and the optical cell. For example, in such a configuration, the third composition on the third region includes a chromogenic substrate, the first composition on the first region includes recombinant Factor B (but not recombinant Factor C), and the second composition on the second region includes recombinant Factor C (but not recombinant Factor B) and recombinant pro-clotting enzyme. In another exemplary configuration, the third composition on the third region includes a chromogenic substrate, the first composition on the first region includes recombinant Factor C (but not recombinant Factor B) and recombinant pro-clotting enzyme, and the second composition on the second region includes recombinant Factor B (but not recombinant Factor C). For example, in some configurations when the third composition on the third region includes a chromogenic substrate, it does not include any recombinant factors, and recombinant pro-clotting enzyme is included in only one region, e.g., with recombinant Factor B or recombinant Factor C in the first composition of the first region or the second composition on the second region.

In another aspect, disclosed is a cartridge for detecting bacterial endotoxin in a test sample. The cartridge comprises (a) a housing defining a fluid inlet port, an optical cell, and a conduit having a fluid contacting surface providing fluid flow communication between the fluid inlet port and the optical cell; (b) a chromogenic substrate disposed on a first region of the fluid contacting surface of the conduit; (c) a first recombinant amebocyte factor disposed on a second region of the fluid contacting surface of the conduit, and (d) a second recombinant amebocyte factor disposed on a third region of the fluid contacting surface. The second region is spaced apart from and downstream of the first region in the direction of fluid flow along the conduit, and the third region is spaced apart from and downstream of the second region and the first region in the direction of fluid flow along the conduit. The first recombinant amebocyte factor comprises recombinant Factor B, and the second recombinant amebocyte factor comprises recombinant Factor C, and recombinant pro-clotting enzyme is disposed on the third region with the recombinant Factor C; or (ii) the first recombinant amebocyte factor comprises recombinant Factor C and the second recombinant amebocyte factor comprises recombinant Factor B, and recombinant pro-clotting enzyme is disposed on the second region with the recombinant Factor C. For example, in some configurations, the first recombinant amebocyte factor comprises recombinant Factor B, and the second recombinant amebocyte factor comprises recombinant Factor C, and recombinant pro-clotting enzyme is disposed on the third region with the recombinant Factor C. In another configuration, the first recombinant amebocyte factor comprises recombinant Factor C, and the second recombinant amebocyte factor comprises recombinant Factor B, and recombinant pro-clotting enzyme is disposed on the second region with the recombinant Factor C. In some configurations, recombinant Factor C and recombinant Factor B are not present in the same region on the cartridge.

In some cartridge configurations, the substrate may comprise a -Gly-Arg-chromophore containing moiety or a -Gly-Lys-chromophore containing moiety. For example, the substrate may be Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

In some cartridge configurations, the compositions (e.g., the first, second and where appropriate the third and fourth compositions) are dried compositions, e.g., dried onto a fluid contacting surface of the conduit of the cartridge.

In another aspect, disclosed cartridges can be used in a method of determining the absence, presence or amount of bacterial endotoxin in a test sample. The method comprises applying a test sample to the test sample inlet area of the cartridge, permitting the test sample to contact the first and second compositions in the presence of a chromogenic substrate; and determining the absence, presence and/or amount of bacterial endotoxin in the test sample based on a chemically detectable change in the chromogenic substrate. During the method, recombinant pro-clotting enzyme may be provided in the first composition, the second composition, or in a different composition. The substrate may comprise a -Gly-Arg-chromophore containing moiety or a -Gly-Lys-chromophore containing moiety. For example, the chromogenic substrate is Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

In one aspect, the disclosure provides a method of producing a bacterial endotoxin testing composition. The method comprises (a) providing a first composition comprising recombinant Factor C that is free of Factor B; (b) providing a second composition comprising recombinant Factor B that is free of Factor C; and (c) mixing the first composition with the second composition in the presence of recombinant pro-clotting enzyme to form a third composition. During the method, the first and second compositions (i) remain separated until mixed together immediately prior to contact with a test sample or (ii) remain separated until mixed with a test sample. In one example, the first and second compositions remain separated until mixed together immediately, e.g., within about 30 minutes or less, prior to contact with a test sample. In another example, the first and second compositions remain separated until mixed with a test sample.

In some embodiments, a chromogenic substrate may be mixed with the third composition immediately prior to contact with the test sample, or a chromogenic substrate may be mixed with the first and second compositions simultaneous with, or after, mixing with the test sample. In some embodiments, the method includes providing a composition comprising a chromogenic substrate which remains separated from the first and second compositions until mixed with the first and second compositions to form the third composition in step (c). In further embodiments, the first composition additionally includes a chromogenic substrate, or the second composition additionally includes a chromogenic substrate. The substrate may comprise a -Gly-Arg-chromophore containing moiety or a -Gly-Lys-chromophore containing moiety. For example, the substrate may be Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

The first and second compositions provided in steps (a) and (b) may be provided as dried compositions. For example, the first and second compositions may be resolubilized prior to mixing in step (c), e.g., with a buffer, or by a liquid test sample. Depending upon the circumstances, the first and second compositions are dried in a test cartridge described herein, wherein the first and second compositions become mixed when a liquid test sample is applied to the cartridge. Alternatively, the first and second compositions provided in steps (a) and (b) may be provided as buffered solutions.

In some embodiments, the first composition further comprises a recombinant pro-clotting enzyme prior to mixing step (c). In other embodiments, the second composition further comprises a recombinant pro-clotting enzyme prior to mixing step (c). Optionally, a fourth composition may be provided that comprises recombinant pro-clotting enzyme. In one embodiment, the first and second compositions are mixed together with the fourth composition immediately, e.g., within about 30 minutes or less, prior to contact with the test sample, while in another embodiment, the first, second, and fourth compositions are mixed together upon contact with the test sample.

The fourth composition may additionally include a chromogenic substrate. The substrate may comprise a -Gly-Arg-chromophore containing moiety or a -Gly-Lys-chromophore containing moiety. For example, the substrate may be Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

In some embodiments, the Factor C provided in step (a) remains substantially inactive in the absence of exogenously added endotoxin from a test sample or control. Similarly, the Factor B provided in step (b) also remains substantially inactive in the absence of exogenously added endotoxin from a test sample or control.

In another aspect, the disclosure provides a method of detecting bacterial endotoxin in a test sample. The method comprises contacting a bacterial endotoxin testing composition produced according to the methods of producing a bacterial endotoxin testing composition disclosed herein and determining the absence, presence and/or amount of bacterial endotoxin in the sample based on a chemically detectable change in the chromogenic substrate. The substrate may comprise a -Gly-Arg-chromophore containing moiety or a -Gly-Lys-chromophore containing moiety. For example, the substrate may be Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

In certain embodiments, step (c) of the method is performed on a cartridge. For example, a test sample is applied to the test sample inlet area or the fluid inlet port of a cartridge as described herein. The first and second compositions on the cartridge contact the test sample in the presence of a chromogenic substrate; and the presence, absence, and/or amount of bacterial endotoxin in the test sample is determined based on a chemically detectable change in the chromogenic substrate.

In yet another aspect, the disclosure provides a kit for determining the absence, presence and/or amount of a bacterial endotoxin in a test sample. The kit comprises a first composition comprising recombinant Factor C that is free of recombinant Factor B; a second composition comprising recombinant Factor B that is free of recombinant Factor C. The first and second compositions remain physically separated from one another. The kit further comprises a means for mixing the first and second compositions together in the presence of recombinant pro-clotting enzyme and a chromogenic substrate immediately, e.g., within about 30 minutes or less, prior to, or simultaneous with, contact with a test sample. In one example, the first composition and the second composition are dried compositions and the kit further comprises one or more buffered solutions for resolubilizing each of the first and second compositions.

In the cartridges, kits, and methods disclosed herein, the recombinant factor B and/or recombinant factor C and/or recombinant pro-clotting enzyme may be a recombinant *Limulus polyphemus* recombinant factor B and/or recombinant *Limulus polyphemus* Factor C and/or recombinant *Limulus polyphemus* pro-clotting enzyme. For example, the recombinant factor C comprises the amino acid sequence of SEQ ID NO:1; the recombinant factor B comprises the amino acid sequence of SEQ ID NO:3; and/or the recombinant pro-clotting enzyme comprises the amino acid sequence of SEQ ID NO:5. In some embodiments, the recombinant factor C lacks ($\alpha$-2,3)-linked terminal sialic acid and/or is expressed in a GnTI⁻HEK cell line.

In the cartridge, kits, and methods disclosed herein, the chromogenic substrate may comprise a -Gly-Arg-chromophore containing moiety or a -Gly-Lys-chromophore containing moiety. For example, the substrate may be Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

These and other aspects and features of the disclosure are described in more detail in the following figures, detailed description and claims.

DESCRIPTION OF THE DRAWINGS

The objects and features of the disclosure may be better understood by reference to the drawings described below.

FIGS. 4A-4E are schematic illustrations of exemplary cartridges in which FIG. 4A is a top view of an exemplary cartridge showing the locations of immobilized recombinant amebocyte factors (e.g., Factor B and Factor C) and a chromogenic substrate; FIG. 4B is a cross-sectional view of the fabricated cartridge through sections A-A' and B-B' of FIG. 4A; FIG. 4C is a top view of an exemplary cartridge showing the locations of immobilized recombinant factors and a chromogenic substrate; and FIG. 4D is a cross-sectional view of the fabricated cartridge through sections A-A', B-B', and C-C' of FIG. 4C. FIG. 4E is a top view illustration of another exemplary cartridge for use with recombinant amebocyte factors described herein.

FIG. 5A shows the onset time when all three factors (rFC, rFB, and rPCE) were combined together and the substrate was maintained separately before subsequent mixing with the recombinant factors. FIG. 5B shows the onset time at different time intervals when rFC was maintained separately from rFB, rPCE, and from the substrate before subsequent mixing with the rFB, rPCE, and substrate prior to contact with test samples.

DETAILED DESCRIPTION

Figure 1:
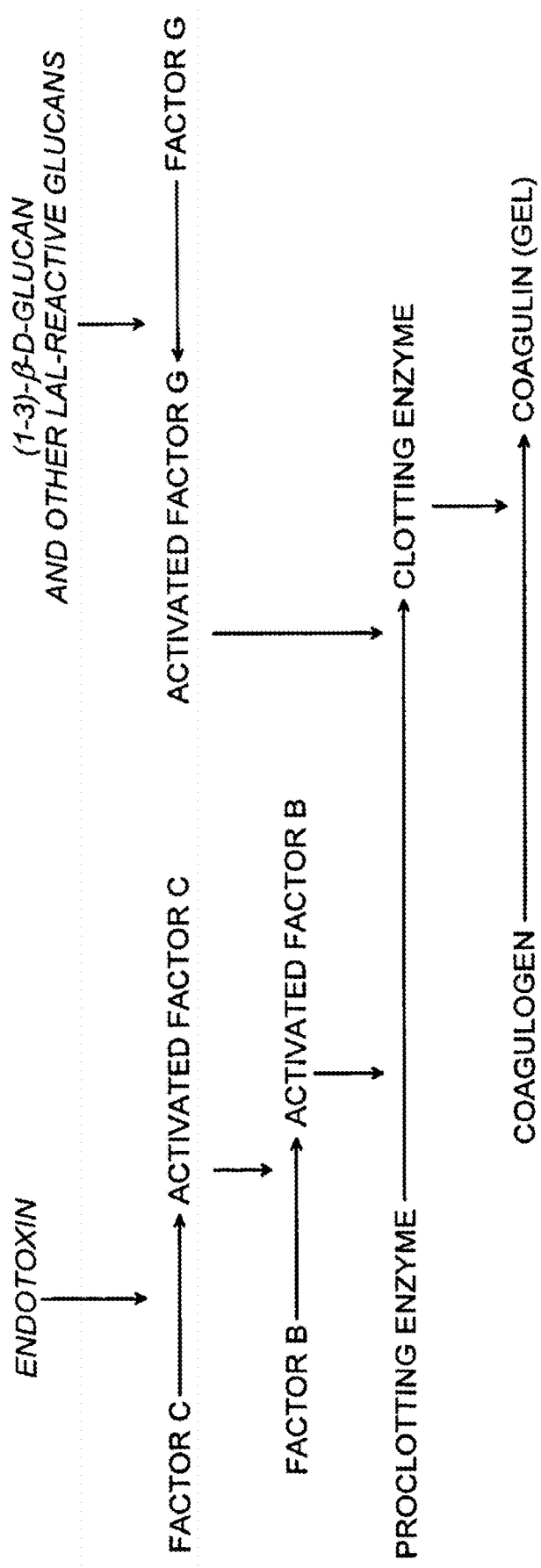
FIG. 1 is a schematic representation of the coagulation system present in amebocytes.

The invention is based, in part, upon the discovery that, under certain conditions, isolated Factor C (FC), e.g., recombinant Factor C (rFC) and isolated Factor B (FB), e.g., recombinant Factor B (rFB), when mixed together can be unstable, even in the absence of exogenously added endotoxin. Based on this discovery, it is possible to create stable FC and FB containing compositions, e.g., stable rFC and rFB containing compositions, for use in endotoxin detection. This is achieved by maintaining the isolated FB and FC components separately from one another, e.g., prior to use in an endotoxin assay or prior to drying in one or more suitable vessels, e.g. one or more vials or an endotoxin detection/quantification cartridge.

Various features and aspects of the invention are discussed in more detail below.

I. Definitions

To facilitate an understanding of the present invention, a number of terms and phrases are defined below.

As used herein, the terms "amebocyte lysate factor" and "hemocyte lysate factor," refer to one or more clotting factors, e.g., Factor B, Factor C, and/or pro-clotting enzyme, present in the lysed blood of a horseshoe crab, e.g., *Limulus* sp. or *Tachypleus* sp. and encompass native versions of the factors that can be isolated from the blood of a horseshoe crab.

As used herein, the terms "recombinant amebocyte factor" and "recombinant factor" refer to one or more clotting factors, e.g., Factor B, Factor C, and/or pro-clotting enzyme, that are recombinantly produced versions of factors present in the blood of horseshoe crabs, e.g., *Limulus* sp. or *Tachypleus* sp., including e.g., recombinant Factor B ("rFB"), recombinant Factor C ("rFC"), and recombinant pro-clotting enzyme ("rPCE" or "rPE").

As used herein, the term "activated factor" refers to an activated Factor B, activated Factor C, and clotting enzyme, and the term "activated factors" refers to a combination of one or more of activated Factor B, activated Factor C, and clotting enzyme. In this context, "activated" refers to a state where the zymogen form of the protein is converted to an active enzyme.

As used herein, the term "immediately," refers to the occurrence of an action within a specific time frame and may depend upon the context of a given method. For example, in the context of conducting an endotoxin detection assay using a cartridge disclosed herein, "immediately" may mean within 10 seconds, 30 seconds, 45 seconds, 1 minute, 3 minutes, 5 minutes, 8 minutes, or 10 minutes. The assays conducted in a cartridge typically are performed at 37° C. In the context of conducting an endotoxin detection assay using a liquid or reconstituted reagent containing recombinant Factor B and Factor C prepared as described herein, that is stored on ice or refrigerated at 2-8° C., e.g., 4° C., "immediately" may mean within about 4 hours, 3 hours, 2 hours, 1 hour, 45 minutes, 30 minutes, 15 minutes, 10 minutes, 5 minutes, or within 1 minute.

As used herein, the term "isolated" when used in conjunction with a particular article (e.g., protein or peptide) is understood to mean: (1) that the article has been separated or purified from other components (e.g., other proteins, peptides, nucleic acids, or cellular materials); (2) that the article may be separated or purified from the environment in which it may exist in nature, for example, a tissue or fluid sample; (3) that the article may be separated or purified from the environment in which it may initially exist, for example, a protein or peptide separated from a crude amebocyte lysate or a cell culture containing an expression host. As used herein, the term "isolated" can also refer to a molecule that is substantially free of other molecules of the same species. For example, a protein or peptide may be "isolated" from other proteins or peptides having different amino acid sequences. The purity or homogeneity of a desired article can be assayed using techniques well known in the art, including gel electrophoresis, high performance liquid chromatography, or mass spectrometry.

As used herein, the term "recombinant," e.g., when referring to an amebocyte clotting factor, refers to a factor which is produced using recombinant nucleic acid, e.g., recombinant DNA, techniques wherein generally, DNA or other nucleic acid encoding the factor is inserted into a suitable expression vector which is in turn introduced into a host cell to produce the heterologous protein within the host cell.

As used herein, the terms "sample" and "test sample" are used interchangeably and refer to, for example, a sample containing or suspected to contain a bacterial contaminant and/or endotoxin. In some examples, a sample or test sample may include an environmental sample, such as water, soil, or dust, or be from the surface of manufacturing equipment or a medical device, or may be a pharmaceutical composition or article or composition used to make a pharmaceutical composition, suspected of containing bacterial endotoxin contamination. In other examples, the sample may be a biological sample, such as blood, serum, plasma, urine, saliva, pulmonary fluids or aspirates, nasal mucus, vaginal secretions, ophthalmic secretions, cerebrospinal fluid, lymph, tissue or homogenized tissue, pus or exudate from a wound, feces, seminal fluid, or any other or body fluid, secretion, or exudate from the human or animal body.

Throughout the description, where compositions are described as having, including, or comprising specific components, or where processes and methods are described as having, including, or comprising specific steps, it is contemplated that, additionally, there are compositions disclosed herein that consist essentially of, or consist of, the recited components, and that there are processes and methods disclosed herein that consist essentially of, or consist of, the recited processing steps.

In the description, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present invention, whether explicit or implicit herein. For example, where reference is made to a particular compound or molecule, that compound or molecule can be used in various embodiments of compositions of the present disclosure and/or in methods of the present disclosure, unless otherwise understood from the context. In other words, within this application, embodiments have been described and depicted in a way that enables a clear and concise understanding of those embodiments, but it is intended and will be appreciated that embodiments may be variously combined or separated without parting from the invention as claimed.

The articles "a" and "an" are used in this disclosure to refer to one or more than one (i.e., to at least one) of the grammatical object of the article, unless the context is inappropriate. By way of example, "an element" means one element or more than one element.

The term "and/or" is used in this disclosure to mean either "and" or "or" unless indicated otherwise.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Where the use of the term "about" is before a quantitative value, the present invention also includes the specific quantitative value itself, unless specifically stated otherwise. As used herein, the term "about" refers to a ±10% variation from the nominal value unless otherwise indicated or inferred from the context.

It should be understood that the order of steps or order for performing certain actions is immaterial so long as the present invention remains operable. Moreover, two or more steps or actions may be conducted simultaneously.

At various places in the present specification, variable or parameters are disclosed in groups or in ranges. It is specifically intended that the description include each and every individual subcombination of the members of such groups and ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as" or "including," is intended merely to illustrate better the present invention and does not pose a limitation on the scope of the invention unless claimed. No language in the specification should be construed as indicating any non-claimed element as essential to the practice of the present invention.

As a general matter, compositions specifying a percentage are by weight unless otherwise specified.

Unless defined otherwise, all technical and scientific terms used herein have the same meaning as commonly understood by one of ordinary skill in the art to which this invention belongs. The abbreviations used herein have their conventional meaning within the chemical and biological arts.

II. The Horseshoe Crab Hemolymph Clotting Cascade

As shown in FIG. 1, the coagulation system of hemolymph taken from horseshoe crabs comprises at least two coagulation cascades that include an endotoxin-mediated pathway (the Factor C pathway) and a (1→3)-B-D glucan-mediated pathway (the Factor G pathway).

When bacterial endotoxin comes into contact with amebocyte lysate, the endotoxin initiates a series of enzymatic reactions, referred to in the art as the Factor C pathway, that involve three serine protease zymogens called Factor C, Factor B, and pro-clotting enzyme (see, FIG. 1). Briefly, upon exposure to endotoxin, the endotoxin-sensitive factor, Factor C, is activated. Activated Factor C thereafter hydrolyses and activates Factor B, whereupon activated Factor B activates pro-clotting enzyme to produce clotting enzyme. The clotting enzyme thereafter hydrolyzes specific sites, for example, Arg18-Thr19 and Arg46-Gly47 of coagulogen, an invertebrate, fibrinogen-like clottable protein, to produce an insoluble coagulin gel. See, for example, U.S. Pat. No. 5,605,806.

(1→3)-B-D glucans and other amebocyte lysate reactive glucans, produced by microorganisms such as yeasts and molds, can also activate the clotting cascade of amebocyte lysates, through a different enzymatic pathway, referred to in the art as the Factor G pathway (see, FIG. 1). Factor G is a serine protease zymogen that becomes activated by (1→3)-β-D glucan or other LAL reactive glucans. Upon exposure to (1→3)-β-D glucan, for example, Factor G is activated to produce activated Factor G. Activated Factor G thereafter converts the pro-clotting enzyme into clotting enzyme, whereupon the clotting enzyme converts coagulogen into insoluble coagulin.

The present disclosure relates to a synthetic or recombinant Factor C pathway. Unlike native horseshoe crab lysate, it has been surprisingly discovered that, in order to produce a stable synthetic Factor C pathway using isolated factors, e.g., isolated recombinant factors, it is necessary to maintain separately Factor C and Factor B until such time that the factors are combined for use in an endotoxin assay or are otherwise dried, e.g., dried on a solid surface, e.g., in a vial or other container, until use in an endotoxin assay. The synthetic Factor C pathway can comprise isolated Factor C (e.g., recombinant Factor C), isolated Factor B (e.g., recombinant Factor B), and isolated pro-clotting enzyme (e.g., recombinant pro-clotting enzyme), which can be used to determine the presence and/or amount of a microbial (e.g., bacterial) endotoxin in a sample.

III. Methods of Making Recombinant Amebocyte Clotting Factors

A. Factor C

As used herein, the term "Factor C" refers to a zymogen, or a functional fragment thereof, that is capable of being activated by endotoxin, and is capable of cleaving (e.g., enzymatically cleaving) Factor B to form an activated Factor B. The term Factor C includes variants having one or more amino acid substitutions, deletions, or insertions relative to a wild-type Factor C sequence, and/or fusion proteins or conjugates including a Factor C protein or polypeptide. As used herein, the term "functional fragment" of a Factor C refers to fragment of a full-length Factor C that retains, e.g., at least 20%, at least 30%, at least 40%, at least 50%, at least 60%, at least 70%, at least 80%, at least 90%, at least 95%, at least 96%, at least 97%, at least 98%, at least 99%, or 100% of the enzymatic activity of the corresponding full-length, naturally occurring Factor C. Factor C enzymatic activity may be assayed by any method known in the art, including, for example, by measuring cleavage of the chromogenic substrate Z-Val-Pro-Arg-pNA, e.g. for example, as described in Example 1 of International Patent Application Publication No. WO 2022/174082. In certain embodiments, the functional fragment comprises at least 100, 200, 300, 400, 500, 600, 700, 800, 900, or 1,000 consecutive amino acids present in a full-length, naturally occurring Factor C.

Recombinant Factor C ("rFC") is a Factor C produced by recombinant nucleic acid, e.g., recombinant DNA, techniques, wherein generally, DNA or other nucleic acid encoding Factor C is inserted into a suitable expression vector which is in turn introduced into a host cell to produce the heterologous protein within the host cell. Exemplary rFC and its synthesis are described in International Patent Application Publication No. WO 2022/174082.

It is contemplated that Factor C expressed from DNA sequences encoding wild-type Factor C from any horseshoe crab, or from DNA sequences having modifications as disclosed herein from the wild-type DNA sequences, may be used herein. For example, DNA sequences encoding Factor C from a *Limulus polyphemus, Tachypleus tridentatus, Tachypleus gigas*, or *Carcinoscorpius rotundicauda* Factor C may be used.

Exemplary *Limulus polyphemus* Factor C amino acid sequences are depicted in SEQ ID Nos: 1 and 2. SEQ ID NO:1 is the mature form, whereas SEQ ID NO:2 includes a signal sequence as residues 1-25. Exemplary *Tachypleus tridentatus* Factor C amino acid sequences are depicted in SEQ ID Nos: 7 and 8. SEQ ID NO: 7 is the mature form whereas SEQ ID NO: 8 includes a signal sequence as residues 1-21. In certain embodiments, a Factor C comprises the amino acid sequence of SEQ ID NO: 1, SEQ ID NO: 2, SEQ ID NO: 7, or SEQ ID NO: 8, or an amino acid sequence having at least 70%, at least 80%, at least 90%, at least 95%, at least 96%, at least 97%, at least 98%, at least 99% identity, at least 99.5%, or at least 99.8% to the amino acid sequence of SEQ ID NO: 1, SEQ ID NO: 2, SEQ ID NO: 7, or SEQ ID NO: 8. In certain embodiments, the Factor C comprises a conservative substitution relative to a wild-type Factor C sequence or a Factor C sequence disclosed herein.

As used herein, the term "conservative substitution" refers to a substitution with a structurally similar amino acid. For example, conservative substitutions may include those within the following groups: Ser and Cys; Leu, Ile, and Val; Glu and Asp; Gln and Asn; Lys, Arg and His; Phe, Tyr, and Trp. Conservative substitutions may also be defined by the BLAST (Basic Local Alignment Search Tool) algorithm, the BLOSUM substitution matrix (e.g., BLOSUM 62 matrix), or the PAM substitution: p matrix (e.g., the PAM 250 matrix).

As used herein, "percent identity" between a protein sequence and a reference sequence is defined as the percentage of amino acid residues in the protein sequence that are identical to the amino acid residues in the reference sequence, after aligning the sequences and introducing gaps, if necessary, to achieve the maximum percent sequence identity. Similarly, percent "identity" between a nucleic acid sequence and a reference sequence is defined as the percentage of nucleotides in the nucleic acid sequence that are identical to the nucleotides in the reference sequence, after aligning the sequences and introducing gaps, if necessary, to achieve the maximum percent sequence identity. Alignment for purposes of determining percent sequence identity (e.g., nucleic acid sequence identity or amino acid sequence identity) can be achieved in various ways that are within the skill in the art, for instance, using publicly available computer software such as BLAST (Basic Local Alignment Search Tool), BLAST-2, ALIGN, MEGALIGN (DNASTAR), CLUSTALW, CLUSTAL OMEGA, or MUSCLE software. For a discussion of basic issues in searching sequence databases see Altschul et al., (1994) NATURE GENETICS 6:119-129, which is fully incorporated by reference herein. Those skilled in the art can determine appropriate parameters for aligning sequences, including any algorithms needed to achieve maximal alignment over the full length of the sequences being compared.

In certain embodiments, a recombinant horseshoe crab Factor C for use as an endotoxin detection reagent, either alone, or in combination with other horseshoe crab hemolymph zymogens (e.g., Factor B, pro-clotting enzyme, whether sourced naturally or produced recombinantly) is expressed in a mammalian cell, for example, a Chinese hamster ovary (CHO) or human embryonic kidney (HEK) cell. In certain embodiments, Factor C may be produced recombinantly in a gene-edited cell line, such as GnTI$^{31}$ HEK cells (e.g., HEK cells that do not have N-acetylglucosaminyltransferase I (GnTI) activity) that produce Factor C proteins, e.g. recombinant Factor C, e.g., recombinant *Limulus polyphemus* Factor C, lacking ($\alpha$-2,3)-linked terminal sialic acid. Expression of Factor C (e.g., recombinant Factor C, e.g., recombinant *Limulus polyphemus* Factor C) in GnTI$^-$ HEK cells is described in U.S. Patent Application No. 2023/0258647, the contents of which are incorporated herein by reference. Use of such readily available gene-edited cell lines may be desirable for high-yield expression of homogenously glycosylated recombinant proteins.

B. Factor B

As used herein, the term "Factor B" refers to a zymogen, or a functional fragment thereof, that is capable of being activated upon cleavage by Factor C, and is capable of cleaving (e.g., enzymatically cleaving) a pro-clotting enzyme to form an active clotting enzyme. The term "Factor B" includes variants having one or more amino acid substitutions, deletions, or insertions relative to a wild-type Factor B sequence, and/or fusion proteins or conjugates including Factor B protein or polypeptide. As used herein, the term "functional fragment" of a Factor B refers to fragment of a full-length Factor B that retains, e.g., at least 20%, at least 30%, at least 40%, at least 50%, at least 60%, at least 70%, at least 80%, at least 90%, at least 95%, at least 96%, at least 97%, at least 98%, at least 99%, or 100% of the enzymatic activity of the corresponding full-length, naturally occurring Factor B. Factor B enzymatic activity may be assayed by any method known in the art, including, for example, by measuring cleavage of the chromogenic substrate H-D-Leu-Thr-Arg-pNA, for example, as described in Example 1 of PCT Publication WO 2022/174082. In certain embodiments, the functional fragment comprises at least 100, 150, 200, 250, 300, 350, 360, 370, 380, or 390 consecutive amino acids present in a full-length, naturally occurring Factor B.

Recombinant Factor B ("rFB") is Factor B produced by recombinant nucleic acid, e.g., recombinant DNA, techniques, wherein generally, DNA or other nucleic acid encoding Factor B is inserted into a suitable expression vector which is in turn introduced into a host cell to produce the heterologous protein within the host cell. Exemplary rFB and its synthesis are described in International Patent Application Publication No. WO 2022/174082.

It is contemplated that Factor B expressed from DNA sequences encoding wild-type Factor B from any horseshoe crab, or from DNA sequences having modifications as disclosed herein from the wild-type DNA sequences, may be used in the practice of the invention. For example, DNA sequences encoding Factor B from a *Limulus polyphemus, Tachypleus tridentatus, Tachypleus gigas*, or *Carcinoscorpius rotundicauda* Factor B may be used in the methods and compositions described herein.

Exemplary *Limulus polyphemus* Factor B amino acid sequences are depicted in SEQ ID Nos: 3 and 4. SEQ ID NO: 3 is the mature form, whereas SEQ ID NO:4 includes a signal sequence as residues 1-25. Exemplary *Tachypleus tridentatus* Factor B amino acid sequences are depicted in SEQ ID Nos: 9 and 10. SEQ ID NO:9 is the mature form, whereas SEQ ID NO: 10 includes a signal sequence as residues 1-22. In certain embodiments, a Factor B comprises the amino acid sequence of SEQ ID NO: 3, SEQ ID NO: 4, SEQ ID NO: 9, or SEQ ID NO: 10 or an amino acid sequence having at least 70%, at least 80%, at least 90%, at least 95%, at least 96%, at least 97%, at least 98%, at least 99%, at least 99.5%, or at least 99.8% identity to the amino acid sequence of SEQ ID NO: 3, SEQ ID NO: 4, SEQ ID NO: 9, or SEQ ID NO: 10.

In certain embodiments, the Factor B, e.g., recombinant Factor B ("rFB"), comprises a conservative substitution relative to a wild-type Factor B sequence or a Factor B sequence disclosed herein.

C. Pro-Clotting Enzyme

As used herein, the term "pro-clotting enzyme" refers to a zymogen, or a functional fragment thereof, that is capable of being activated upon cleavage by an activated Factor B, and is capable of cleaving (e.g., enzymatically cleaving) coagulogen to form coagulin. The term pro-clotting enzyme includes variants having one or more amino acid substitutions, deletions, or insertions relative to a wild-type pro-clotting enzyme sequence, and/or fusion proteins or conjugates including a pro-clotting enzyme protein or polypeptide. As used herein, the term "functional fragment" of a pro-clotting enzyme refers to fragment of a full-length pro-clotting enzyme that retains, for example, at least 20%, at least 30%, at least 40%, at least 50%, at least 60%, at least 70%, at least 80%, at least 90%, at least 95%, at least 96%, at least 97%, at least 98%, at least 99%, or 100% of the enzymatic activity of the corresponding full-length, naturally occurring pro-clotting enzyme. Pro-clotting enzyme enzymatic activity may be assayed by any method known in the art, including, for example, by measuring cleavage of the chromogenic substrate Ac-Ile-Glu-Gly-Arg-pNA (SEQ ID NO:13), for example, as described in Example 1 of PCT Publication WO 2022/174082. In certain embodiments, the functional fragment comprises at least 100, 150, 200, 250, 300, 320, 330, 340, 350, 360, or 370 consecutive amino acids present in a full-length, naturally occurring pro-clotting enzyme.

Recombinant pro-clotting enzyme ("rPCE" or "rPE") refers to pro-clotting enzyme produced by recombinant nucleic acid, e.g., recombinant DNA, techniques, wherein generally, DNA or other nucleic acid encoding pro-clotting enzyme is inserted into a suitable expression vector which is in turn introduced into a host cell to produce the heterologous protein within the host cell. Exemplary rPCE and its synthesis are described in International Patent Application Publication No. WO 2022/174082.

It is contemplated that pro-clotting enzyme expressed from DNA sequences encoding wild-type pro-clotting enzyme from any horseshoe crab, or from DNA sequences having modifications as disclosed herein from the wild-type DNA sequences, may be used in the practice of the invention. For example, DNA sequences encoding pro-clotting enzyme from a *Limulus polyphemus, Tachypleus tridentatus, Tachypleus gigas*, or *Carcinoscorpius rotundicauda* pro-clotting enzyme may be used. Exemplary *Limulus polyphemus* pro-clotting enzyme amino acid sequences are depicted in SEQ ID Nos: 5 and 6. SEQ ID NO: 5 is the mature form whereas SEQ ID NO:6 includes a signal sequence as residues 1-28. Exemplary *Tachypleus tridentatus* pro-clotting enzyme amino acid sequences are depicted in SEQ ID Nos: 11 and 12. SEQ ID NO:11 is the mature form, whereas SEQ ID NO:12 includes the signal sequence as residues 1-21. In certain embodiments, a pro-clotting enzyme comprises the amino acid sequence of SEQ ID NO: 5, SEQ ID NO: 6, SEQ ID NO: 11, or SEQ ID NO: 12, or an amino acid sequence having at least 70%, at least 80%, at least 90%, at least 95%, at least 96%, at least 97%, at least 98%, at least 99%, at least 99.5%, or at least 99.8% identity to the amino acid sequence of SEQ ID NO: 5, SEQ ID NO: 6, SEQ ID NO: 11, or SEQ ID NO: 12. In certain embodiments, the pro-clotting enzyme comprises a conservative substitution relative to a wild-type pro-clotting enzyme sequence or a pro-clotting enzyme sequence disclosed herein.

D. Methods of Making Recombinant Proteins

Methods for producing recombinant proteins are known in the art. For example, DNA molecules encoding a protein of interest (e.g., Factor C, Factor B, and/or pro-clotting enzyme, as disclosed herein) can be synthesized chemically or by recombinant DNA methodologies. The resulting DNA molecules encoding the protein of interest can be ligated to other appropriate nucleotide sequences, including, for example, expression control sequences, to produce conventional gene expression constructs (i.e., expression vectors) encoding the desired protein. Production of defined gene constructs is within routine skill in the art.

Nucleic acids encoding desired proteins (e.g., Factor C, Factor B, and/or pro-clotting enzyme, as disclosed herein) can be incorporated (ligated) into expression vectors, which can be introduced into host cells through conventional transfection or transformation techniques. Exemplary host cells are *E. coli* cells, Chinese hamster ovary (CHO) cells, human embryonic kidney 293 (HEK 293) cells, HeLa cells, baby hamster kidney (BHK) cells, monkey kidney cells (COS), human hepatocellular carcinoma cells (e.g., Hep G2), and myeloma. Transformed host cells can be grown under conditions that permit the host cells to express the genes that encode the protein of interest.

Specific expression and purification conditions will vary depending upon the expression system employed. For example, if a gene is to be expressed in *E. coli*, it is first cloned into an expression vector by positioning the engineered gene downstream from a suitable bacterial promoter, e.g., Trp or Tac, and a prokaryotic signal sequence. The expressed protein may be secreted. The expressed protein may accumulate in refractile or inclusion bodies, which can be harvested after disruption of the cells by French press or sonication. The refractile bodies then are solubilized, and the protein may be refolded and/or cleaved by methods known in the art.

If the engineered gene is to be expressed in eukaryotic host cells, e.g., CHO or HEK cells, it is first inserted into an expression vector containing a suitable eukaryotic promoter, a secretion signal, a poly A sequence, and a stop codon. Optionally, the vector or gene construct may contain enhancers and introns. The gene construct can be introduced into eukaryotic host cells using conventional techniques.

A polypeptide or protein of interest (e.g., Factor C, Factor B, and/or pro-clotting enzyme, as disclosed herein) can be produced by growing (culturing) a host cell transfected with an expression vector encoding such a polypeptide or protein, under conditions that permit expression of the polypeptide or protein. Following expression, the polypeptide can be harvested and purified or isolated using techniques known in the art, e.g., affinity tags such as glutathione-S-transferase (GST) or histidine tags.

Nucleic acids encoding the polypeptide sequences of SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, or SEQ ID NO:12 can be spliced into a suitable expression vector and operatively linked to a promoter for use in a desired expression host using standard recombinant DNA methodologies. Also provided are expression host cells (e.g., mammalian host cells) comprising such an expression vector, which can then be used to express the protein encoded by one or more of the foregoing nucleic acid sequences. Exemplary methods for making recombinant Factor B, pro-clotting enzyme and Factor C are described in Example 1 herein.

It is understood that a recombinantly expressed polypeptide or protein may have a different molecular weight and/or be differently glycosylated relative to a corresponding native polypeptide or protein. Similarly, a protein or polypeptide recombinantly expressed in a first host cell type may have a different molecular weight and/or be differently glycosylated relative to a corresponding protein or polypeptide expressed in a second, different host cell type. Glycosylation of recombinant proteins produced in mammalian host cells is described, for example, in Lis et al. (1993) EUR. J. BIOCHEM. 218:1-27, Parodi (2000) ANNU. REV. BIOCHEM. 69:69-93, Viswanathan et al. (2005) BIOCHEM. 44:7526-7534, Tomiya et al. (2004) GLYCOCONJUGATE JOURNAL 21: 343-360, Tomiya et al. (2003) ACC. CHEM. RES. 36:613-620, Gerngros (2004) NAT. BIOTECHNOL. 22:1409-1414, and Demain et al. (2009) BIOTECHNOLOGY ADVANCES 27:297-306.

IV. Methods of Making Native Horseshoe Crab Amebocyte Lysates and Isolation of Clotting Factors from the Lysates In addition to recombinant factors, isolated native clotting factors may be used in the methods and compositions disclosed herein. The native factors can be isolated from crude native horseshoe crab amebocyte lysates using methodologies know in the art.

A native horseshoe crab amebocyte lysate refers to any lysate or fraction thereof (e.g., the components of a Factor C mediated cascade) produced by the lysis, extrusion, or extraction of the cellular contents from amebocytes extracted from a horseshoe crab. A native amebocyte lysate comprises the naturally occurring components of an enzymatic cascade (e.g., as shown in FIG. 1) produced, for example, by the lysis, extrusion, or extraction of the cellular contents from amebocytes extracted from a horseshoe crab. Depending upon the components present in, or admixed with, the lysate it may produce a clot in the presence of an endotoxin, for example, a Gram negative bacterial endotoxin and/or a glucan, for example, a (1→3)-β-D glucan, produced by a yeast or a mold. Amebocyte lysates can be derived from horseshoe crabs belonging to the *Limulus* genus, for example, *Limulus polyphemus*, the *Tachypleus* genus, for example, *Tachypleus tridentatus* and *Tachypleus gigas*, and the *Carcinoscorpius* genus, for example, *Carcinoscorpius rotundicauda*. The term "native" when referring to Factor B, Factor C or pro-clotting enzyme, refers to a factor derived from a natural source, e.g., from an amebocyte lysate, as opposed to a factor produced using recombinant means, e.g., recombinant DNA technologies.

Crude amebocyte lysates can be produced using the procedures described in Levin et al. (1968) THROMB. DIATH. HAEMORRH. 19: 186, with modification, or in Prior 1990 "Clinical Applications of the *Limulus* Amebocyte Lysate Test" CRC PRESS 28-36 and 159-166, and in U.S. Pat. No. 4,322,217. Other lysates may include those, for example, described in U.S. Pat. Nos. 6,270,982 and 6,391,570. In certain embodiments, a crude lysate is produced as described in Example 1 of International Patent Application Publication No. WO 2022/174082.

Crude lysates prepared according to the methods discussed above or known to those of skill in the art may be further processed to isolate inactive native clotting factors from the lysate, e.g., native Factor C, native Factor B, or native pro-clotting enzyme. For example, native Factor B may be isolated from *T. tridentatus* crude amebocyte lysate according to the methods disclosed in Nakamura et al. (1986) J. BIOCHEM 99:847-57. Native Factor C may be isolated from *L. polyphemus* according to methods disclosed in Nakamura et al. (1986) EUR. J. BIOCHEM 154: 511-21. Native pro-clotting enzyme may be isolated from *T. tridentatus* according to the methods disclosed in Nakamura et al., J. BIOCHEM. 97:1561-1574 (1985).

It is contemplated that endotoxin assays can be performed with recombinant factors, isolated native factors, or a combination of recombinant factors and isolated native factors. For example, in certain embodiments, rFC may be substituted with native isolated Factor C, rFB may be substituted with native isolated Factor B and/or rPCE can be substituted with native isolated pro-clotting enzyme in the endotoxin detection assays methods of the invention.

V. Substrates

In order to detect the presence of endotoxin, a substrate for the clotting enzyme can be used.

A crude or native amebocyte lysate contains coagulogen and the conversion of coagulogen to a coagulin gel by clotting enzyme can be observed by measuring the optical property of the assay reaction. However, in certain embodiments, coagulogen is not present, for example, if only recombinant rFC, rFB, and rPCE are combined together. In such embodiments, it is not possible to observe formation of coagulin gel when the coagulation cascade is activated by exogenous endotoxin. Accordingly, in certain embodiments, when using recombinant factors, e.g., recombinant rFC, rFB, and/or rPCE, a synthetic substrate, for example, a chromogenic substrate, for the clotting enzyme is used. For example, the activated clotting enzyme cleaves the substrate to create a detectable product, such as a colored or fluorogenic product. The resulting product may be detected, for example, using a suitable detector, e.g., an optical or fluorescent detector.

In some embodiments, a recombinant coagulogen (rCoagulogen) is used in place of a substrate, e.g., a chromogenic substrate, so that the optical property of the assay reaction can be measured by the formation of coagulin gel (gel clot assay) or change in turbidity (end point or kinetic turbidimetric assay) when the coagulation cascade is activated by exogenous endotoxin. rCoagulogen may be used with rPCE, rFB, and rFC, for example.

In one embodiment, the chromogenic substrate for the clotting enzyme contains a para-nitroaniline (pNA) chromophore. For example, the pNA chromophore is linked to a short colorless peptide that is cleaved by an activated factor, releasing the pNA group that can be detected using an optical detector. The peptide may comprise a -Gly-Argcontaining peptide, or a -Gly-Lys-containing peptide. Exemplary substrates include, for example, Ac-Ile-Glu-Gly-Lys-pNA (SEQ ID NO:14), also known as S2834 (available from Pentapharm AG, Aesch BL, Switzerland), and Ac-Ile-Glu-Gly-Arg-pNA (SEQ ID NO:13), also known as S2423 (available from Pentapharm AG, Aesch BL, Switzerland), wherein each Ac represents an acetyl moiety and pNA represents a para-nitroaniline chromophore. Other exemplary chromogenic substrates are described in Harada-Suzuki et al. (1982) J. BIOCHEM. 92:783-800 and Nakamura et al., J. BIOCHEM., 81, 1567-1569 (1977).

VI. Methods of Detection and Sample Preparation Considerations

The recombinant amebocyte factors disclosed herein can be used in various assays to determine the presence and/or amount of a microbial endotoxin, e.g., a bacterial endotoxin in a sample (e.g., biopharmaceutical compositions, parenteral drugs, medical devices, solutions used in biopharmaceutical and parenteral drug manufacturing, environmental samples, blood or body fluid samples, etc.). The method comprises contacting amebocyte clotting factors (e.g., recombinant Factor C, recombinant Factor B, and/or recombinant pro-clotting enzyme) with a sample (e.g., a sample suspected of containing endotoxin), allowing the factor(s) to react with the sample to produce a detectable product (e.g., a gel, increase in turbidity, or a colored product (e.g., a chromophore) or light-emitting product (e.g., a fluorophore), and detecting the detectable product (e.g., visually or by the use of an optical detector).

Amebocyte clotting factors, e.g., recombinant amebocyte clotting factors, e.g., rFC, rFC and/or rPCE, disclosed herein can be used to detect a microbial contaminant (e.g., endotoxin) using, for example, a kinetic assay or an endpoint assay. Exemplary kinetic assays include a one-step kinetic assay. Exemplary endpoint assays include an endpoint chromogenic assay. Each of the assays is discussed in more detail below. Furthermore, it is understood that the assays may be modified to be performed in a particular assay format, for example, in a cartridge or in the well or wells of a plate, for example, a 96 well plate.

A. Kinetic Assays

An exemplary kinetic assay is a single-step kinetic assay, for example, a single step-chromogenic assay, is described in U.S. Pat. No. 5,310,657. Briefly, a kinetic chromogenic assay includes the steps of (i) solubilizing recombinant amebocyte lysate factors with a sample to be analyzed and a substrate, for example, a chromogenic substrate, (ii) incubating the resulting mixture at a temperature of about 0° to about 40° C., preferably about 25° to about 40° C., over a predetermined time range and (iii) measuring a time required for a colorimetric change to reach a pre-selected value or change of the colorimetric readout, using a conventional spectrophotometer.

This type of assay can be performed in a cartridge or a well-type format.

(i). Cartridge-Based Format

It is understood that a kinetic assay can be run in a cartridge format. The cartridge preferably is used with an optical detector, for example, a hand-held optical detector as shown and described in U.S. Pat. No. Des. 390,661. A kinetic assay can also be run in one or more wells, e.g., on a multi-well plate.

Cartridges disclosed herein can be used in a method of detecting the presence and/or amount of microbial contamination, e.g., bacterial endotoxin in a sample. For example, the methods may include the steps of (a) introducing a liquid sample into the sample inlet port of a cartridge, e.g., a cartridge disclosed herein; (b) permitting the sample to move to the optical cell; and (c) measuring an optical property of the sample in the optical cell, wherein a change in the optical property is indicative of the presence and/or amount of microbial endotoxin, in the sample. The change in optical property may be an increase in absorbance of light of a preselected wavelength. For example, the cartridges disclosed herein may be inserted into an instrument (e.g., hand-held detector) that measures the color intensity produced by the substrate in the optical cell and compares the resulting color against a standard curve to provide a co concentration of endotoxin in the test sample.

As disclosed herein, Factor B, e.g., recombinant Factor B, and Factor C, e.g., recombinant Factor C, should be maintained separately from one another on the cartridge in order to maintain the stability of each factor. Accordingly, Factor B and Factor C are disposed separately on the cartridge, e.g., maintained in separate areas or regions of the cartridge, and only mixed together in the presence of a liquid sample traversing the cartridge. In other words, a region or area of the cartridge where Factor B, e.g., recombinant Factor B, is present will not also contain Factor C, e.g., recombinant Factor C, and vice versa.

Cartridges disclosed herein can be used in a method of determining the presence or amount of a microbial contamination, e.g., bacterial endotoxin in a sample. For example, the method may include the steps of (a) introducing a liquid sample into the sample inlet port of a cartridge, e.g., a cartridge disclosed herein; (b) permitting the sample to move to the optical cell; (c) measuring the time in which a preselected change occurs in an optical property of the sample in the optical cell; and (d) comparing the time measured in step (c) against a predetermined standard curve to determine the amount of microbial endotoxin in the sample. The change in optical property may be an increase in absorbance of light of a preselected wavelength. The change in optical property may be a decrease in absorbance or transmission of light of a preselected wavelength. The change in optical property may be an increase in fluorescent light of a preselected wavelength. The presence or amount of the endotoxin is indicative of a bacterial infection or bacterial contamination in the sample.

By way of example and as illustrated in FIGS. 2A-2D and FIGS. 3A-3D, an exemplary cartridge 1 has a substantially planar housing fabricated, for example, from a moldable biocompatible material. The housing may be fabricated from any material, however, transparent and/or translucent glass or polymers are preferred. Preferred polymers include, for example, polystyrene, polycarbonate, acrylic, polyester, optical grade polymers, or any plastic such that the optical cell is substantially transparent. The housing contains at least one fluid inlet port 4, at least one optical cell 6, and at least one conduit 8 having a fluid contacting surface for providing fluid flow communication between the fluid inlet port 4 and optical cell 6. The only requirements for the optical cell 6 are that it defines a void capable of containing a sample to be tested and that a portion of the optical cell 6 is transparent to light. Cartridge 1 may also have at least one pump port 12 in fluid flow communication with fluid inlet port 4 and optical cell 6 for attaching the cartridge 1 to a pump. The pump may then impart a negative pressure via pump port 12 to pull the sample from fluid inlet port 4 to optical cell 6.

In the configuration shown in FIGS. 2A-D, a first amebocyte factor, e.g., rFC, is disposed on a first region 14 of the fluid contacting surface of conduit 8, so that when a sample is applied to fluid inlet port 4, the sample traverses region 14 and solubilizes or reconstitutes the amebocyte factor into the sample as it moves toward optical cell 6. A second region 16 of the fluid contacting surface of conduit 8 is spaced apart from and downstream (i.e., in the direction of fluid flow along the conduit 8 away from the fluid inlet port 4) of first region 14. A second amebocyte factor, e.g., rFB is disposed at the second region 16, so that after the sample is contacted with the first factor in region 14, the sample-factors mixture traverses conduit 8 and contacts the second factor in region 16. It is contemplated that substrate and pro-clotting enzyme can also be disposed in the first region, the second region or split between the first region and the second region. The sample-factors-substrate mixture then traverses conduit 8 to optical cell 6. Forward and reverse pump action facilitated by pump port 12 may be used to permit adequate mixing of the sample-factors-substrate mixture before an optical property of the sample is measured.

Referring to FIGS. 2A-D, in an alternate configuration, the amebocyte factor disposed on a first region 14 is, e.g., rFB and the amebocyte factor disposed on the second region 16 is rFC. It is contemplated that substrate and pro-clotting enzyme can also be disposed in the first region 14, the second region 16 or split between the first region and the second region. In one configuration, the rFB and rPCE are disposed on the first region 14, with the rFC and substrate, e.g., a chromogenic substrate, being disposed on the second region 16. In another embodiment, the rFC and rPCE are disposed on the first region 14, with the rFB and substrate, e.g., a chromogenic substrate, being disposed on the second region 16.

Referring to FIGS. 2A-D, in still yet another alternate configuration, a first amebocyte lysate factor, e.g., rFC is disposed on a first region 14 along with the fluorogenic or chromogenic substrate, and a second amebocyte lysate factor, e.g., rFB is disposed on the second region 16. It is contemplated that substrate and pro-clotting enzyme can also be disposed in the first region 14, the second region 16 or split between the first region 14 and the second region 16.

In the configuration shown in FIGS. 3A-D, a first amebocyte factor, e.g., rFC, is disposed on a first region 14 of the fluid contacting surface of conduit 8, so that when a sample is applied to fluid inlet port 4, the sample traverses region 14 and solubilizes or reconstitutes the amebocyte factor into the sample as it moves toward optical cell 6. A second region 16 of the fluid contacting surface of conduit 8 is spaced apart from and downstream (i.e., in the direction of fluid flow along the conduit 8) of first region 14. A third region 18 is apart from and further downstream of second region 16 (and downstream of first region 14). A second amebocyte factor, e.g., rFB is disposed on the second region 16, and a chromogenic or fluorogenic substrate is disposed on the third region 18. After the sample is contacted with the first amebocyte factor in the first region 14, the sample-factor mixture traverses conduit 8 and contacts the second amebocyte factor disposed in the second region 16 and the sample-factors mixture then further traverses conduit 8 and contacts the chromogenic or fluorogenic substrate. The sample-factors-substrate mixture then traverses conduit 8 to optical cell 6. It is contemplated that the pro-clotting enzyme can be disposed in the first region 14, the second region 16, or the third region 18, or split between the first region 14 and the second region 16. Forward and reverse pump action facilitated by pump port 12 may be applied to permit adequate mixing of the sample-factors-substrate mixture before an optical property of the sample is measured. In other words, the first region 14 is positioned between and spaced apart from the fluid inlet port 4 and the second region 16, the second region 16 is positioned between and spaced apart from the first region 14 and third region 18, and the third region 18 is positioned between and spaced apart from the second region 16 and the optical cell 6. When a liquid sample is applied to the fluid inlet port 4, the sample traverses the first region 14, then the second region 16, then the third region 18, solubilizing the substrate and/or factors in each region before reaching the optical cell 6.

Referring to FIGS. 3A-D, in an alternate configuration, the amebocyte factor disposed on the first region 14 is rFB, while the amebocyte factor disposed on the second region 16 is rFC. The substrate can be disposed in the third region 18. It is contemplated that the pro-clotting enzyme can be disposed in the first region 14, the second region 16, or the third region 18, or split between the first region 14 and the second region 16.

Referring to FIGS. 3A-D, in yet another configuration, the substrate is disposed on the first region 14, and the first amebocyte factor is disposed on the second region 16, and the second amebocyte factor is disposed on the third region 18. Accordingly, when a sample is applied to fluid inlet port 4, the sample moves along conduit 8 and contacts the substrate in the first region 14. The resulting sample-substrate mixture traverses conduit 8 and contacts the first amebocyte factor in the second region 16. The sample-factor-substrate mixture then traverses conduit 8 and contacts the second amebocyte factor in the third region 18. The sample-factors-substrate mixture then traverses the conduit 8 to optical cell 6. Mixing can also be facilitated by reciprocating the fluid and solubilized components back and forth along the conduit before taking a measurement of the solution in the optical cell. The first amebocyte factor may be rFC and the second amebocyte factor may be rFB. Alternatively, the first amebocyte factor may be rFB and the second amebocyte factor may be rFC. The pro-clotting enzyme, e.g., rPCE, may be disposed on any of the first region 14, the second region 16, or the third region 18, or split between the first region 14 and the second region 16. In one embodiment, the first amebocyte factor is rFC, the second amebocyte factor is rFB, and rPCE is disposed on the second region 16 with the rFC. In one embodiment, the first recombinant factor is rFC, the second recombinant factor is rFB, and rPCE is disposed on the third region 18 with the rFB. In one embodiment, the first recombinant factor is rFB, the second recombinant factor is rFC, and rPCE is disposed on the second region 16 with the rFB. In another embodiment, the first amebocyte factor is rFB, second amebocyte factor is rFC, and the rPCE is disposed on the third region 18 with the rFC. In some configurations, therefore, the first region 14 does not contain any recombinant factors.

Referring to FIGS. 3A-D, in yet another exemplary configuration, the first amebocyte factor is disposed on the first region 14, the substrate is disposed on the second region 16, and the second amebocyte factor is disposed on the third region 18. The first amebocyte factor may be rFC and the second amebocyte factor may be rFB. Alternatively, the first amebocyte factor may be rFB and the second amebocyte factor may be rFC. The pro-clotting enzyme may be disposed on any of the first region 14, the second region 16, or the third region 18, or split between the first region 14, the second region 16, or the third region 18.

Figure 3A:
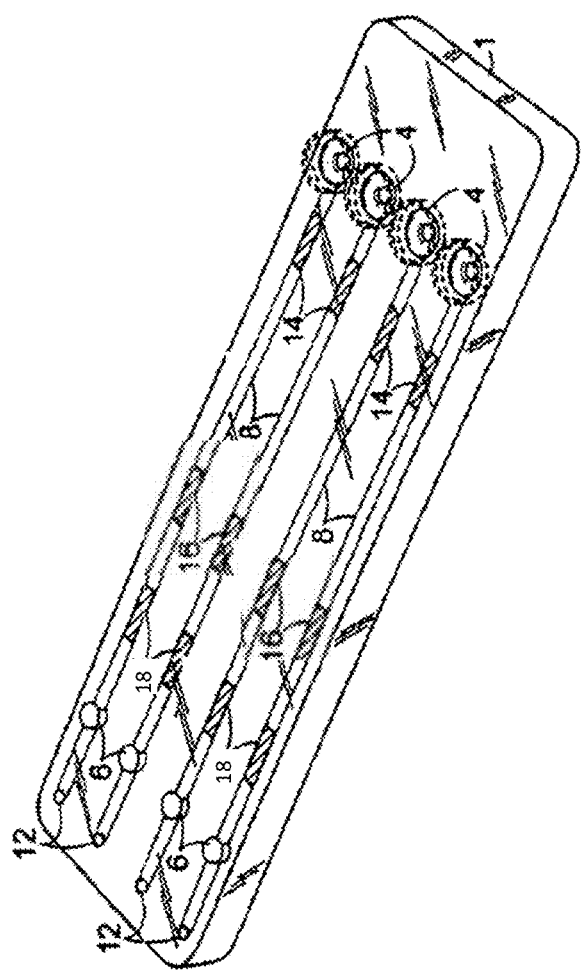
FIGS. 3A-3D are schematic illustrations of an exemplary cartridge for use with recombinant amebocyte factors described herein, in perspective view (FIG. 3A), top view (FIG. 3B), side view (FIG. 3C), and end view (FIG. 3D).
Figure 3B:
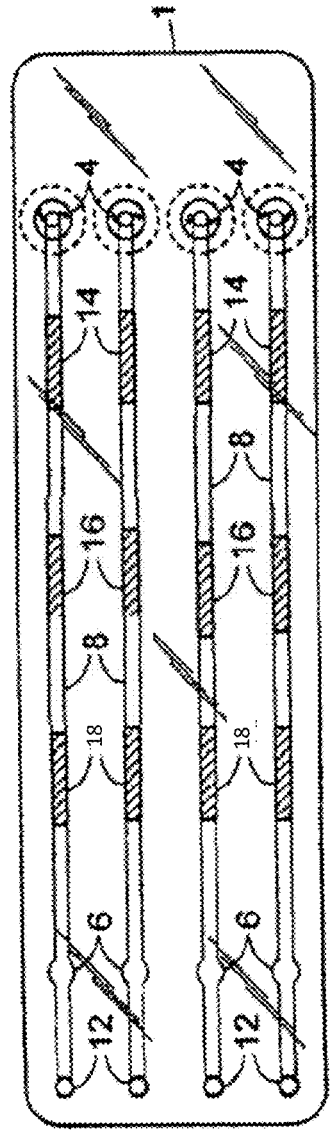
Figure 3C:
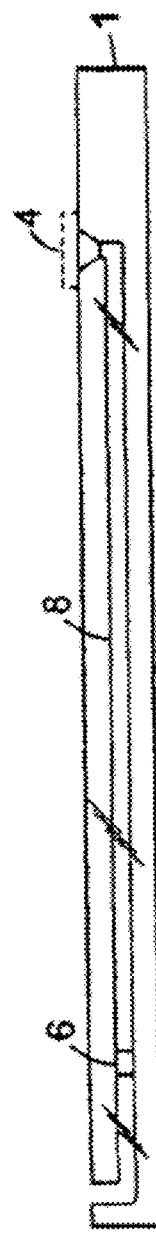
Figure 3D:
Figure 4C:
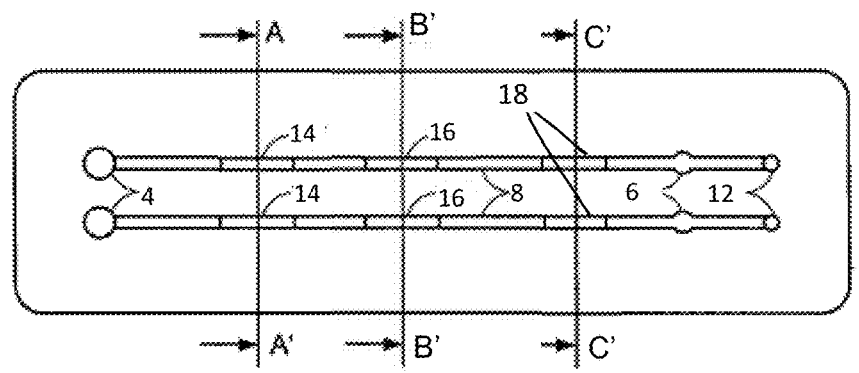
Figure 4D:
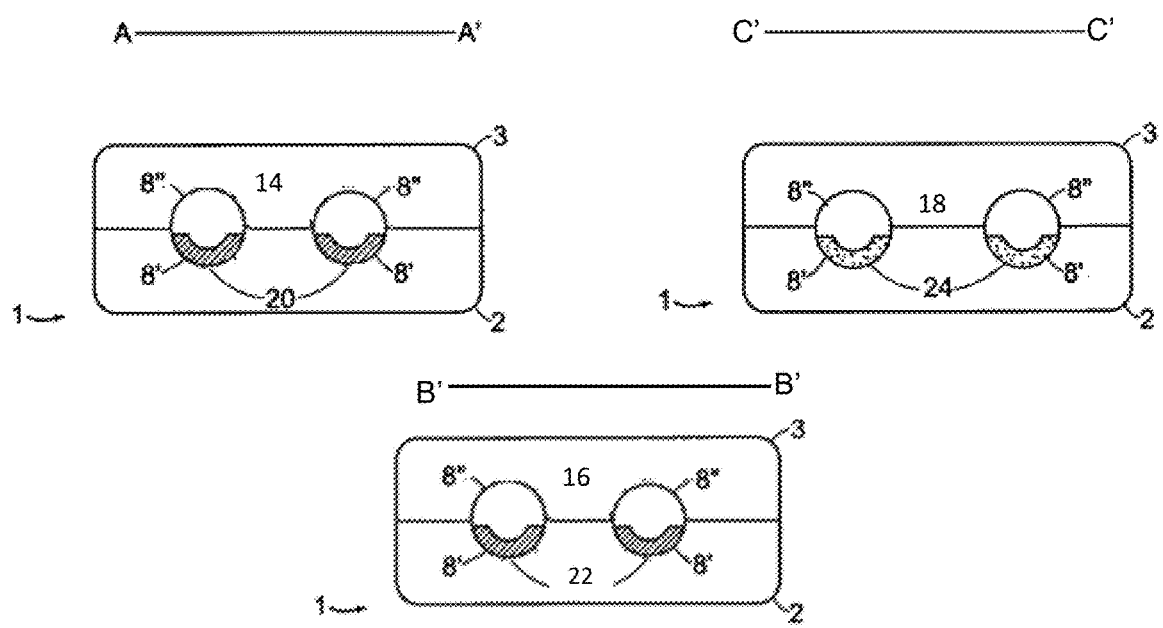

Referring to FIGS. 4C-4D which provide a cross-sectional view of the exemplary cartridge of FIGS. 3A-D, in which conduit 8 has a first surface 8' and a second surface 8". Accordingly, the amebocyte factors, substrate, and pro-clotting enzyme, as described with respect to FIGS. 3A-D, may be disposed on the first surface 8' of the respective region (e.g., 14, 16, or 18) of the conduit 8 or on the second surface 8" of the respective region (e.g., 14, 16, or 18) of the conduit 8, or on both the first surface 8' and the second surface 8" of the respective region (e.g., 14, 16, or 18) of the conduit 8.

Similarly, in the configuration shown in FIGS. 4A-B, a first amebocyte factor, e.g., rFC 20, is disposed on a first surface 8' of a conduit 8 of a first region 14, while a second amebocyte factor, e.g., rFB 22, is disposed on a second surface 8" of a conduit 8 of the first region 14, so that when a sample is applied to fluid inlet port 4, the sample traverses region 14 and solubilizes or reconstitutes the first and second amebocyte factors into the sample as it moves toward optical cell 6. A second region 16 of the fluid contacting surface 8 is spaced apart from and downstream (i.e., in the direction of fluid flow along the conduit 8) of first region 14. After the sample is contacted with the first and second amebocyte factors in the first region 14, the sample-factors mixture traverses the conduit 8 and contacts the substrate 24, e.g., a fluorogenic or chromogenic substrate, disposed on the second region 16 on either a first surface 8', or on a second surface 8", or on both the first 8' and second 8" surfaces of the region 16. The sample-factors-substrate mixture then traverses conduit 8 to optical cell 6. It is contemplated that the pro-clotting enzyme may be disposed on the first region 14, or the second region 16, and may be disposed on the first surface 8', on the second surface 8", or on both the first and second surfaces of the fluid contacting surface 8 of either the first 14 or second 16 region.

Figure 4E:
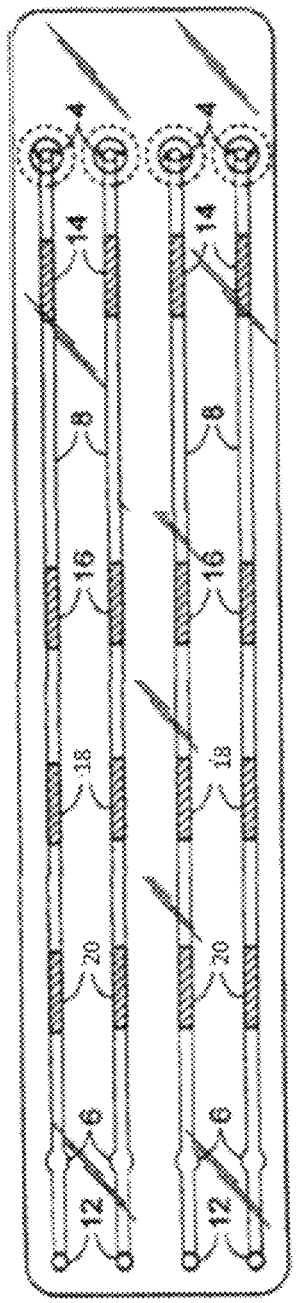

Referring to FIG. 4E, in another configuration, the first amebocyte factor is disposed on the first region 14, the second amebocyte factor is disposed on the second region 16, the third amebocyte factor is disposed on the third region 18, and a substrate is disposed on a fourth region 20. The first amebocyte factor may be rFC, the second amebocyte factor may be rFB, and the third amebocyte factor may be rPCE. Alternatively, the first amebocyte factor may be rFB and the second amebocyte factor may be rFC, and the third amebocyte factor may be rPCE. When a sample is applied to fluid inlet port 4, the sample traverses regions 14, 16, 18, and 20, and solubilizes or reconstitutes the amebocyte factors and substrate into the sample as it moves toward optical cell 6. Pump action may be applied via a pump 12 to permit mixing of the sample, factors and substrate to promote the reaction between the factors, substrate and any endotoxin in the sample to produce a detectable change that can be read by an analyzer capable of detecting a change in an optical property in, or created by, the sample in the optical cell 6.

The cartridges can be designed and used according to the type and/or number of tests required. For example, a single sample may be tested, for example, in duplicate or triplicate, for example, for research laboratory use or for medical device and biopharmaceutical testing. Alternatively, two or more different samples may be tested individually. The cartridge preferably is a single-use, disposable cartridge that is discarded after one use.

In certain embodiments, one or more native isolated factors are substituted for the corresponding recombinant amebocyte factor on the cartridges. For example, in one embodiment, native isolated Factor C is substituted for rFC. Alternatively or in addition, native isolated Factor B is substituted for rFB. Alternatively or in addition, native isolated pro-clotting enzyme may be substituted for rPCE.

(ii) Well-Based Format

Although a kinetic assay can be performed in a cartridge of the types discussed above, it may also be employed in a variety of other formats, e.g., within the wells of a microtiter plate or alternatively in one or more vials.

With regard to an assay performed in a well format, in one embodiment, a sample of interest is combined with a first factor in a well, then a second factor and then a substrate can be added to the well. It is contemplated that pro-clotting enzyme can be included with the first factor, the second factor or the substrate. After mixing, the time in which a preselected change in an optical property occurs is measured. The results can then be compared against one or more standard values to determine the presence and/or amount of a microbial endotoxin in the sample. The first factor may be rFC and the second factor may be rFB. In an alternative embodiment, the first factor may be rFB and the second factor may be rFC.

It is contemplated that such an assay can be performed in multiple wells. For example, a first amebocyte factor may be disposed in a first well, a second amebocyte factor may be disposed in a second well and substrate may be disposed in a third well. It is contemplated that pro-clotting enzyme can be present in the first well, the second well or the third well. The sample of interest can be added to the first well, after mixing the resulting sample is then added to the second well, and after mixing the resulting sample is added to the third well. However, it is contemplated that the order of the addition of the sample to the wells can vary. For example, the first amebocyte factor may be Factor C, e.g., rFC, the second amebocyte factor maybe Factor B, e.g., rFB. Alternatively, the first amebocyte factor may be Factor B, e.g., rFB, and the second amebocyte factor may be Factor C, e.g., rFB. Similarly, the sample could be added initially to the second well, then the resulting mixture added to the first well, and then the resulting mixture added to the third well. Other sequential steps are contemplated where for example, the sample is added to the third well, and then the resulting mixture is added to the first well, and then the resulting mixture is added to the second well.

After mixing the first factor, second factor, pro-clotting enzyme and substrate the time in which a preselected change in an optical property occurs is measured. The result can then be compared against one or more standard values to determine the presence and/or amount of a microbial endotoxin in the sample.

In the well-type of format, the samples and reagents are added to each of the wells, preferably using an automated system, such as a robot, and the plate processed by a microplate reader, which can be programmed to sequentially read the absorbance of each well in a repetitive fashion. In some examples, when the well-type format is performed, for example, in a vial or tube, a tube reader is used to detect a change in the optical property of the sample. The order of steps performed in a well-type format may also be adapted for use with microfluidic technology so that quantities of the various reagents are present in and move through chambers of a microfluidic device upon addition of a test sample in the same sequence as would occur if performed in a well plate. When using a microfluidic device, a change in an optical property of the sample, once it passes through the device, may be measured.

In certain embodiments, the recombinant amebocyte factors, the rPCE and the substrate are dried on, e.g., lyophilized, or otherwise coated onto the surface of the respective wells and reconstituted or solubilized as the sample added to each well. It is also contemplated that similar approaches can be conducted where the factors are disposed in vials instead of wells of a microtiter plate.

In certain embodiments, the recombinant factors (e.g., rFB, rFC, rPCE) are provided together in a vial, or in separate vials as lyophilizates. For example, rFB, rFC, and rPCE may be provided as lyophilizates in a single vial, or rFB and rFC may be provided in separate vials, with rPCE being provided separately, or with the rFC or rFB. A substrate may be included in the vial with one or more factors, or it may be provided in a separate vial and is lyophilized. The vials of lyophilized factors and/or substrate are reconstituted with, a suitable liquid reagent, for example, endotoxin free water (e.g., LAL reagent water) or an endotoxin free buffer and mixed together prior to performing an assay with a sample. In one approach, a sample being tested for endotoxin is placed in the bottom of the well or vial after which factors and substrate, which have been reconstituted, e.g., immediately, e.g., within about 30 minutes or less, prior to being used, are added to the well or vial. In another approach, the sample is added to a well or vial in which the factors and substrate are already present. The well or vial is then analyzed with an automated analyzer equipped with endotoxin measuring software to detect a change of an optical property in the sample.

In certain embodiments performed in one or more wells or vials, one or more native isolated factors are substituted for the corresponding recombinant amebocyte factor. For example, in one embodiment, native isolated Factor C is substituted for rFC, native isolated Factor B is substituted for rFC, and/or native isolated pro-clotting enzyme is substituted for rPCE.

B. Endpoint Assays

An exemplary endpoint assay is an endpoint chromogenic or fluorogenic assay. Endpoint chromogenic or fluorogenic assays can include the steps of (i) solubilizing recombinant factors with a sample to be analyzed, (ii) incubating the resulting mixture at a temperature of about 0° to about 40° C., preferably about 25° to about 40° C., for a predetermined time, (iii) contacting substrate, for example, a chromogenic or fluorogenic substrate, with the incubated sample-factors mixture, (iv) optionally adding a reaction inhibitor, for example, acetic acid, and (v) measuring, for example by colorimetric change, a substance produced from the substrate by enzymatic activity. The endpoint assay measures how much of the substance is produced by certain predetermined time point.

It is contemplated that such assays can be conducted in cartridges, one or more wells of a microtiter plate or one or more vials such as those described above for the kinetic assays and performed using the same or similar steps. However the difference is that the change in optical property is measured at a predefined time rather than over time as in a kinetic assay.

(i). Cartridges

Cartridges disclosed herein can be used in a method of determining the presence and/or amount of microbial endotoxin in a sample. For example, the methods may include the steps of (a) introducing a liquid sample into the sample inlet port of a cartridge, e.g., a cartridge disclosed herein; (b) permitting the sample to move to the optical cell; and (c) measuring an optical property of the sample in the optical cell at a predetermined time point, wherein a change in the optical property is indicative of the presence and/or amount of microbial endotoxin in the sample. The change in optical property may be an increase or decrease in absorbance of light of a preselected wavelength. The method may further include step (d) of comparing the optical property measured at the predetermined time point (c) against a predetermined standard curve to determine the amount of microbial endotoxin in the sample.

As disclosed herein, Factor B, e.g., recombinant Factor B, and Factor C, e.g., recombinant Factor C, should be maintained separately from one another on the cartridge in order to maintain each factor's stability. Accordingly, Factor B and Factor C are separated in the cartridge until use, e.g., maintained in separate areas or regions of the cartridge, and only become mixed together in the presence of a liquid sample traversing the cartridge. In other words, a region or area of the cartridge where Factor B, e.g., recombinant Factor B, is present will not also contain Factor C, e.g., recombinant Factor C, and vice versa.

When an endpoint chromogenic or fluorogenic assay is performed in a cartridge 1 (see, FIGS. 2A-2D), a sample is moved, for example, to a first region 14 of the conduit 8 containing the first recombinant factor, where it is solubilized by the sample, for example, by cycling between forward and reverse pump action. The sample-factor mixture then is moved, for example, by pump action to a second region 16 of the conduit 8 containing the second recombinant factor and the chromogenic or fluorogenic substrate, where they are solubilized, for example, by cycling between forward and reverse pump action. Afterwards, the sample-factors-substrate mixture is moved to optical cell 6 for measurement of an optical property, for example, the absorbance or transmittance properties of the sample by an optical detector. It is contemplated, however, that when performing an end-point chromogenic or fluorogenic assay in a cartridge it is not necessary to stop the reaction using a reaction inhibitor. Under this type of assay, the final optical readings (endpoint readings) are recorded at a predetermined time.

Referring to FIGS. 2A-D, in one configuration, the recombinant factor disposed on the first region 14 is rFB and the recombinant factor disposed on the second region 16 is rFC. Depending upon the circumstances, the e.g., a chromogenic or fluorogenic substrate may be located at the first region or the second region, but can optionally be separated from the rFB or the rFC. This can be achieved if the substrate, for example, is coated on the upper surface of conduit 8 and the factor is coated on the lower surface of conduit 8. rPCE may be disposed on the first region 14 or optionally can be disposed on the second region 16. In one embodiment, the rFB and rPCE are disposed on the first region 14, with the rFC and substrate, e.g., a chromogenic substrate, is disposed on the second region.

Referring to FIGS. 2A-D, in another configuration, the recombinant factor disposed on the first region 14 is rFC and second factor disposed on the second region 16 is rFB Depending upon the circumstances, the e.g., a chromogenic or fluorogenic substrate may be located at the first region or the second region, but can optionally be separated from the rFB or the rFC. This can be achieved if the substrate, for example, is coated on the upper surface of conduit 8 and the factor is coated on the lower surface of conduit 8. rPCE may be disposed on the first region 14 or optionally can be disposed on the second region 16.

Referring to FIGS. 2A-D, in yet another alternate configuration, the recombinant factor rFB is disposed on a first region 14 along with the fluorogenic or chromogenic substrate, and rFC is disposed on the second region 16. rPCE may be disposed on the first region 14 or rPCE may be disposed on the second region 16.

Referring to FIGS. 2A-D, in yet another alternate configuration, the recombinant factor rFC is disposed on a first region 14 along with the fluorogenic or chromogenic substrate, and rFB is disposed on the second region 16. rPCE may be disposed on the first region 14 or rPCE may be disposed on the second region 16.

Referring to FIGS. 3A-3D, an endpoint chromogenic or fluorogenic assay is performed in a cartridge 1 and a sample is moved, for example, to a first region 14 of the conduit 8 containing the first recombinant factor (e.g., rFC), where it is solubilized by the sample, for example, by cycling between forward and reverse pump action. The sample-factor mixture then is moved, for example, by pump action to a second region 16 of the conduit 8 containing the second recombinant factor (e.g., rFB), where it is solubilized by the sample-factor mixture, for example, by cycling between forward and reverse pump action. The sample-factors mixture then is moved, for example, by pump action to a third region 18 of the conduit 8 containing the chromogenic or fluorogenic substrate, where they are solubilized, for example, by cycling between forward and reverse pump action. Afterwards, the sample-factors-substrate mixture is moved to optical cell 6 for measurement of an optical property, for example, the absorbance or transmittance properties of the sample by an optical detector. The final optical readings (endpoint readings) are recorded at a predetermined time.

Referring to FIGS. 3A-D, in one configuration, the recombinant factor disposed on the first region 14 is rFB, while the recombinant factor disposed on the second region 16 is rFC. rPCE may be disposed on the first region 14 or in the second region 16. Alternatively, the rPCE may be disposed on the third region 18 with the substrate.

Referring to FIGS. 3A-D, in one configuration, the recombinant factor disposed on the first region 14 is rFC, while the recombinant factor disposed on the second region 16 is rFB. rPCE may be disposed on the first region 14 or in the second region 16. Alternatively, the rPCE may be disposed on the third region 18 with the substrate.

Referring to FIGS. 3A-D, in yet another configuration, the substrate is disposed on the first region 14, and the first recombinant factor is disposed on the second region 16, and the second recombinant factor is disposed on the third region 18. The first recombinant factor may be rFC and the second recombinant factor may be rFB. Alternatively, the first recombinant factor may be rFB and the second recombinant factor may be rFC. The rPCE may be disposed on any of the first region 14, the second region 16, or the third region 18. In one embodiment, the first recombinant factor is rFC, the second recombinant factor is rFB, and rPCE is disposed on the second region 16 with the rFC. In one embodiment, the first recombinant factor is rFC, the second recombinant factor is rFB, and rPCE is disposed on the third region 18 with the rFB. In one embodiment, the first recombinant factor is rFB, the second recombinant factor is rFC, and rPCE is disposed on the second region 16 with the rFB. In another embodiment, the first recombinant factor is rFB, second amebocyte factor is rFC, and the rPCE is disposed on the third region 18 with the rFC.

Referring to FIGS. 3A-D, in yet another configuration, the first recombinant factor is disposed on the first region 14, the substrate is disposed on the second region 16, and the second recombinant factor is disposed on the third region 18. The first recombinant factor may be rFC and the second recombinant factor may be rFB. Alternatively, the first recombinant factor may be rFB and the second recombinant factor may be rFC. The rPCE may be disposed on any of the first region 14, the second region 16, or the third region 18.

The assay can be calibrated by measuring an optical property, for example, absorbance or transmittance, when a certain amount of a microbial contaminant (e.g., endotoxin) is introduced into the assay. By comparing the result generated by a test sample against one or more results with known amounts of the microbial endotoxin, it is possible to measure the presence and/or amount of the microbial endotoxin in the test sample.

In some embodiments, one or more native isolated factors can be used to replace the corresponding recombinant factor on the cartridge. For example, depending upon the circumstances, native isolated Factor C can replace rFC, native isolated Factor B can replace rFB, or native isolated pro-clotting enzyme can replace rPCE.

(ii). Wells

As discussed, this type of assay format may be employed in a variety of other formats, for example, within the well of a microtiter plate. In this type of assay, a sample of interest is mixed with recombinant factors and substrate and incubated for a preselected period of time. Optionally a reaction inhibitor, e.g., acetic acid, is added to the sample, and an optical property of the sample, for example, absorbance or transmittance, is measured. The result can then be compared against standard values to measure the presence or amount of a microbial endotoxin in the sample of interest.

It is contemplated that the assays can be performed in a single well or multiple wells of a microtiter plate as described above for the kinetic assays. However, the optical property is measured at a predefined time rather than measuring the optical property over time as is performed in the kinetic assay. Similarly it is contemplated that such assays can be performed in one or more vials as described above for the kinetic assays.

In some embodiments, one or more native isolated factors can be used to replace the corresponding recombinant factor in a well or vial. For example, depending upon the circumstances, native isolated Factor C can replace rFC, native isolated Factor B can replace rFB, or native isolated pro-clotting enzyme can replace rPCE.

VII. Production of Compositions, Cartridges and Vials

All the reagents and materials used to prepare the cartridge, well plates, or vials disclosed herein are preferably free of the microbial contaminant, e.g., endotoxin, for which the cartridge ultimately will be used to test.

The cartridges, well plates, or vials may be fabricated with any of the recombinant Factor B, recombinant Factor C, or pro-clotting enzyme disclosed herein. For example, the rFB and/or rFC and/or rPCE may be a *Limulus polyphemus, Tachypleus tridentatus,* or *Carcinoscorpius rotundicauda* rFB and/or rFC and/or rPCE.

In some embodiments, the cartridges may be fabricated with a combination of recombinant amebocyte clotting factors and native isolated clotting factors. For example, one of native or recombinant Factor B, one or native or recombinant Factor C, and one of native or recombinant pro-clotting enzyme is used to fabricate the cartridge. For example, the native isolated Factor B and/or Factor C and/or PCE may be a *Limulus polyphemus, Tachypleus tridentatus,* or *Carcinoscorpius rotundicauda* Factor B and/or Factor C and/or PCE.

A. Endotoxin Testing Compositions

Disclosed herein are methods of producing bacterial endotoxin testing compositions. The compositions can be used with cartridges, e.g., cartridge disclosed herein, or in well or vial based assays, as disclosed herein. The composition may be a liquid, such as a buffered solution, or the composition may be lyophilized, or freeze dried depending on the application.

In one embodiment, the disclosure provides a method of producing stabilized compositions for detecting bacterial endotoxin in a sample. The method includes (a) providing a first solution comprising recombinant amebocyte Factor C (rFC), and a second, different solution comprising a recombinant amebocyte Factor B (rFB), wherein the rFC and rFB are substantially inactive; and (b) combining the first solution and the second solution to produce a third solution comprising a mixture of rFC and rFB under conditions so that, in the absence of a test sample (or control) containing endotoxin, the rFC and the rFB remain substantially inactive in the mixture. In some embodiments, the mixture is dehydrated immediately, e.g., within about 30 minutes or less, upon mixing the first solution comprising rFC and the second solution comprising rFB. For example, in some instances, dehydrating the mixture provides the conditions necessary so that the rFB and rFC remain substantially inactive. The dehydration may be accomplished by lyophilization, or freeze drying. In some embodiments, the first solution further comprises a recombinant pro-clotting enzyme (rPCE), while, in other embodiments, the second solution further comprises rPCE. The method may further include a further step, step (c) of providing a third solution comprising rPCE, and in step (b) mixing the first, second and third solutions to produce a mixture of rFC, rFB, and rPCE. The rFC may be a *Limulus Polyphemus* Factor C, *Tachypleus tridentatus* Factor C or a *Carcinoscorpius rotundicauda* Factor C. The rFB may be a *Limulus Polyphemus* Factor B, *Tachypleus tridentatus* Factor B or a *Carcinoscorpius rotundicauda* Factor B. The rPCE may be a *Limulus Polyphemus* pro-clotting enzyme, *Tachypleus tridentatus* pro-clotting enzyme or a *Carcinoscorpius rotundicauda* pro-clotting enzyme. The method may further include the step of contacting the mixture with a sample suspected of containing microbial endotoxin, and determining the presence and/or amount of endotoxin, if any, in the sample. If the mixture is lyophilized, it may be resolubilized by addition of the sample, or by addition of a liquid, such as a buffer. With reference to Factor C, the term "substantially inactive" refers to Factor C, e.g., rFC, that has not been materially converted to an active enzyme to activate Factor B, e.g., rFB, and pro-clotting enzyme, e.g., rPCE. In other words, the Factor C, e.g., rFC, remains inactive relative to the lowest level of endotoxin detectable in a given endotoxin detection assay, e.g., as determined by a standard curve for the assay. With reference to Factor B, the term "substantially inactive" refers to Factor B, e.g., rFB, that has not been materially converted to an active enzyme to activate Factor C, e.g., rFC, and pro-clotting enzyme, e.g., rPCE. In other words, the Factor B, e.g., rFB, remains inactive relative to the lowest level of endotoxin detectable in a given endotoxin detection assay, e.g., as determined by a standard curve for the assay.

In another embodiment, the disclosure provides a method for producing a bacterial endotoxin testing composition where a first composition containing a first amebocyte factor, e.g., Factor C, e.g., rFC that is free of Factor B, and a second composition containing a second amebocyte factor, e.g., a Factor B, e.g., rFB that is free of Factor C, are provided. In one embodiment, the first and second compositions are mixed together in the presence of pro-clotting enzyme, e.g., rPCE, to form a third composition, and the first and second compositions remain separated until mixed together immediately, e.g., within about 30 minutes or less, prior to contact with a test sample. This approach may be employed, for example, with wells or vials. In another embodiment, the first and second compositions are mixed together in the presence of pro-clotting enzyme, e.g., rPCE, to form a third composition, and the first and second compositions remain separated until the first and second compositions are mixed with a test sample. The approach maybe employed, for example, with a cartridge.

In some embodiments of this method, the first and second composition provided in steps (a) and (b) of the method are provided as dried compositions. These dried compositions may be resolubilized prior to mixing in step (c) of the method. For example, the first and second compositions may be resolubilized with one or more buffered solutions. Alternatively, the first and second compositions may be resolubilized by the test sample. When first and second compositions are provided as solutions, they can be mixed together in a container, e.g., a vial, test tube, or well, immediately, e.g., within about 30 minutes or less, prior to a test sample being added to the container.

B. Cartridges

Exemplary cartridges useful in carrying out the disclosed methods, and methods for fabrication of the same, can be found in U.S. Pat. No. 7,329,538 and U.S. Design Patent No. D472,324.

According to one aspect, the disclosure provides a cartridge for bacterial endotoxin testing. The cartridge comprises a housing defining a test sample inlet area, a first region upon which is disposed a first composition that comprises a first recombinant factor, and a second region upon which is disposed a second composition that comprises a second recombinant factor. The first and second regions are spaced apart from one another, and are in fluid flow communication with one another. The first region is in fluid flow communication with the sample inlet area. Accordingly, when a test sample is added to the sample inlet area, the sample mixes with the first composition and second compositions. In some embodiments, a pump is applied to the cartridge to move the sample back and forth across the first and second regions to permit mixing of the sample with the first and second compositions.

In one embodiment, the first composition comprises recombinant Factor B or recombinant Factor C, and the second composition comprises recombinant Factor B or recombinant Factor C, but the first composition and second composition do not both contain recombinant Factor B or recombinant Factor C. For example, in one configuration, the first composition on the first region comprises recombinant Factor C and not recombinant Factor B and the second composition on the second region comprises recombinant Factor B and not recombinant Factor C.

In other embodiments, the first composition further comprises recombinant pro-clotting enzyme, or the second composition further comprises recombinant pro-clotting enzyme. In other configurations, the cartridge includes a third region that is separate from the first and second regions and in fluid flow communication with the first and/or second regions of the cartridge; a third composition is disposed on the third region. The third composition may comprise a chromogenic substrate in some configurations, while in other configurations, the third composition may comprise a recombinant pro-clotting enzyme, while in other configurations, the third composition may comprise both a recombinant pro-clotting enzyme and a chromogenic substrate. In some embodiments, the third region is positioned between the sample inlet area and the first region, such that the sample traverses the third region, followed by the first region, and then the second region. For example, when the third region is positioned between the sample inlet area and the first region, the third composition comprises a chromogenic substrate, but does not include any recombinant factors.

In some embodiments, the cartridge includes a fourth region which is separate from the first, second, and third regions, and is in fluid flow communication with the first, second and/or third region. In one configuration, the fourth region comprises a fourth composition disposed thereon that includes a recombinant pro-clotting enzyme, while in another configuration, the fourth composition includes a chromogenic substrate.

An exemplary cartridge containing a first, second, third, and fourth region is shown in FIG. 4E. The sample inlet 4 is upstream of first region 14, which is upstream of second region 16, which is upstream of third region 18, which is upstream of fourth region 20. When a test sample is placed on the cartridge in sample inlet 4, it flows in a downstream direction from the sample inlet 4 towards optical cell 6. A pump port 12 is provided for attaching to a pump that can apply negative pressure to pull a sample from fluid inlet port 4 to optical cell 6. The pump may apply positive and negative pressure to move the sample back and forth across the first, second, third, and fourth regions to ensure mixing of the sample with the first, second, third, and fourth compositions before the results are read in the optical cell 6.

In certain embodiments, the cartridges comprise a housing defining a test sample inlet area, a first region upon which is disposed a first composition, a second region upon which is disposed a second composition, and a third region upon which is disposed a third composition. Each of the regions are spaced apart from one another, and are in fluid flow communication with one another. The first region is in fluid flow communication with the sample inlet area and the second region and is positioned between the sample inlet area and the second region. The second region is in fluid flow communication with the first region and the third region and is positioned between the first region and the third region. The third region is in fluid flow communication with the second region, and is positioned next to the second region, and optionally next to and in fluid flow communication with an optical cell. Accordingly, when a test sample is added to the sample inlet area, the sample first mixes with the first composition on the first region, then moves to and mixes with the second composition on the second region, and then moves to and mixes with the third composition on the third region, before optionally traveling to an optical cell. In some embodiments, a pump is applied to the cartridge to move the sample back and forth across the first, second, and third regions to permit mixing of the sample with the first, second, and third compositions. In one configuration, the first composition comprises a substrate, e.g. a chromogenic substrate, but does not include any recombinant factors; the second composition includes recombinant Factor B, but does not include recombinant Factor C or pro-clotting enzyme; and the third composition includes recombinant Factor C and recombinant pro-clotting enzyme, but does not include recombinant Factor B. In another configuration, the first composition comprises a substrate, e.g. a chromogenic substrate, but does not include any recombinant factors; the second composition includes recombinant Factor C and recombinant pro-clotting enzyme, but does not include recombinant Factor B; and the third composition includes recombinant Factor B, but does not include recombinant pro-clotting enzyme or recombinant Factor C.

An exemplary cartridge containing a first, second, and third region is shown in FIGS. 3A-B. The sample inlet 4 is located upstream of first region 14, which is located upstream of second region 16, which is located upstream of third region 18. When a test sample is placed on the cartridge in sample inlet 4 of the cartridge, it flows in a downstream direction from the sample inlet 4 towards optical cell 6 through the first region 14, then the second region 16, and then the third region. A pump port 12 is provided for attaching to a pump that can apply negative pressure to pull a sample from fluid inlet port 4 to optical cell 6. The pump may apply positive and negative pressure to move the sample back and forth across the first, second, and third regions to ensure mixing of the sample with the first, second, and third compositions before the results are read in optical cell 6.

Also disclosed is an exemplary cartridge for determining the presence and/or amount, if any, of a microbial (e.g., bacterial) endotoxin in a liquid sample. The cartridge comprises (a) a housing defining a fluid inlet port, an optical cell, and a conduit having a fluid contacting surface providing fluid flow communication between the fluid inlet port and the optical cell; (b) a first composition disposed on a first region of the fluid contacting surface of the conduit; and (c) a second composition disposed on a second region of the fluid contacting surface of the conduit. The first region is spaced apart from the second region, such that, when the sample is applied to the fluid inlet port, the sample traverses the first region and the second region and solubilizes the first and second compositions, during transport to the optical cell. The first and second compositions are selected from the group consisting of amebocyte Factor B and amebocyte Factor C, provided that the first composition is not the same as the second composition. In some embodiments, the Factor C and/or Factor B remain substantially inactive until contacted with microbial endotoxin in the liquid sample.

In some embodiments, the second region of the cartridge is located between the first region and the optical cell. In other embodiments, the first region is a first circumferential section of the fluid contacting surface of the conduit and the second region is a second, different circumferential region of the fluid contacting surface of the conduit. For example, the first circumferential section is defined by at least a portion of an upper half of the conduit, and the second circumferential section is defined by at least a portion of a lower half of the conduit.

In some configurations of the cartridge, the first composition contains Factor C and the second composition contains Factor B, while in other configurations, the first composition contains Factor B and the second composition contains Factor C. The Factor B may be recombinant Factor B, for example, a *Limulus Polyphemus* Factor B, *Tachypleus tridentatus* Factor B or a *Carcinoscorpius rotundicauda* Factor B. The factor C may be recombinant Factor C, for example, *Limulus Polyphemus* Factor C, *Tachypleus tridentatus* Factor C or a *Carcinoscorpius rotundicauda* Factor C.

In some configurations of the cartridge, the first region or the second region further comprises a pro-clotting enzyme. In yet other configurations, pro-clotting enzyme is disposed in a third region of the fluid contacting surface of the conduit spaced apart from the first region and the second region. For example, the pro-clotting enzyme is a recombinant pro-clotting enzyme, such as a *Limulus Polyphemus* pro-clotting enzyme, *Tachypleus tridentatus* pro-clotting enzyme or a *Carcinoscorpius rotundicauda* pro-clotting enzyme.

In some configurations of the cartridge, a chromogenic substrate is disposed on the first region, the second region, the third region or a fourth region of the fluid contacting surface spaced apart from the first region, the second region or the third region. The third region may be downstream of the first and/or second regions. The fourth region, if present, may be downstream of the first/and or second regions. However, in certain configurations, a third region is positioned upstream of the first and second regions, and, if present, upstream of any fourth region. For example, a chromogenic substrate is disposed on a third region that is located upstream of the first and second regions, and if present, the fourth region. The fourth region may be downstream from the first, second, and third regions.

An exemplary fabrication process for a cartridge is described with reference to FIGS. 4A-B, in which FIG. 4A provides a top view of one configuration of a cartridge according to the disclosure, and FIG. 4B provides cross-sectional views of the cartridge taken at positions A-A' and B-B' of FIG. 4A. As shown by the cross-section A-A' of FIG. 4B, the cartridge 1 has a first (e.g., lower) half 2 and a second (e.g., top) half 3. Once prepared, the two halves of the cartridge 1 are joined to one another by adhesive, solvent bonding, ultrasonic welding, snap fit joints, or the like. It is contemplated that the cartridges of FIGS. 2 and 3 may be created by similar principles.

As depicted by FIGS. 4A-B, the cartridge 1 includes a first (e.g., lower) half 2 and a second (e.g., top) half 3. The first half 2 of the cartridge 1 defines one half of each conduit 8 (each having a first region 14 and a second region 16), such that the conduit 8 has a first (e.g., lower) surface 8' on the first (e.g., lower) half of the cartridge 1 and a second (e.g., upper) surface 8" on the second (e.g., upper) half of the cartridge 1. During fabrication, a first reagent, e.g., an amebocyte factor 20, can be applied to a first (e.g., lower) surface 8' of a first region 14' of a conduit 8 and a third reagent 24 is applied to a first (e.g., lower) surface 8' of a second region 16' of the conduit 8 on the first (e.g. lower) half 2 of the cartridge 1. The direction of fluid flow on the cartridge is away from fluid inlet port 4 and toward optical cell 6 via the conduit. Accordingly, the first region 14' is downstream from the fluid inlet port 4, and upstream of the second region 16'. The second region 16' is downstream of the first region 14'. The first region 14' and second region 16' regions are in fluid flow communication with one another, and the first region 14' is in fluid flow communication with the fluid inlet port.

During fabrication, a second reagent, e.g., an amebocyte factor 22, is applied to a second (e.g., top) surface 8" of the first region 14" of the conduit 8 on the second (upper) half 3 of the cartridge 1. The cartridge 1 may also have at least one pump port 12 in fluid flow communication with fluid inlet port 4 and optical cell 6 for attaching the cartridge 1 to a pump for imparting negative pressure via pump port 12 to pull a sample from fluid inlet port 4 to optical cell 6.

Referring still to FIGS. 4A-4B, in one configuration, the first reagent contains Factor B, e.g., rFB, the second reagent contains Factor C, e.g., rFC. The third reagent contains a substrate for a pro-clotting enzyme, e.g., PCE, such as a chromogenic or fluorogenic substrate. In another configuration, the first reagent contains Factor C, e.g., rFC, and the second reagent contains Factor B, e.g., rFB. The third reagent contains a substrate for a pro-clotting enzyme, e.g., rPCE, such as a chromogenic or fluorogenic substrate. In one configuration, a pro-clotting enzyme, e.g., rPCE, is disposed on the first region 14, either on the first surface 8', the second surface 8", or on both the first 8' and second 8" surfaces, whereas in another configuration, a pro-clotting enzyme, e.g., rPCE, is disposed on the second region 16, either on the first surface 8', the second surface 8", or both the first 8' and second 8" surfaces. Once the reagents have been applied to the respective top 3 and lower 2 halves of the cartridge 1, the cartridge halves 2 and 3 then are dried under conditions that preserve the activity of the reagents, e.g., the amebocyte factors, e.g., rFC, rFB, and rPCE, and the substrate, and to permit solubilization or reconstitution of the factors and substrate to perform in an assay to detect microbial endotoxin.

In another configuration according to FIGS. 4A-B, a first amebocyte factor 20, e.g., rFC, is disposed on a first surface 8' of a fluid contacting surface 8 of a first region 14, while a second amebocyte factor 22, e.g., rFB, is disposed on a second surface 8" of the fluid contacting surface 8 of the first region 14. The pro-clotting enzyme may be disposed on the first region 14, or the second region 16, and may be disposed on the first surface 8', on the second surface 8", or on both the first and second surfaces of the fluid contacting surface 8 of either the first 14 or second 16 region. The substrate 24 may be disposed on the second region 16 on either a first surface 8', or on a second surface 8", or on both the first and second surfaces of the region 16.

Another exemplary fabrication process for the cartridge is described with reference to FIGS. 4C-D, in which FIG. 4C provides a top view of one configuration of a cartridge according to the disclosure, and FIG. 4D provides cross-sectional views of the cartridge taken at positions A-A', B-B', and C-C' of FIG. 4C. As shown by the cross-sections at A-A', B-B', and C-C' of FIG. 4D, cartridge 1 has a first (e.g., lower) half 2 and a second (e.g., top) half 3. Once prepared, the two halves of the cartridge 1 are joined to one another by adhesive, solvent bonding, ultrasonic welding, snap fit joints, or the like.

As shown by FIGS. 4C-D, the cartridge 1 includes a first (e.g., lower) half 2 and a second (e.g., upper) half 3. The first half 2 of the cartridge 1 defines one half of each conduit 8 (each having a first region 14, a second region 16, and a third region 18), such that the conduit 8 has a first (e.g., lower) surface 8' on the first (e.g., lower) half of the cartridge 1 and a second (e.g., upper) surface 8" on the second (e.g., upper) half of the cartridge 1. During fabrication, in one configuration, a first reagent 20, e.g., an amebocyte factor or a substrate, is applied to a first (e.g., lower) surface 8' of a first region 14 of a conduit 8, a second reagent 22, e.g., an amebocyte factor, is applied to a first (e.g., lower) surface 8' of a second region 16 of a conduit 8, and a third reagent 24, e.g., an amebocyte factor, is applied to a first (e.g., lower) surface 8' of a third region 18 of the conduit 8 on the first (e.g. lower) half 2 of the cartridge 1. The direction of fluid flow on the cartridge is away from fluid inlet port 4 and toward optical cell 6 via the conduit. Accordingly, the first region 14 is downstream from the fluid inlet port 4, and upstream of the second region 16. The second region 16 is downstream of the first region 14 and upstream of the third region 18. The first region 14 is in fluid flow communication with the fluid inlet port, the first region 14 and second region 16 are in fluid flow communication with one another, and second region 16 is in fluid flow communication with the third region 18.

The second (e.g., upper) half 3 of the cartridge 1 defines a second (e.g., upper) surface 8" of conduit 8, which in one embodiment may be free of any reagents. However, in some embodiments, during fabrication of the cartridge, a first reagent 20, e.g., an amebocyte factor or a substrate, is applied to a second (e.g., upper) surface 8" of a first region 14 of a conduit 8, a second reagent, e.g., an amebocyte factor 22, is applied to a second (e.g., upper) surface 8" of a second region 16 of a conduit 8, and/or a third reagent 24, e.g., an amebocyte factor, is applied to a second (e.g., upper) surface 8' of a third region 18 of the conduit 8 on the second (e.g. upper) half 2 of the cartridge 1. In one embodiment, the reagents applied to the first, second, and third region of the lower surface 8' of the conduit 8 respectively are also applied to the same region of the upper surface 8" of the conduit 8. The cartridge 1 may also have at least one pump port 12 in fluid flow communication with fluid inlet port 4 and optical cell 6 for attaching the cartridge 1 to a pump for imparting negative pressure via pump port 12 to pull a sample from fluid inlet port 4 to optical cell 6.

Referring still to FIGS. 4C-4D, in one configuration, the first reagent contains Factor B, e.g., rFB, and the second reagent contains Factor C, e.g., rFC. The third reagent contains a substrate for a pro-clotting enzyme, e.g., rPCE, such as a chromogenic or fluorogenic substrate. In another configuration, the first reagent contains Factor C, e.g., rFC, and the second reagent contains Factor B, e.g., rFB. The third reagent contains a substrate for a pro-clotting enzyme, e.g., rPCE, such as a chromogenic or fluorogenic substrate. In one configuration, a pro-clotting enzyme, e.g., rPCE, is disposed on the first region 14 either on the first surface 8', the second surface 8", or on both the first 8' and second 8" surfaces, whereas in another configuration, a pro-clotting enzyme, e.g., rPCE, is disposed on the second region 16, either on the first surface 8', the second surface 8", or both the first 8' and second 8" surfaces.

In another configuration according to FIGS. 4C-D, a first amebocyte factor, e.g., rFC 20, is disposed on a first surface 8' (or a first 8' and second 8" surface) of a fluid contacting surface 8 of a first region 14, while a second amebocyte factor, e.g., rFB 22, is disposed on a first surface 8' (or a first 8' and second 8" surface) of a fluid contacting surface 8 of a second region 16, and a substrate 24 is disposed on a first surface 8' (or a first 8' and second 8" surface) of a third region 18 of a fluid contacting surface 8. The pro-clotting enzyme may be disposed on the first region 14, or the second region 16, and may be disposed on the first surface 8', on the second surface 8", or on the first 8' and second 8" surfaces of the fluid contacting surface 8 of either the first 14 or second 16 or third 18 region. The substrate may be disposed on a first surface 8' (or a first 8' and second 8" surface) of a fluid contacting surface of a third region 16. In an alternative configuration, the first amebocyte factor 20 is rFB, while the second amebocyte factor 22 is rFC. In yet a further configuration, the fluid contacting surface has a first 14, second 16, and third 18 regions on the fluid contacting surface 8, the first amebocyte factor, the second amebocyte factor, and the substrate are each disposed on different region of the fluid contacting surface 8 and rPCE may be disposed on any of the first, second or third regions of the fluid contacting surface. However, rFC and rFB are not disposed on the same region.

In some embodiments, the order in which reagents are applied to the regions (e.g., 14, 16, or 18), is varied, so long as Factor B, e.g., rFB is applied to one region (e.g., 14, 16, or 18), Factor C, e.g., rFC is applied to a second region (e.g., 14, 16, or 18), and the substrate is applied to a third region (e.g., 14, 16, or 18), on the conduit 8, where Factor C and Factor B are not applied to the same region, and each region (14, 16, and 18), contains only one of Factor C, Factor B, and substrate. Pro-Clotting enzyme, e.g., rPCE, can be applied to at least one of regions 14, 16, or 18. For example, in one particular arrangement, substrate is applied to the first region 14, rFC and rPCE are applied to the second region 16, and rFB is applied to the third region 18. In another arrangement, substrate is applied to the first region 14, rFB and rPCE are applied to the second region 16, and rFC is applied to the third region 18. In another arrangement, substrate, e.g., a chromogenic substrate, is applied to the first region 14, rFB is applied to the second region 16, and rFC and rPCE are applied to the third region 18. For example, in one configuration, the first reagent 20 contains a substrate, e.g., a chromogenic substrate, the second reagent 22 contains recombinant Factor B, and the third reagent 24 contains recombinant Factor C and recombinant pro-clotting enzyme. In another embodiment, the first reagent 20 contains a substrate, e.g., a chromogenic substrate, the second reagent 22 contains recombinant Factor C and recombinant pro-clotting enzyme, and the third reagent 24 contains recombinant Factor B.

Once the reagents have been applied to lower half 2 of the cartridge 1, (or to the lower half 2 and top half 3 when reagents are added to the top half 3), the cartridge halves 2 and 3 then are dried under conditions that preserve the activity of the reagents, e.g., the amebocyte factors, e.g., rFC, rFB, and rPCE, and the substrate, and to permit solubilization or reconstitution of the factors and substrate to perform in an assay to detect microbial endotoxin.

Referring to FIG. 4E, in one configuration, a first reagent is disposed on a first region 14, a second reagent is disposed on a second region 16, a third reagent is disposed on a third region 18, and a fourth reagent is disposed on a fourth region 20. In one configuration, the first reagent contains Factor B, e.g., rFB, while the second reagent contains Factor C, e.g., rFC, the third reagent contains pro-clotting enzyme, e.g., rPCE, and the fourth reagent contains a chromogenic substrate. In another configuration, the first reagent contains Factor C, e.g., rFC, while the second reagent contains Factor B, e.g., rFB. The third reagent contains pro-clotting enzyme, e.g., rPCE, and the fourth reagent contains a chromogenic substrate.

Figure 2A:
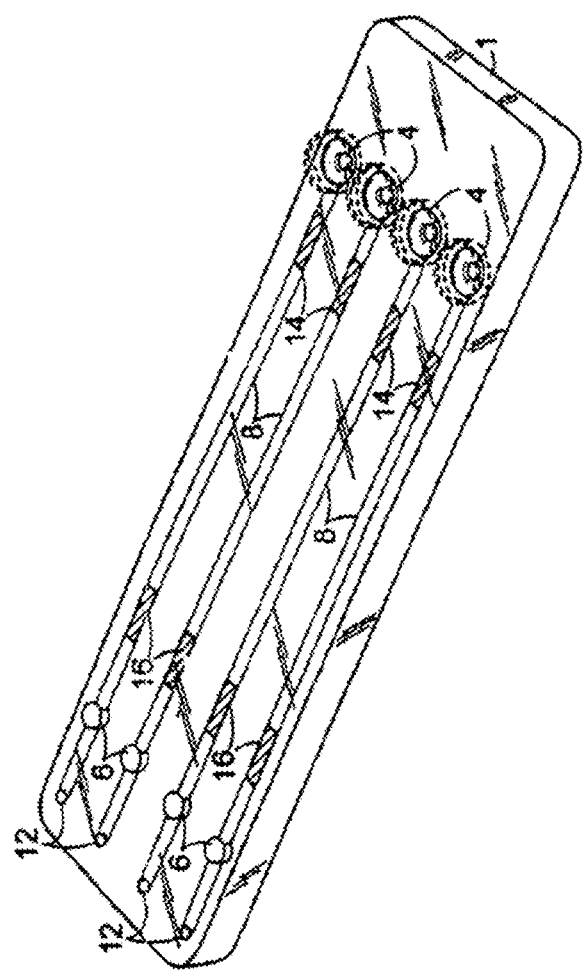
FIGS. 2A-2D are schematic illustrations of an exemplary cartridge for use with recombinant amebocyte factors described herein, in perspective view (FIG. 2A), top view (FIG. 2B), side view (FIG. 2C), and end view (FIG. 2D).
Figure 2B:
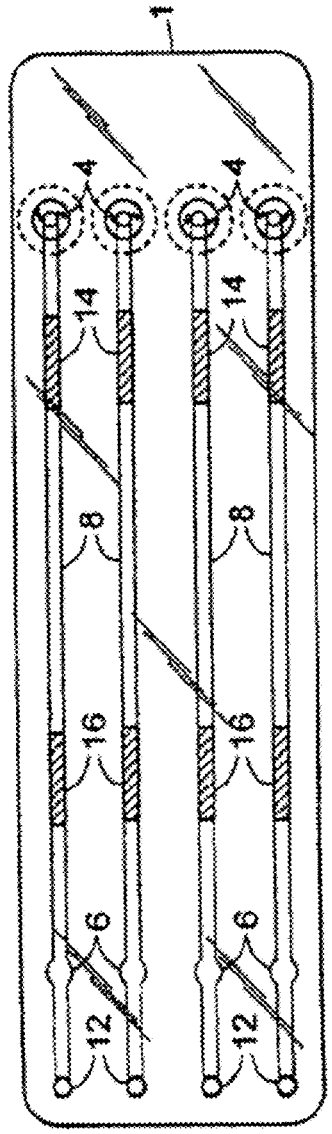
Figure 2C:
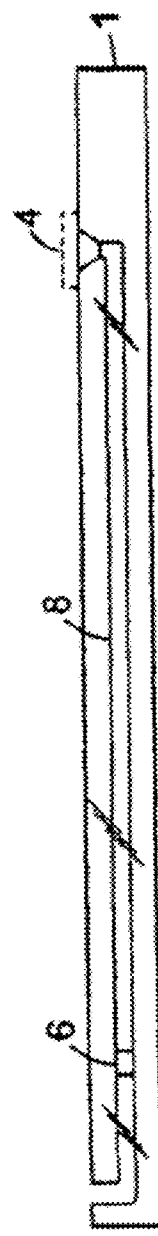
Figure 2D:

Another exemplary fabrication process is described with reference to FIGS. 2A-D, where FIG. 2A provides a perspective view of a cartridge, FIG. 2B provides a top view, FIG. 2C provides a cross-sectional view, and FIG. 2D provides an end view. During fabrication, a first reagent is applied to a first region 14 of the conduit 8 and a second reagent is applied to a second region 16 of the conduit 8. The reagents can be dried onto the conduit. In one configuration, the first reagent contains a Factor B, e.g., rFB, and the second reagent contains Factor C, e.g. rFC. In other configurations, the first reagent contains a Factor C, e.g., rFC, and the second reagent contains Factor B, e.g. rFB. In some configurations, the first reagent also contains a chromogenic or fluorogenic substrate, while in other embodiments, the second reagent contains the substrate. In some configurations, the first reagent also contains a pro-clotting enzyme, e.g., rPCE, while in other embodiments, the second reagent contains the pro-clotting enzyme, e.g., rPCE. In one exemplary configuration, the first reagent contains rFB and rPCE, while the second reagent contains rFC and substrate. In another exemplary configuration, the first reagent contains rFC and rPCE, while the second reagent contains rFB and substrate.

In order to preserve the activity of the reagents during drying, the cartridge halves 2 and 3 are placed in an environment having a temperature from about 4° C. to about 40° C., more preferably, from about 10° C. to about 35° C., more preferably, from about 15° C. to about 30° C., and a relative humidity from about 0% to about 30%, more preferably, from about 2% to about 20%, more preferably from about 4% to about 10%. Preferred drying conditions include a temperature of about 25° C. and a relative humidity of about 5%. In an alternative approach, the factors, e.g., recombinant factors, may be dried via freeze drying, e.g., lyophilization, under standard conditions, about −30° C. to about −40° C. under vacuum.

The dimensions of a particular cartridge 1 may vary depending upon the number and/or type of assays to be performed. However, in one embodiment, as shown schematically in FIG. 2A, for example, the cartridge 1 has a length of about 10.16 cm (4.00"), width of about 2.54 cm (1.00"), and a height of about 0.476 cm (.188"). The bore of the conduit 8 running from the fluid inlet port 4 to the optical cell 6 is about 0.127 cm (0.050"), where a first reagent is dried on a region 14 of the conduit 8 about 2.381 cm (0.938") from the fluid inlet port 4, and a second reagent is dried on a region 16 of the conduit 8 about 4.65 cm (1.831") from the fluid inlet port 4. The optical cell 6 in this embodiment is dimensioned to accommodate about 25 µL of sample.

C. Well Plates

The invention also provides multi-well plates and vials for carrying out the assays disclosed herein.

For example, in one embodiment, a well plate is prepared having a first reagent disposed on a first well and a second reagent disposed on a second well. In one embodiment, the first reagent contains Factor B, e.g., rFB, and the second reagent contains Factor C, e.g., rFC. In another configuration, the first reagent contains Factor C, e.g., rFC, and the second reagent contains Factor B, e.g., rFB. A pro-clotting enzyme, e.g., rPCE, may be disposed in the first well or the second well. A substrate for clotting enzyme, e.g., a chromogenic or fluorogenic substrate, may be disposed in the first well or the second well, or in a third well. For example, in another example, a well plate is prepared having a first reagent disposed on a first well, a second reagent disposed on a second well, and a third reagent disposed on a third well. The first, second, and third reagents are each one of Factor B, e.g., rFB, Factor C, e.g., rFC, and a substrate; only one of these reagents is applied to each of the first, second, and third well. However, pro-clotting enzyme, e.g., rPCE can be applied to any one or more of the first, second, and third wells.

As a final step in preparing the well plates, the reagents are dried on to the well plate, e.g., by air drying or freeze drying under conditions that preserve the activity of the reagents, and are reconstituted by a sample applied when an endotoxin assay is performed on the well plate.

In order to preserve the activity of the reagents during drying, the wells are placed in an environment having a temperature from about 4° C. to about 40° C., more preferably, from about 10° C. to about 35° C., more preferably, from about 15° C. to about 30° C., and a relative humidity from about 0% to about 30%, more preferably, from about 2% to about 20%, more preferably from about 4% to about 10%. Preferred drying conditions include a temperature of about 25° C. and a relative humidity of about 5%. In an alternative approach, the factors, e.g., recombinant factors, may be dried via freeze drying, e.g., lyophilization, under standard conditions, about −30° C. to about −40° C. under vacuum.

D. Vials

The disclosure describes the preparation of vials of amebocyte factors, e.g., Factor C, Factor B, and pro-clotting enzyme, for example, rFC, rFB, and rPCE for use in carrying out endotoxin detection assay.

In one embodiment, a vial is prepared containing stabilized Factor C, e.g., stabilized rFC. The rFC and the vial, itself, are free of rFB. The rFC may also be substantially free of exogenous endotoxin, e.g., may contain only acceptable trace amounts of environmental endotoxin as a contaminant. Accordingly, the rFC is substantially inactive until contacted with a test sample (or control) that contains endotoxin. In another embodiment, a vial is prepared containing stabilized Factor B, e.g., stabilized recombinant Factor B. The rFB and the vial, itself, are free of rFC. The rFB may also be substantially free of exogenous endotoxin. Accordingly, the rFB is substantially inactive until contacted with a test sample (or control) that contains endotoxin.

The stabilized amebocyte factors, e.g., recombinant factors may be in an aqueous solution, e.g., prepared from pyrogen-free, e.g., endotoxin free water or an appropriate buffer. The aqueous solutions may be used for an endotoxin detection assay, or they may be dried in the vial, e.g., by air drying, heating, or lyophilization, and may be later reconstituted in the vial with endotoxin free water to create a solution of the factor for use in an endotoxin detection assay. Vials containing the dried amebocyte factors may be stored, preferably between −20° C. and 25° C., until ready for use.

In another embodiment, a vial is prepared having stabilized recombinant factors therein. The vial is prepared by a method where (i) a first solution containing recombinant Factor C, and a second solution containing recombinant Factor B are provided. The rFC in the first solution and the rFB in the second solution are substantially inactive; (ii) the first and second solutions are combined to produce a third solution under conditions so that the rFC and the rFB remain substantially inactive in the mixture, e.g., until contacted with endotoxin in a test sample (or control). Alternatively, once combined in step (ii), the third solution containing the rFC and rFB can be dried on the surface of a solid support, e.g., by freeze drying or lyophilization so that the rFC and the rFB remain substantially inactive in a dehydrated form. For example, the third solution can be immediately dried on the surface of the solid support, e.g., within about 1 hour, 45 minutes, 30 minutes, 15 minutes, 10 minutes, 5 minutes, or 1 minute of producing the third solution.

The solid support can include, for example, a cartridge, or a vial. In another embodiment, the rPCE is provided in a third solution, and step (ii) above involves mixing the first, second, and third solutions together to produce a mixture of rFC, rFB, and rPCE. The first or second solutions may further include a substrate for the rPCE. Alternatively, the third solution may further include a substrate for the rPCE.

The substrate may be a chromogenic or fluorogenic substrate. For example, the substrate may be a chromogenic substrate with a paranitroaniline group (pNA). For example, the substrate is Ac-Ile-Glu-Gly-Arg-pNA (SEQ ID NO:13), or Ac-Ile-Glu-Gly-Lys-pNA (SEQ ID NO:14). For example, the Factor C, Factor B or pro-clotting enzyme is a *Limulus polyphemus*, *Tachypleus tridentatus*, or *Carcinoscorpius rotundicauda* Factor C, Factor B or pro-clotting enzyme, e.g., rFC, rFB, or rPCE.

E. General Considerations

In fabricating the cartridge, well plates, or vials of the invention, it may be helpful to combine the factors, e.g., recombinant factors, and/or substrate (e.g., a chromogenic or fluorogenic substrate) with one or more resolubilizing agents, such as a sugar or salt, and/or one or more anti-flaking agents, such as a polymer, prior to drying the factors onto a well, or a vial, or a solid support, e.g., a cartridge.

The resolubilizing agent preferably stabilizes the factors, e.g., the recombinant factors in the dried form and facilitates resolubilization of the reagents during the assay. Useful resolubilizing agents include, for example, mannitol, mannose, sorbitol, trehalose, maltose, dextrose, sucrose, and other monosaccharides and disaccharides.

The anti-flaking agent can be used to prevent or reduces the likelihood that the factors, e.g., recombinant factors, and/or chromogenic substrate become disassociated from a solid support in the form of a dry flake. The anti-flaking agent preferably also stabilizes the factors, e.g., the recombinant factors, and/or chromogenic substrate in the dried form. Useful anti-flaking agents include, for example, one or more polymers, including, for example, polyethylene glycol, polyvinyl pyrrolidone, dextrans, mannitol, and proteins, for example, serum albumin.

Anti-frothing agents may also be added to the factors, e.g., the recombinant factors, prior to drying the factors onto a well, or a vial, or a solid support, e.g., a cartridge. Certain polymers reduce the formation of air bubbles (e.g., frothing) when the factors, e.g., the recombinant factors, and/or chromogenic substrate are resolubilized. Useful anti-frothing agents include polyvinyl alcohol and polypropylene glycol.

VIII. Specimen Collection and Preparation Considerations

In general, materials used to harvest, store, or otherwise contact a sample to be tested, as well as test reagents, should be free of microbial contamination, for example, should be pyrogen-free. Materials may be rendered pyrogen-free by, for example, heating at 250° C. for 30 minutes. Appropriate precautions should be taken to protect depyrogenated materials from subsequent environmental contamination.

The recombinant amebocyte clotting factors disclosed herein may be used to measure the presence or amount of a microbial endotoxin in a sample of interest, for example, in a fluid, for example, a fluid to be administered locally or systemically, for example, parenterally to a mammal, or a body fluid to be tested for infection, including, for example, blood, lymph, urine, serum, plasma, ascites fluid, lung aspirants, and the like. In addition, the assays may be used to detect a microbial endotoxin present on a surface. For example, the surface of interest is swabbed and the swab then is introduced into or dissolved in liquid. The liquid can then be assayed as described herein.

IX. Kits

The invention provides kits of parts used to perform an assay to determine the presence and/or amount of endotoxin in a sample of interest.

The disclosure provides a kit for determining the presence and/or amount of a bacterial endotoxin in a sample includes a first composition containing rFC, and free of rFB. The kit also includes a second composition containing rFB, and is free of rFC. The kit optionally further comprises means (e.g., a vial or test tube, stirrer (e.g., spatula, spoon etc.), dispensing tool (e.g., pipette tip, syringe etc.)) for mixing the first and second compositions together in the presence of recombinant pro-clotting enzyme and a chromogenic substrate.

In some embodiments, the kit may further comprise a third composition comprising a chromogenic substrate for a pro-clotting enzyme (rPCE), for example, Ac-Ile-Glu-Gly-Arg-pNA (SEQ ID NO:13) or Ac-Ile-Glu-Gly-Lys-pNA (SEQ ID NO:14).

Depending upon the circumstances, the first composition or the second composition further comprises a rPCE. Alternatively or in addition, the kit includes a fourth composition comprising rPCE.

In some embodiments, the rFC in the first composition is substantially inactive and/or the rFB is substantially inactive, e.g., until contacted with endotoxin from a test sample (or control).

In one embodiment, the first, and second compositions, and the third and fourth compositions, if provided, are dried on a solid support, e.g., on one or more fluid contacting surfaces of a cartridge. In another embodiment, the first and second compositions, and third and fourth compositions, if provided, are each dried on a surface of a corresponding first, second, third or fourth container, e.g., wells or vials. The kit may further include pyrogen free, e.g., endotoxin free, water for reconstituting the dried compositions in each container.

Alternatively, a kit for determining the presence and/or amount of a bacterial endotoxin in a sample can comprise a first stabilized solution containing rFC, wherein the rFC is substantially inactive; a second stabilized solution containing a rFB, wherein the rFB is substantially inactive; and a composition comprising a chromogenic substrate for a rPCE. In some embodiments, the first stabilized solution or the second stabilized solution further comprises a rPCE. In other embodiments, the kit further comprises a third stabilized solution comprising rPCE. In some embodiments, the kit has a shelf-life of at least 6 months.

Alternatively, a kit for determining the presence and/or amount of a bacterial endotoxin in a sample can comprise a first dehydrated composition comprising rFC, wherein the rFC is substantially inactive, e.g., in the absence of endotoxin from a test sample or control a second dehydrated composition including a rFB, wherein the rFB is substantially inactive, e.g., in the absence of endotoxin from a test sample or control; and a third dehydrated composition comprising a chromogenic substrate for a pro-clotting enzyme (rPCE). In some embodiments, the first dehydrated composition or the second dehydrated composition further comprises rPCE, while in other embodiments, the kit further comprises a fourth dehydrated composition comprising rPCE. In some embodiments, each dehydrated composition is disposed within a separate container. In yet other embodiments, each dehydrated composition is disposed within a cartridge for determining the presence and/or amount of bacterial endotoxin in a sample of interest.

EXAMPLES

The following Examples are merely illustrative and are not intended to limit the scope or content of the invention in any way.

I. Example 1

Preparation of Recombinant Lysate Factors

Recombinant *Limulus polyphemus* factors rFB, rFC, and rPCE were prepared as follows. DNA sequences encoding *Limulus polyphemus* Factor C, Factor B and pro-clotting enzyme (with codon usage optimized for expression in mammalian cells) were cloned into expression plasmid BD609 (ATUM). The amino acid sequence of *Limulus polyphemus* Factor C is depicted in SEQ ID NO: 2. The amino acid sequence of *Limulus polyphemus* Factor B is depicted in SEQ ID NO: 4. The amino acid sequence of *Limulus polyphemus* pro-clotting enzyme is depicted in SEQ ID NO: 6. Expression plasmids were transfected into HEK-293 cells using the FreeStyle 293 Expression System (Thermo Fisher) to generate a stable clonal cell lines.

For expression and purification, HEK-293 cells were thawed and added to FreeStyle 293 Expression Media in a flask. Cells were grown at 37° C., 5-7% $CO_2$ at 120 rpm and passaged every 24-72 hours. When cells reached the desired volume and density, they were used to seed a total of 20 L of culture in a WAVE Bioreactor. After 72 hours, the supernatant was harvested by centrifugation at 4,000×g for 15 minutes followed by sterile filtration. The supernatant was concentrated to <2 L and buffer exchanged by Tangential Flow Filtration (TFF, GE Life Sciences). The TFF system was equilibrated with 20 mM Tris-HCl buffer pH 8.0 containing 20 mM NaCl. The supernatant can also be used directly without further purification in various experiments to, for example, study the formulation of the factor or performance of the factors.

To mitigate endotoxin exposure, all materials used were single use. Water for injection was used for all buffers, and all buffers were made on the day of use.

Each of the factors was formulated separately in a buffered solution until ready for use.

International Patent Application Publication No. WO 2022/174082 describes making recombinant factors (e.g., rFB, rFC, and rPCE) from *Tachypleus tridentatus*, as described below.

In particular, DNA sequences encoding *Tachypleus tridentatus* Factor C, Factor B and pro-clotting enzyme (with codon usage optimized for expression in mammalian cells) were cloned into expression plasmid BD609 (ATUM). The amino acid sequences of *Tachypleus tridentatus* Factor C are depicted in SEQ ID Nos: 7 and 8, where SEQ ID NO: 7 is the mature form whereas SEQ ID NO: 8 is the Factor C protein that still includes the signal sequence as residues 1-21. The amino acid sequences of *Tachypleus tridentatus* Factor B are depicted in SEQ ID NOs: 9 and 10, where SEQ ID NO:9 is the mature form, whereas SEQ ID NO:10 is the Factor B protein that still includes the signal sequence as residues 1-22. The amino acid sequences of *Tachypleus tridentatus* pro-clotting enzyme are depicted in SEQ ID NOs: 11 and 12, where SEQ ID NO:11 is the mature form, whereas SEQ ID NO: 12 is the pro-clotting enzyme that still includes the signal sequence as residues 1-21). Expression plasmids were transfected into HEK-293 cells using the FreeStyle 293 Expression System (Thermo Fisher) to generate a stable clonal cell lines.

For expression and purification, HEK-293 cells were thawed and added to FreeStyle 293 Expression Media in a flask. Cells were grown at 37° C., 5-7% $CO_2$ at 120 rpm and passaged every 24-72 hours. When cells reached the desired volume and density, they were used to seed a total of 20 L of culture in a WAVE Bioreactor. After 72 hours, the supernatant was harvested by centrifugation at 4,000×g for 15 minutes followed by sterile filtration. The supernatant was concentrated to <2 L and buffer exchanged by Tangential Flow Filtration (TFF, GE Life Sciences). The TFF system was equilibrated with 20 mM Tris-HCl buffer pH 8.0 containing 20 mM NaCl. The supernatant can also be used directly without further purification in various experiments, for example, to study the formulation of the factors or performance of the factors.

To mitigate endotoxin exposure, all materials used were single use. Water for injection was used for all buffers, and all buffers were made on the day of use.

Each of the factors was formulated separately in a buffered solution until ready for use.

II. Example 2

Evaluating the Stability of a Mixture Containing Three Factors (rFC, rFB, and rPCE)

In order to determine the impact of various combinations of factors on stability of the overall formulation, a number of assays were performed using the recombinant factors. Testing was performed on multi-well plates using solutions of recombinant factors and other reagents, as well as in test tubes, to simulating the planned sequence of the reaction on the cartridge.

To evaluate whether the recombinant factors could be formulated together in a synthetic cascade reagent solution (assay reagent) as is the case with commercially available bacterial endotoxin tests made from native amebocyte lysate, the stability of a mixture of rFB, rFC, and rPCE was evaluated at 5° C.

Supernatants containing *Limulus polyphemus* rFC, rFB, and rPCE, respectively, from the cell cultures generated as described in Example 1, and not subject to TFF purification, were used to prepare an aqueous solution containing 12% rFC, 12% rFC, and 12% rPCE (each by volume). To stabilize the factors in solution, the pH of the solution was lowered by addition of 1 mM HEPES (pH 5.3) to about pH 6 and the solution was maintained at 5° C.

Within 15 minutes of performing the experiment described below to measure onset times following different periods of incubation, the solution described above was mixed with substrate (10 mM S2423, Ac-Ile-Glu-Gly-Arg-pNA (SEQ ID NO:13)) and 100 mM HEPES buffer (pH 7.6) containing 2% NaCl and 24 mM $MgSO_4$. The final synthetic cascade reagent contained 5% rFC, 5% rFB, 5% rPCE, 0.75 mM substrate, 12 mM $MgSO_4$, and 1% NaCl in 50 mM HEPES buffer pH 7.6. Samples (0.1 mL each of water for negative controls (NC) and endotoxin standards at 0.01, 0.1, and 1 EU/mL) were distributed in a 96-well microplate (M9005, Charles River), and the same amount of the final reagent was added to each well. The absorbance at 405 nm was monitored by a microplate reader (BioTek Elx 808™, BioTek Instruments, Inc., Winooski, VT) at 37° C., and onset time of each sample was measured. Onset time was defined as a reaction time to reach a predetermined absorbance (onset OD, 0.05 for this experiment). Accordingly, the higher the activity of the sample, the shorter the onset time.

Figure 5A:
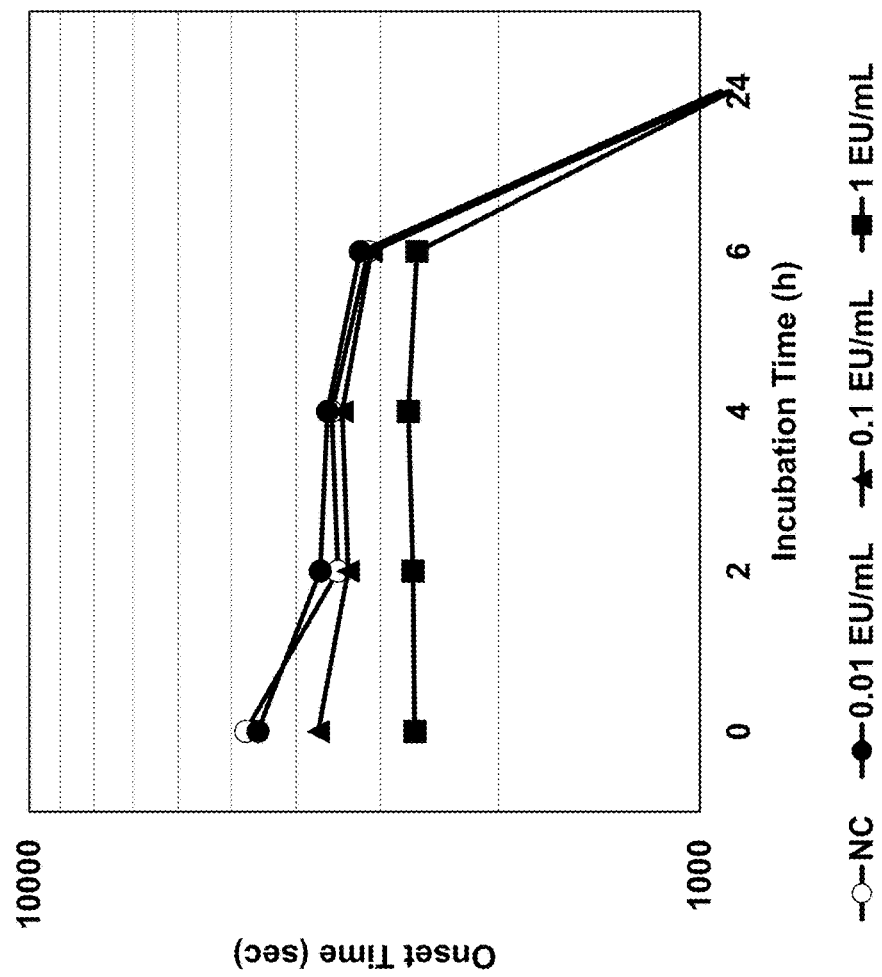
FIGS. 5A-B are graphs showing the onset time (in seconds) over time (at 0 hours, 2 hours, 4 hours, 6 hours, and 24 hours) of endotoxin samples (0 EU/mL (negative control "NC"), 0.01 EU/mL, 0.1 EU/mL or 1.0 EU/mL) contacted with a cascade reagent prepared by mixing of the two solutions prepared in Example 2 and stored at 5° C.

FIG. 5A shows the stability of the solution as tested at 0 h, 2 h, 4 h, 6 h and 24 h after preparing the final synthetic cascade (assay) reagent solution. The onset times of NC and 0.01 EU/mL endotoxin were shortened after 2 h, and there was no difference between NC and 0.1 EU/mL endotoxin. This indicated that the solution was activated, and the reagent could not detect 0.1 EU/mL endotoxin after 2 h. The solution was completely activated after 24 h. The results indicated that, contrary to what was expected, the synthetic cascade reagent solution containing all three factors was not stable even at 5° C. at a low pH.

III. Example 3

Separating rFC from rFB Improves the Stability of the Factor Solutions Used to Make the Assay Reagent This experiment demonstrates the significance of separating rFC from rFB.

To examine the effect of separation of rFC on stability, two solutions were prepared. The first solution contained 15.4% rFC with 1 mM HEPES (pH 5.3). The second solution contained 7.4% rFB, 7.4% rPCE, 1.1 mM substrate, 1.4% NaCl, 17.8 mM $MgSO_4$, and 74.1 mM HEPES buffer pH 7.6. The *Limulus polyphemus* factors used to create the solutions were the supernatants from the cell culture, i.e., the factors obtained before the TFF concentration step described in Example 1. The two solutions were mixed at the ratio of 0.65:1.35 (first solution (rFB) to second solution (rFC)) to form the synthetic cascade (assay) reagent within 15 minutes before contact with an endotoxin standard. The final reagent was therefore composed of 5% rFC, 5% rFB, 5% rPCE, 0.75 mM substrate, 12 mM MgSO$_4$, and 1% NaCl in 50 mM HEPES buffer pH 7.6. The final concentrations were the same as Example 2. Onset time measurements following exposure to different concentrations of endotoxin standard were performed at different time points following preparation of the initial two solutions (0 h, 2 h, 4 h, 6 h, and 24 h) as in Example 2.

Figure 5B:
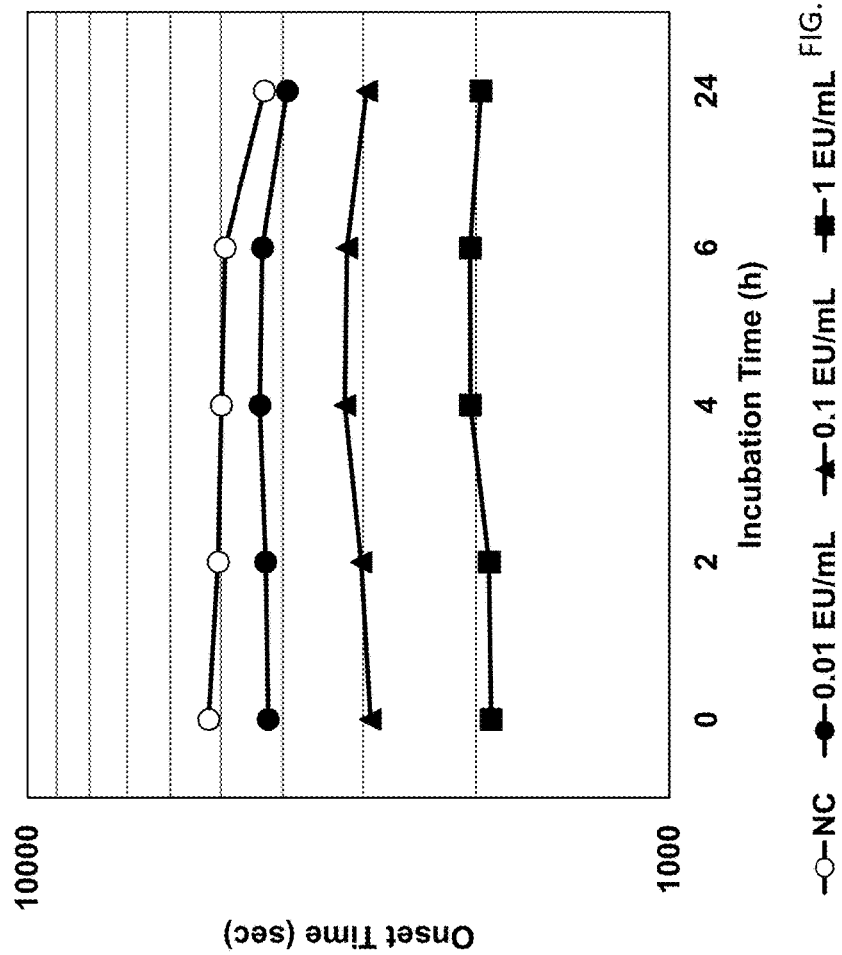

FIG. 5B shows the effect of rFC separation on the stability of the solutions. The results clearly indicate that the solutions were much more stable than the solution in Example 2 where rFC and rFB were mixed together in the initial solution. This is apparent based on the generally consistent onset time for all samples at the time periods tested. This indicated that separating rFC from the other factors in the initial solution yielded a stable synthetic cascade assay reagent.

IV. Example 4

Effect of Temperature on the Stability of the Factor Solutions Used to Make the Assay Reagent (25° C.)

To study the effect of temperature on the stability of the solutions used to make a synthetic cascade assay reagent, two solutions were prepared. The first solution contained 0.6% rFC and 3.3 mM substrate (S2834, Ac-Ile-Glu-Gly-Lys-pNA (SEQ ID NO:14)). The second solution contained 1.4% rFB, 5.8% rPCE, 100 mM MgSO$_4$, 72.8% 250 mM HEPES buffer pH 7.4 containing 1.6% Dextran and 5% NaCl. The *Limulus polyphemus* factors were prepared as described in Example 1 including TFF purification and concentration. At different time points (i.e., 0 min, 10 min, 20 min, 30 min, and 60 min, measured from the time of preparing the first and second solutions) a 0.1 mL of a sample (NC) was added to a glass tube containing 0.05 mL of each of the two solutions and 0.05 mL of a solution containing 0.1% polyvinyl alcohol and 1% mannitol. For each time point measurement, the glass tube was set on a tube reader (Fujifilm Wako, Japan), and endotoxin was measured with a kinetic chromogenic assay at 37° C. Onset time was defined as the reaction time to reach a certain absorbance (onset OD, 95% of initial light strength for this experiment). The first and second solutions were kept at 25° C., and the mixture of the solutions in the glass tube to form the synthetic cascade (assay) reagent was prepared within 15 minutes before each assay was performed.

Figure 6:
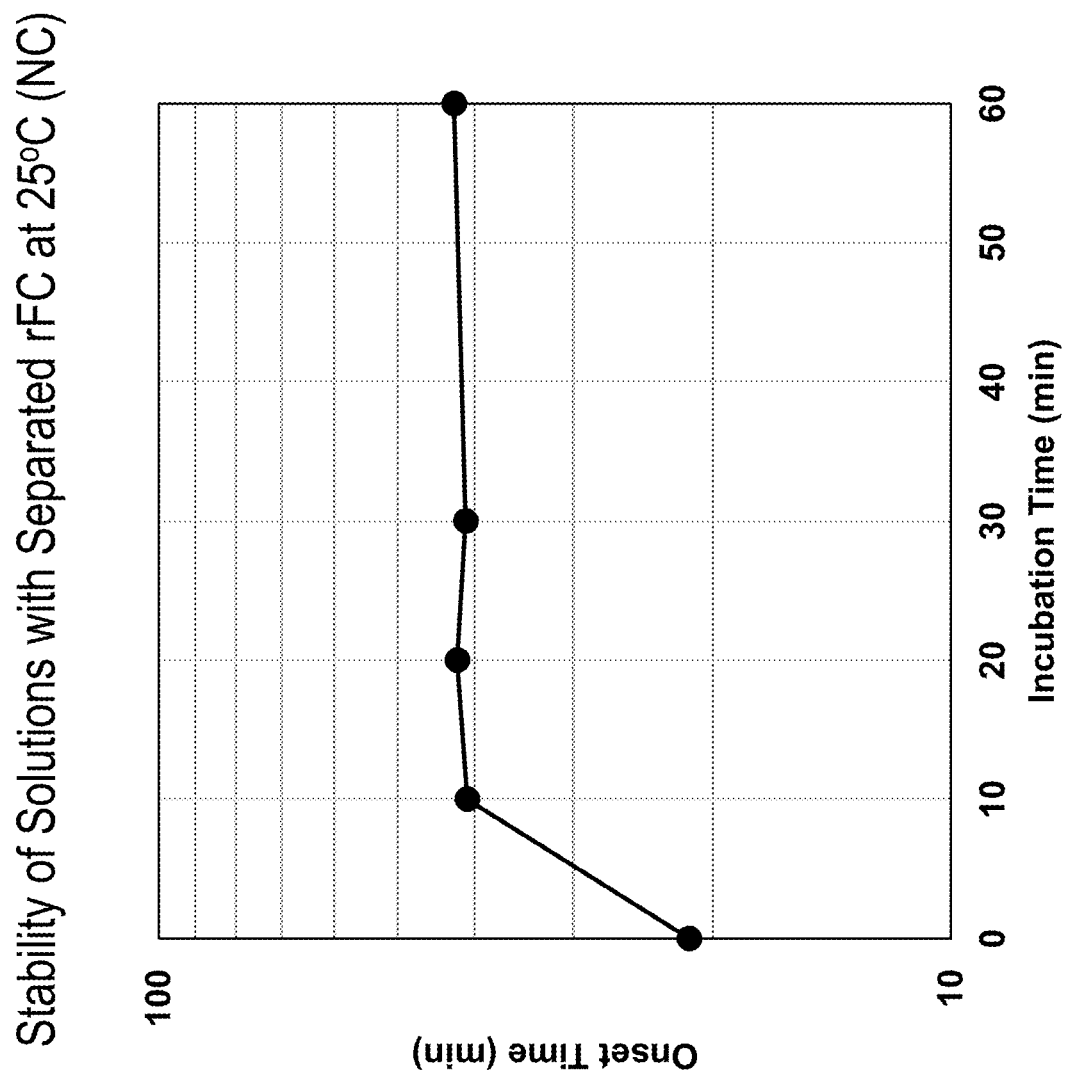
FIG. 6 is a graph showing onset time (in minutes) over time (at 0 mins, 10 mins, 20 mins, 30 mins, and 60 mins) of negative control (NC) samples where a solution of rFC was kept separate from a solution of rFB and rPCE and maintained at 25° C. before mixing the solutions together prior to performance of the assay.

FIG. 6 shows the stability of the solutions over time. As seen, an unacceptable level of inactivation of the solution was observed in the first 10 min at 25° C. Thus, maintaining the factor solutions at a temperature of 25° C. prior to formation of the assay reagent was found to negatively impact the stability of the solutions used to make the synthetic cascade assay reagent.

V. Example 5

Effect of Temperature on the Stability of the Factor Solutions Used to Make the Assay Reagent (10° C.)

To further study the effect of temperature on stability of the factor solutions used to make a synthetic cascade reagent, two solutions were prepared. The first solution contained 0.6% rFC, 100 mM MgSO$_4$, and 3.3 mM substrate (S2834, Ac-Ile-Glu-Gly-Lys-pNA (SEQ ID NO:14)). The second solution contained 1.4% rFB, 5.8% rPCE, 82.8% 250 mM HEPES buffer pH 7.4 containing 1.6% Dextran and 5% NaCl. The *Limulus polyphemus* factors were prepared as described in Example 1 including TFF purification and concentration. At different time points, a 0.1 mL of a sample (NC) was added to a glass tube containing 0.05 mL each of the two solutions and 0.05 mL of a solution containing 0.1% polyvinyl alcohol and 1% mannitol. Onset time measurements were taken at different time points as described in Example 4, except the time points used were 0 min, 20 min, 40 min, 60 min, 120 min and 180 min measured from the time of preparing the first and second solutions. The first and second solutions were kept at 10° C., and mixed together to form the synthetic cascade (assay) reagent within 15 minutes prior to performance of the assay.

Figure 7:
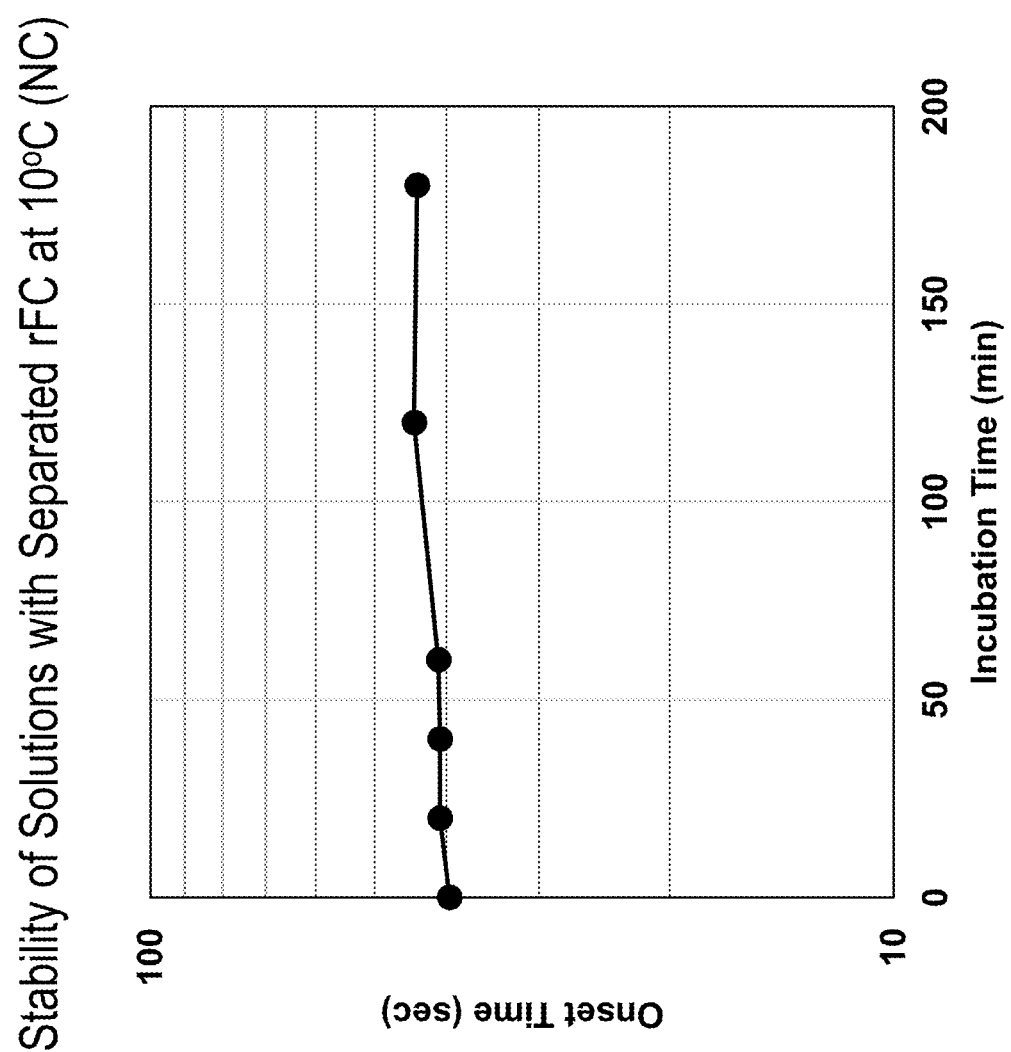
FIG. 7 is a graph showing onset time (in seconds) over time (at 0 mins, 20 mins, 40 mins, 60 mins, 120 mins, and 180 mins) of NC samples where a solution of rFC was kept separate from a solution of rFB and rPCE and maintained at 10° C. before mixing the solutions together prior to performance of the assay.

FIG. 7 shows the stability of the solutions at 10° C. over time, as demonstrated by the relatively stable onset times over the time points tested. There was no significant inactivation observed for 3 h at 10° C. indicating that the solutions remained stable prior to formation of the assay reagent.

VI. Example 6

Effect of Temperature on Stability of the Factor Solutions Used to Make the Assay Reagent (37° C.)

To further study the effect of temperature on stability of the factor solutions used to make the synthetic cascade reagent, two solutions were prepared. The first solution contained 0.6% rFC and 3.3 mM substrate (S2834, Ac-Ile-Glu-Gly-Lys-pNA (SEQ ID NO:14)). The second solution contained 1.4% rFB, 5.8% rPCE, 300 mM MgSO$_4$, 52.8% 250 mM HEPES buffer pH 7.4 containing 1.6% Dextran and 5% NaCl. The *Limulus polyphemus* factors were prepared as described Example 1 including TFF purification and concentration. At different time points (i.e., 0 min, 5 min, 10 min, 20 min, 30 min) after preparation of the first and second solutions, a 0.1 mL of a sample (NC) was added to a glass tube containing 0.05 mL each of the two solutions and 0.05 mL of a solution containing 0.1% polyvinyl alcohol and 1% mannitol. Measurement was performed the same as in Example 4. The first and second solutions were kept at 37° C., and mixed together to form the synthetic cascade (assay) reagent within 15 minutes prior to the performance of the assays.

Figure 8:
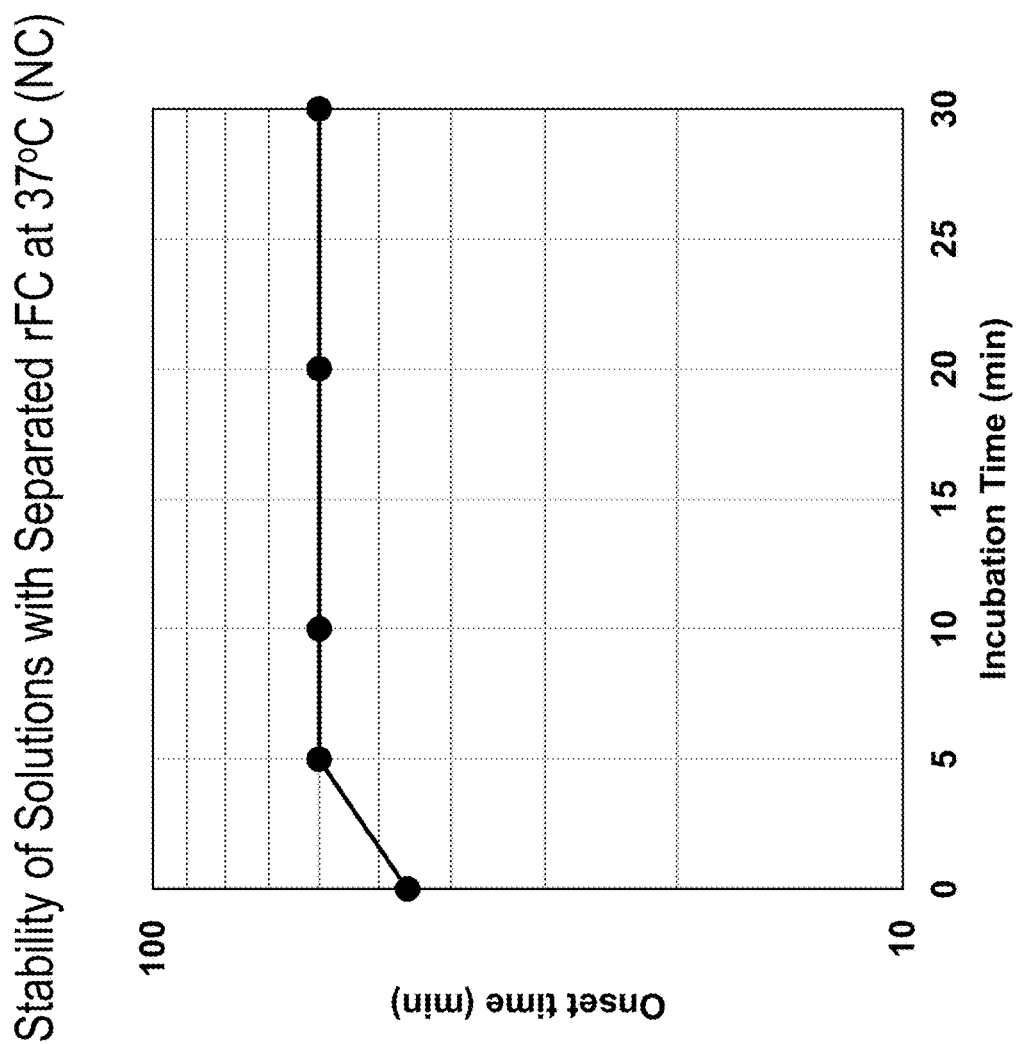
FIG. 8 is a graph showing onset time (in minutes) over time (at 0 mins, 5 mins, 10 mins, 20 mins, and 30 mins) of NC samples where a solution of rFC was kept separate from a solution of rFB and rPCE were prepared and maintained at 37° C. before mixing the solutions together prior to performance of the assay.

FIG. 8 shows the stability of the solutions. Inactivation of the solution was observed in the first 5 min. The results of Examples 4-6 suggest that the inactivation is temperature dependent, and lower storage temperatures are required for stability of the first and second solutions under conditions where substrate is included in the rFC solution.

VII. Example 7

Effect of Temperature on the Stability of rFB Separated Solutions Used to Make the Assay Reagent (25° C.)

To examine the effect of separation of rFB from rFC and rPCE on stability of the factor solutions used to make the synthetic cascade reagent, two solutions were prepared. The first solution contained 1.4% rFB, and 3.3 mM substrate (S2834, Ac-Ile-Glu-Gly-Lys-pNA (SEQ ID NO:14)). The second solution contained 0.6% rFC, 5.8% rPCE, 100 mM MgSO$_4$, 68.6% 250 mM HEPES buffer pH 7.4 containing 1.6% Dextran and 5% NaCl. The *Limulus polyphemus* factors were prepared as described in Example 1 including TFF purification and concentration. At different time points (i.e., 0 min, 10 min, 20 min, 30 min, 60 min, and 135 min) after preparation of the first and second solutions, 0.1 mL of a sample (NC) was added to a glass tube containing 0.05 mL each of the two solutions and 0.05 mL of a solution containing 0.1% polyvinyl alcohol and 1% mannitol. Measurement was performed the same as in Example 4. The solutions were kept at 25° C., and mixed together to form the synthetic cascade (assay) reagent within 15 minutes prior to performance of the assays.

Figure 9:
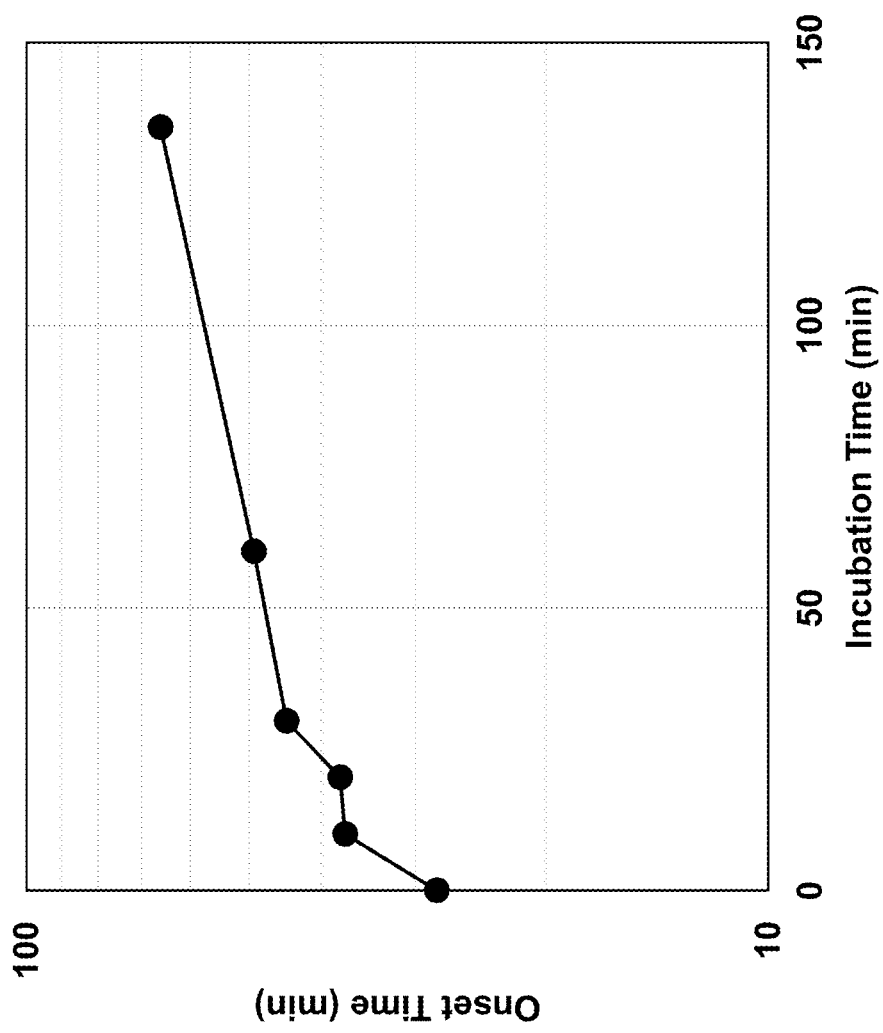
FIG. 9 is a graph showing onset time (in minutes) at different time intervals (at 0 mins, 10 mins, 20 mins, 30 mins, 60 mins and 135 mins) of NC samples where a solution of rFB was kept separate from a solution of rFC and rPCE and maintained at 25° C. before mixing the solutions together prior to performance of the assay.

FIG. 9 shows the stability of the solutions. Gradual and unacceptable inactivation was observed in the rFB separated solutions (which included substrate) at 25° C.

VIII. Example 8

Effect of Substrate on Stability of Factor Solutions Used to Make the Assay Reagent (25° C.)

To examine the potential cause of the inactivation of the solutions, three solutions were prepared. The first solution was 1.2% rFC. The second solution was 6.6 mM substrate (S2834, Ac-Ile-Glu-Gly-Lys-pNA (SEQ ID NO:14)). The third solution contained 1.4% rFB, 5.8% rPCE, 100 mM MgSO$_4$, 72.8% 250 mM HEPES buffer pH 7.4 containing 1.6% Dextran and 5% NaCl. The *Limulus polyphemus* factors were prepared as described Example 1 including TFF purification and concentration. At different time points after preparation of the first, second, and third solutions, 0.1 mL of a sample (NC) was added to a glass tube containing 0.025 mL each of the first and the second solutions, 0.05 mL of the third solution, and 0.05 mL of a solution containing 0.1% polyvinyl alcohol and 1% mannitol. The composition of the reagent mixture was the same as that in Example 4. The glass tube was set on a tube reader (Fujifilm Wako, Japan), and endotoxin was measured with a kinetic chromogenic assay at 37° C. The solutions were kept at 25° C., and mixed together to prepare the synthetic cascade assay reagent within 15 minutes before the performance of each of the assays.

Figure 10:
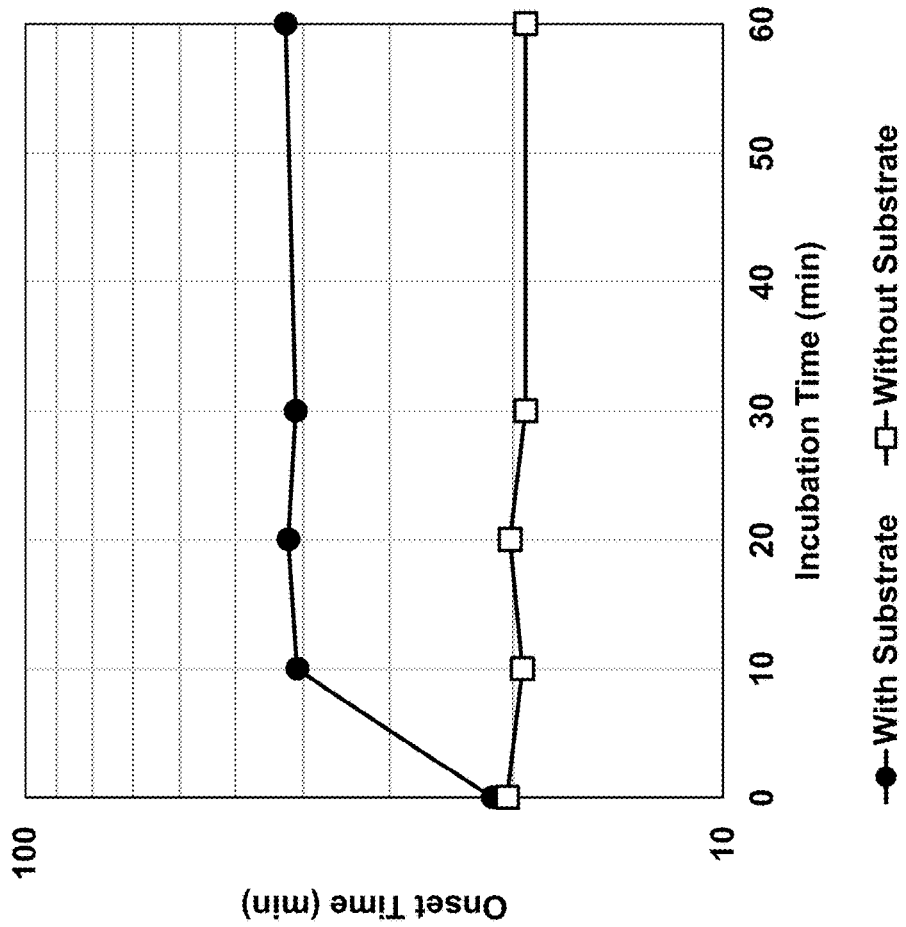
FIG. 10 is a graph showing the stability of solutions where rFC was separated from the other factors (in the absence or presence of substrate) at 25° C. The line denoted by open squares) shows the onset time of the solutions in the absence of substrate over time where a solution of rFB and rPCE was prepared separately from a solution of rFC. The data from FIG. 6 (closed circles, ●), where the rFC was prepared in a solution with substrate, is included for comparison purposes.

FIG. 10 shows the stability of the solutions (open squares) where the substrate was maintained separately from the factors. The results of Example 4 (FIG. 6), where rFC and substrate were mixed in the initial solution, is shown (closed circles) for comparison purposes because the reagent composition produced by the mixture of the two solutions prepared in Example 4 had the same components as the reagent composition produced in this example by the mixture of the three solutions. Unlike in Example 4, significant inactivation of the solution was not observed, indicating that a potential cause of the inactivation of the solutions at higher temperatures was the presence of substrate with a factor in the solution. The separation of substrate from the factors was effective to stabilize the solutions.

IX. Example 9

Effect of rFC Separation on The Stability of the Factor Solutions Used to Make the Assay Reagent Under Substrate Separated Conditions (25° C.)

Figure 11:
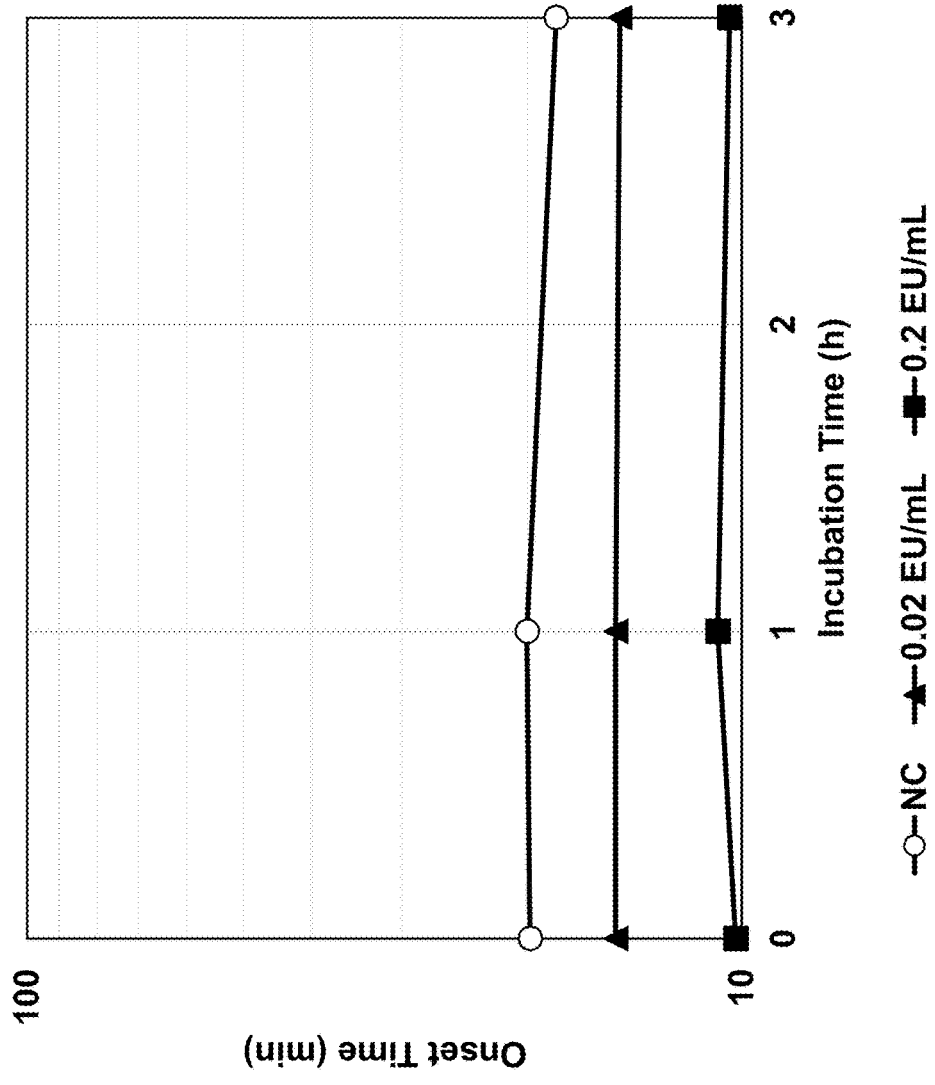
FIG. 11 is a graph showing the onset time (minutes) for samples (NC, 0.02 EU/mL endotoxin, and 0.2 EU/mL endotoxin) over time where the assay reagent was prepared using three separate solutions, one containing rFC, one containing rFB and rPCE, and the other containing substrate. The solutions were maintained separately at 25° C. until mixed together prior to contact with the test samples. The stable onset times over the different time intervals show that the solutions remained stable and that the separation of rFC from, e.g., rFB and rPCE, and e.g., substrate, was effective to stabilize the solutions.

To examine the stability of the factor solutions with separated rFC and separated substrate, three solutions were prepared. The first solution contained 1.2% rFC, 63 mM MgSO$_4$, 43.3% 250 mM HEPES buffer pH 7.4 containing 1.6% Dextran and 5% NaCl. The second solution contained 1.4% rFB, 5.8% rPCE, 63 mM MgSO$_4$, 40.7% 250 mM HEPES buffer pH 7.4 containing 1.6% Dextran and 5% NaCl. The third solution contained 3.3 mM substrate (S2834, Ac-Ile-Glu-Gly-Lys-pNA (SEQ ID NO:14)), 0.1% polyvinyl alcohol, and 1% mannitol. The *Limulus polyphemus* factors were prepared as described in Example 1 including TFF purification and concentration. At different time points (0 h, 1 h, and 3 h) after preparation of the first, second, and third solutions, a 0.1 mL of a sample (NC, 0.02 EU/mL, or 0.2 EU/mL) was added to a glass tube containing 0.05 mL each of the three solutions. Endotoxin was measured with a kinetic chromogenic assay at 37° C. and measurements were performed as in Example 4. The three solutions were kept separately at 25° C., and mixed together to prepare the synthetic cascade assay reagent within 15 minutes before the assays were performed. FIG. 11 shows the stability of the solutions over time. The solutions were stable at 25° C. for at least 3 h. This indicated that the separation of rFC from other factors (e.g., from rFB) was effective to stabilize the solutions.

X. Example 10

Effect of rFB Separation on the Stability of the Factor Solutions Used to Make the Assay Reagent Under Substrate Separated Condition (25° C.)

Figure 12:
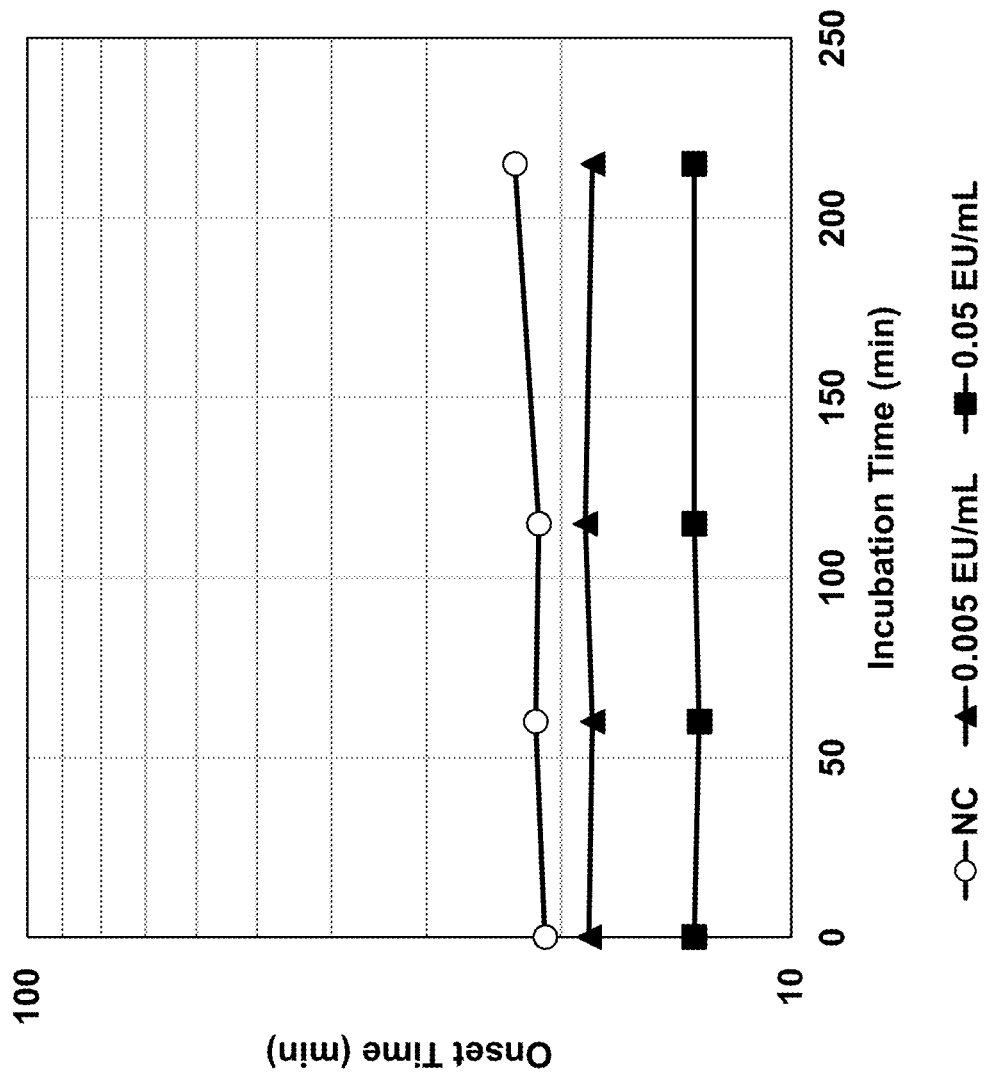
FIG. 12 is a graph showing the onset time (minutes) for samples (NC, 0.005 EU/mL endotoxin, and 0.05 EU/mL endotoxin) at over time (0 mins, 60 mins, 120 mins, and 220 mins) where the assay reagent was prepared using three separate solutions, one containing rFC and rPCE, one containing rFB, and the other containing substrate. The solutions were maintained separately at 25° C. until mixed together prior to contact with the test samples. The stable onset times over the different time intervals show that the solutions remained stable and that the separation of rFB from, e.g., rFC and rPCE, and e.g., substrate, was effective to stabilize the solutions.

To examine the stability of the factor solutions with separated rFB and separated substrate, three solutions were prepared. The first solution contained 1.4% rFB, 63 mM MgSO$_4$, 50.0% 250 mM HEPES buffer pH 7.4 containing 1.6% Dextran and 5% NaCl. The second solution contained 0.6% rFC, 5.8% rPCE, 63 mM MgSO$_4$, 50.0% 250 mM HEPES buffer pH 7.4 containing 1.6% Dextran and 5% NaCl. The third solution contained 3.3 mM substrate (S2834, Ac-Ile-Glu-Gly-Lys-pNA (SEQ ID NO:14)), 0.1% polyvinyl alcohol, and 1% mannitol. The *Limulus polyphemus* factors were prepared as described in Example 1 including TFF purification and concentration. At different time points (0 mins, 60 mins, 120 mins, and 220 mins) after preparation of the first, second, and third solutions, 0.1 mL of a sample (NC, 0.005 EU/mL or 0.5 EU/mL) was added to a glass tube containing 0.05 mL each of the three solutions. Endotoxin was measured with a kinetic chromogenic assay at 37° C. the same as described in Example 4. The three solutions were kept separately at 25° C., and mixed together to prepare the synthetic cascade assay reagent within 15 minutes before the assays were performed. FIG. 12 shows the stability of the solutions. The three solutions were stable at 25° C. for at least 3 h. This indicated that the separation of rFB from other factors (e.g., rFC and rPCE) was effective to stabilize the solutions.

XI. Example 11

Effect of rPCE Separation on the Stability of the Factor Solutions Used to Make the Assay Reagent Under Substrate Separated Condition (25° C.)

To examine the effect of factor solutions with rPCE separated on stability, three solutions were prepared. The first solution contained 5.8% rPCE, 63 mM MgSO$_4$, 41.5% 250 mM HEPES buffer pH 7.4 containing 1.6% Dextran and 5% NaCl. The second solution contained 1.2% rFC, 1.4% rFB, 63 mM MgSO$_4$, 43.0% 250 mM HEPES buffer pH 7.4 containing 1.6% Dextran and 5% NaCl. The third solution contained 3.3 mM substrate (S2834, Ac-Ile-Glu-Gly-Lys-pNA (SEQ ID NO:14)), 0.1% polyvinyl alcohol, and 1% mannitol. The *Limulus polyphemus* factors were prepared as described in Example 1 including TFF purification and concentration. At different time points (0 h, 1 h, and 2 h) after preparation of the first, second, and third solutions, a 0.1 mL of a sample (NC, 0.002 EU/mL, or 0.02 EU/mL) was added to a glass tube containing 0.05 mL each of the three solutions. Endotoxin was measured with a kinetic chromogenic assay at 37° C. the same as described Example 4. The three solutions were kept separately at 25° C., and mixed together to prepare the synthetic cascade assay reagent within 15 minutes prior to performance of the assays.

Figure 13:
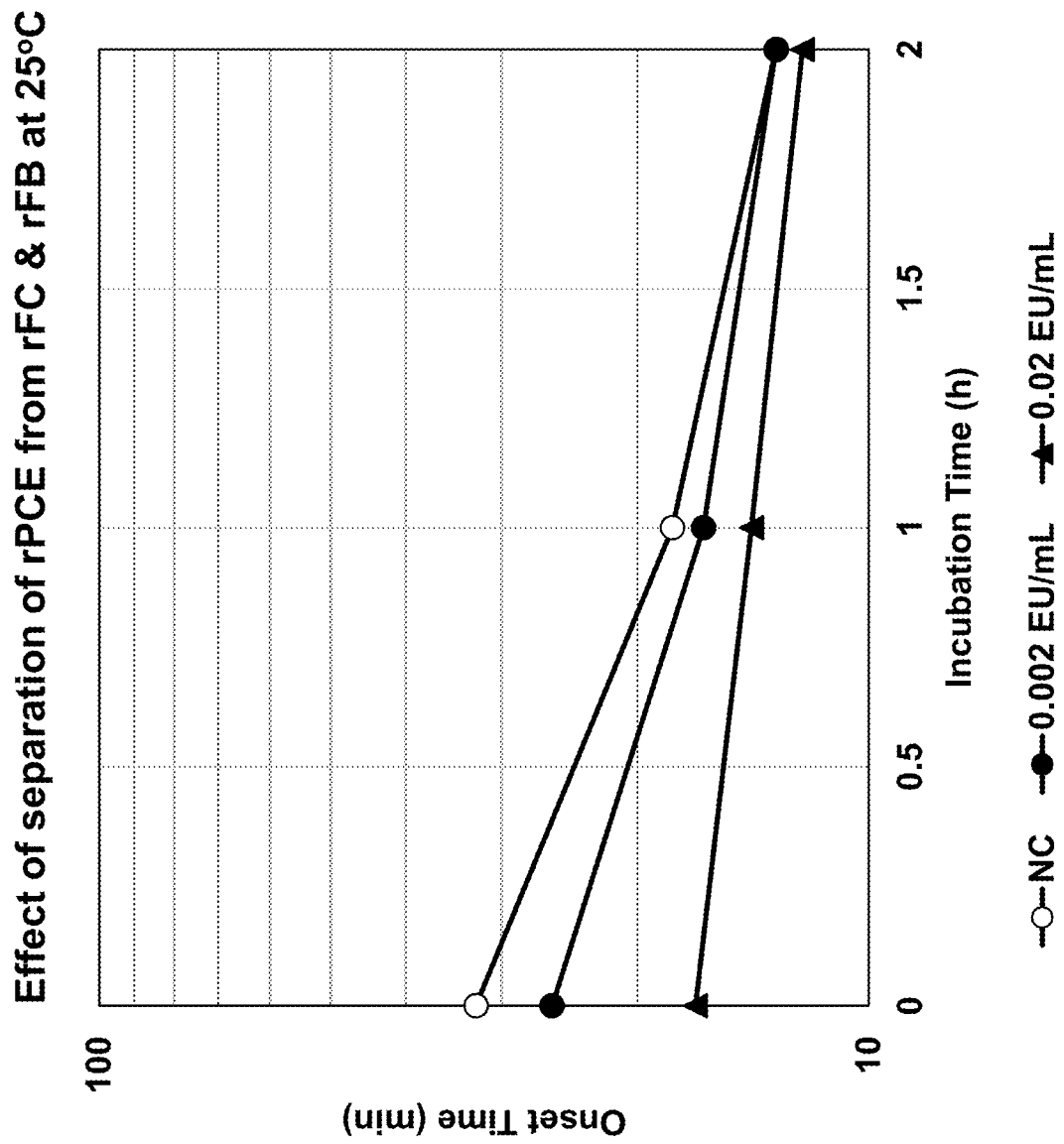
FIG. 13 is a graph showing the onset time (in minutes) of samples (0 EU/mL endotoxin, NC, 0.002 EU/mL endotoxin, or 0.02 EU/mL endotoxin) over time (0 hours, 1 hour, and 2 hours) where the assay reagent was prepared using three solutions, one containing rPCE, one containing a mixture of rFC and rFB and another containing substrate. The solutions were maintained separately at 25° C. until mixed together prior to contact with the test samples. The decreasing onset times over time shows that the separation of rPCE from other factors was not effective to stabilize the solutions.

As shown in FIG. 13, the solutions were gradually activated over the 2 hour time period of testing. This indicated that the separation of rPCE from other factors was not effective to stabilize the solutions.

XII. Example 12

Application of Recombinant Factors to Cartridge Technology

Endotoxin detection cartridges were prepared by applying three solutions to a channel of the cartridge, each to different stations in the channel. The solution for the first station was 0.1% polyvinyl alcohol and 1% mannitol. The solution for the second station contained 8.9% rFC, 4.2% rFB, 7.4% rPCE, 10 mM MgSO$_4$, 4.5% NaCl, 1.4% Dextran, 224 mM HEPES buffer pH 7.4. The solution applied to the third station was 3.3 mM substrate (S2834, Ac-Ile-Glu-Gly-Lys-pNA (SEQ ID NO:14)). The *Limulus polyphemus* factors were prepared according to Example 1 including TFF purification and concentration.

Cartridges, similar to those shown in FIGS. 4C and 4D were prepared by depositing the first solution at the first station 14, the second solution at the second station 16, and the third solution at the third station 18, on the surface of the conduit 8' in the bottom half of a cartridge. The solutions were dried onto the conduit. A top half 3 of the cartridge was adhered to cartridge bottom 2 to produce a complete cartridge 1, where the resulting cartridge housing defines a fluid inlet port 4 and an optical cell 6. Further details regarding cartridge production can be found in U.S. Pat. No. 7,329,538.

Figure 14:
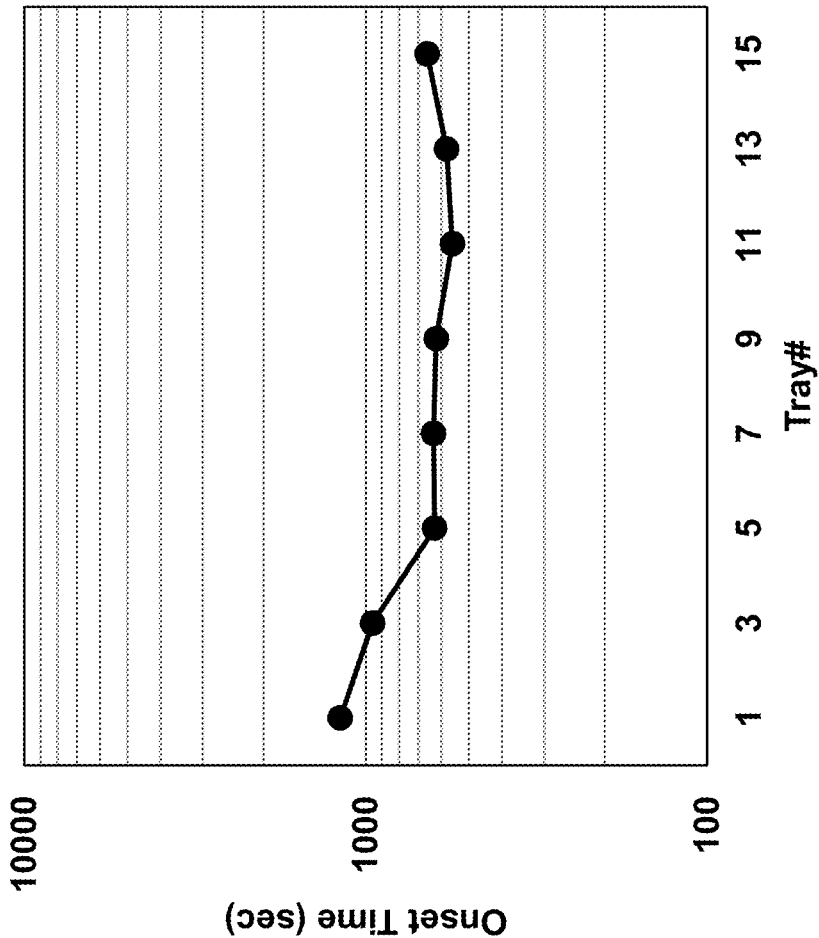
FIG. 14 is a graph showing the onset time (in seconds) of NC samples for exemplary cartridges selected from a series of production trays (Tray #). The cartridges were prepared with a solution containing rFC, rFB, and rPCE, which was deposited at the same region of the cartridge. The gradual decrease of onset times for production trays 1 to 5 indicate activation of the solution and that combining all three factors is not suitable for cartridge production.

Resulting cartridges were sampled from each production tray with the lower tray numbers corresponding to an earlier production time and higher tray numbers corresponding to a later production time. Water for injection (negative control) was assayed on the sampled cartridges. FIG. 14 shows the onset times for each tray. Activation was observed in the beginning of the production (Trays 1-5). This indicated that the factor solution containing rFC, rFB, and rPCE in a mixture was not suitable for cartridge production.

XIII. Example 13

Application of rFC Separation to Cartridge Technology rFC separation was applied to the cartridge technology. Cartridges were prepared as in Example 12, except that the solution for the first station was 0.1% polyvinyl alcohol and 1% mannitol. The solution for the second station contained 1.7% rFB, 5.7% rPCE, 50 mM MgCl$_2$, 82.1% 250 mM HEPES buffer pH 7.4 containing 1.6% Dextran and 5% NaCl. The solution for the third station contained 48% rFC and 3.3 mM substrate (S2834, Ac-Ile-Glu-Gly-Lys-pNA (SEQ ID NO:14)). rFC, rFB and rPCE were prepared from cell culture supernatant as described in Example 1.

Figure 15:
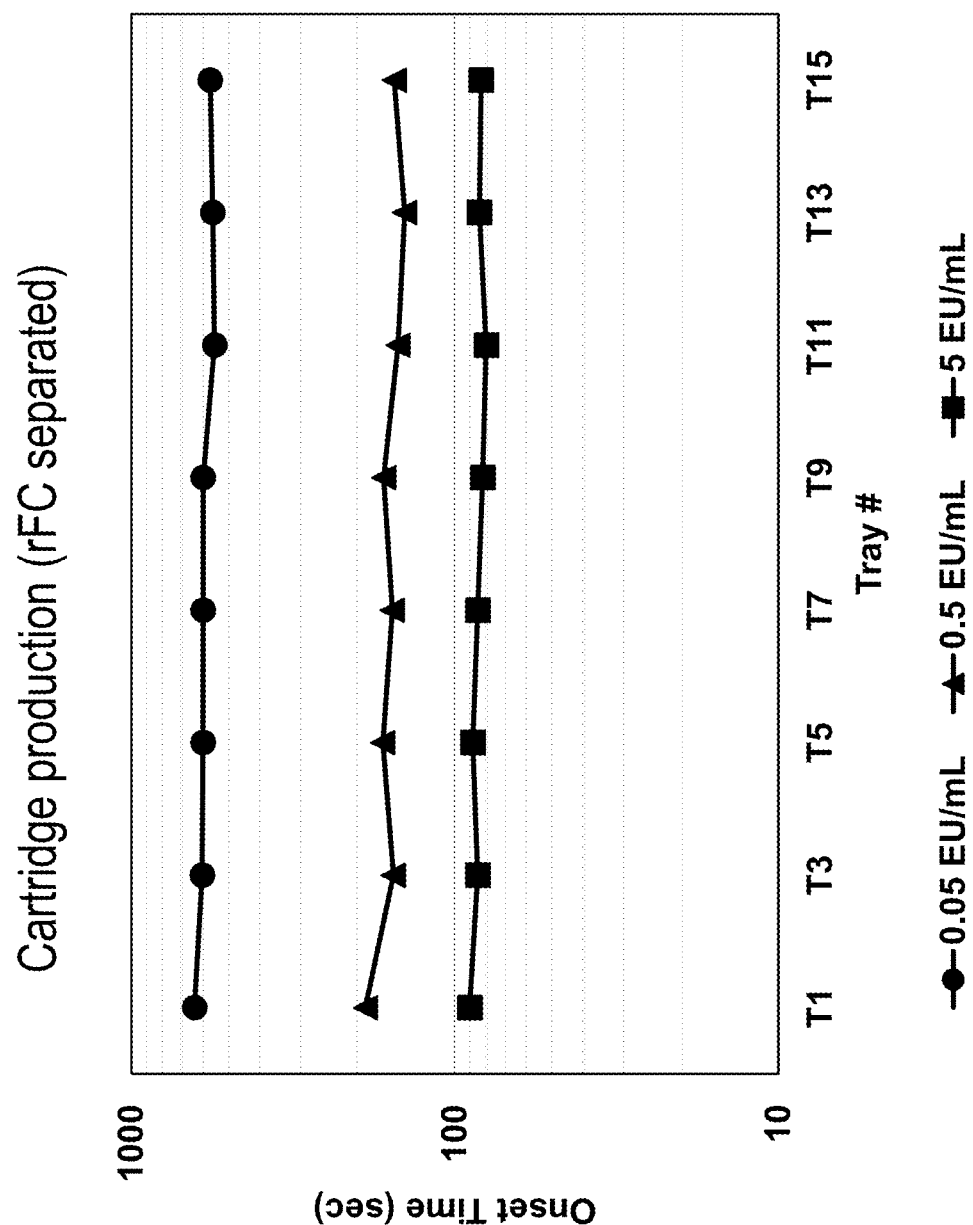
FIG. 15 is a graph showing the onset time (in seconds) for exemplary cartridges selected from a series of production trays (Tray #) with samples (0.05, 0.5, and 5 EU/mL). The cartridges were prepared with different solutions, namely a first solution containing rFC deposited at one region of the cartridge, and with a second solution containing rFB and rPCE deposited at a separate region of the cartridge. The onset times were stable across the production trays, showing that separation of rFC from rFB and rPCE was effective to produce stable cartridges.

Resulting cartridges were sampled from each tray. Endotoxin dilutions (0.05, 0.5, and 5 EU/mL) were measured with the sampled cartridges. FIG. 15 shows the onset times for each tray. The onset times were stable. This suggested that the factor solutions were stable during the production. Therefore, the rFC separation from rFB and rPCE was effective to produce stable cartridges.

XIV. Example 14

Application of rFB Separation to Cartridge Technology rFB separation was applied to the cartridge technology. Cartridges were prepared as in Example 12, except that the solution for the first station contained 3.3 mM substrate (S2423, Ac-Ile-Glu-Gly-Arg-pNA (SEQ ID NO:13)), 0.1% polyvinyl alcohol and 1% mannitol. The solution for the second station contained 6.0% rFC, 5.8% rPCE, 63 mM MgSO$_4$, 50.0% 250 mM HEPES buffer pH 7.4 containing 1.6% Dextran and 5% NaCl. The solution for the third station contained 1.4% rFB, 63 mM MgSO$_4$, 50.0% 250 mM HEPES buffer pH 7.4 containing 1.6% Dextran and 5% NaCl. Recombinant *Limulus polyphemus* factors were prepared according to Example 1 including TFF purification and concentration.

Figure 16:
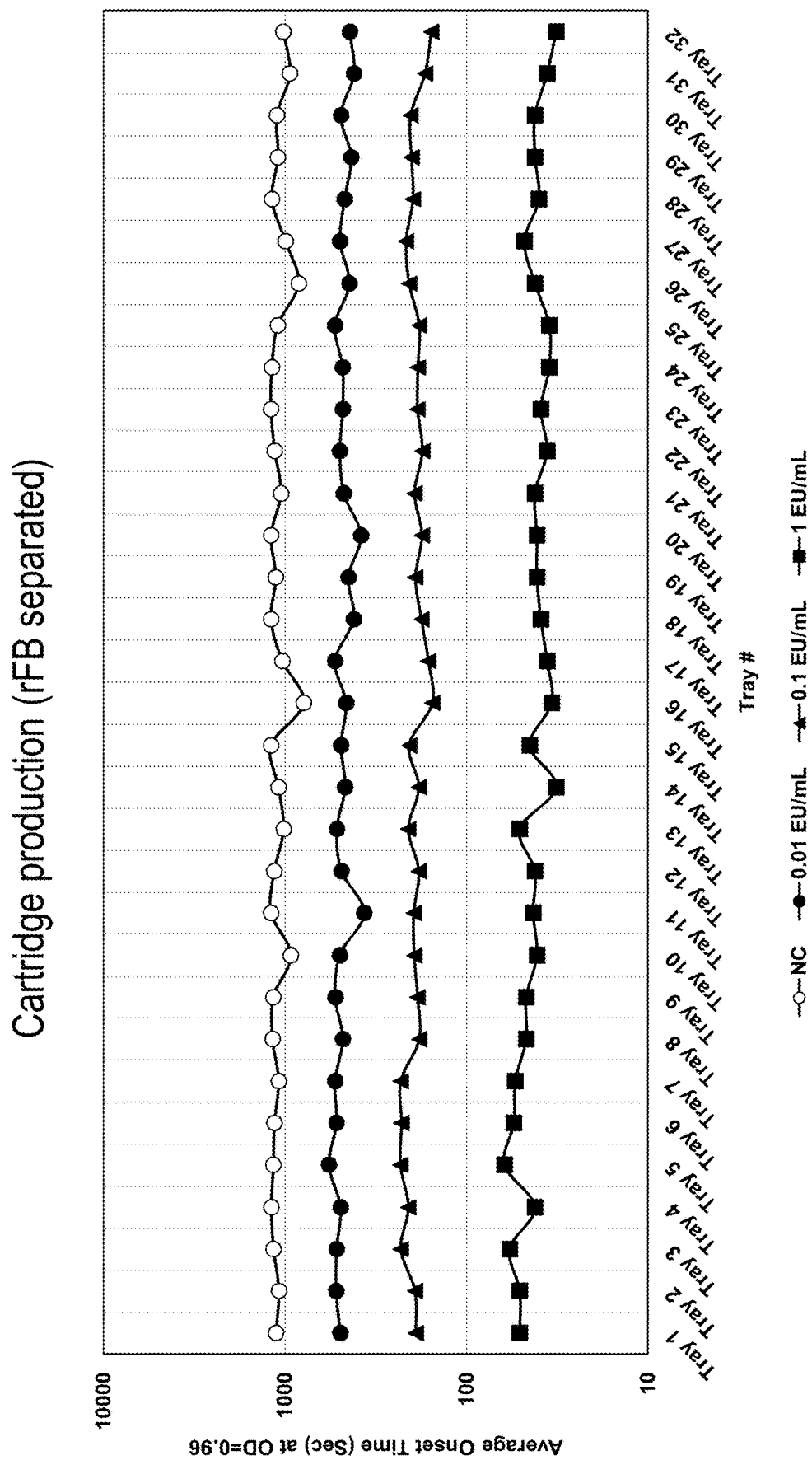
FIG. 16 is a graph showing the onset time (in seconds) for exemplary cartridges selected from a series of production trays (Tray #) with samples (0 (NC), 0.01, 0.1, and 1 EU/mL). The cartridges were prepared with different solutions, namely a first solution containing rFB deposited at a first region of the cartridge and a second solution containing rFC, and rPCE deposited at a second region of the cartridge. The onset times were stable across the production trays, showing that separation of rFB from rFC and rPCE was effective to produce stable cartridges.

Resulting cartridges were sampled from each tray. Endotoxin dilutions (0.05, 0.5, and 5 EU/mL) were measured with the sampled cartridges. FIG. 16 shows the onset times for each tray. The onset times were stable. This suggested that the factor solutions were stable during the production. Therefore, the rFB separation from rFC and rPCE was effective to produce stable cartridges.

XV. Summary of Examples 1-14

The results on stability of the factor solutions are summarized in Table 1 (Examples 2-11). When substrate was separated from factors, separation of rFC or rFB (Examples 8-10) provided factor solutions that were stable even at 25° C. When substrate was included in the factor solution (i.e., rFC or rFB), a low temperature (lower than 10° C.) was required to obtain stable solutions with rFC or rFB separated formulations. When the solution contained all 3 factors (i.e., rFC, rFB, and rPCE) or rFC and rFB together, the factor solutions were not stable. These results clearly suggest that separation of rFC from rFB can provide stable solutions. When substrate is separated from the factors, there is not much restriction on temperature. If substrate is in a solution with a factor, low temperature is desirable to obtain stability of the solution.

TABLE 1

Summary of Examples 2-11

| Example | Factors | Substrate | Temperature | Result |
|---|---|---|---|---|
| Example 2 | 3 factor together | Separated | Low (5° C.) | Activated |
| Example 3 | rFC separated | With rFB/rPCE | Low (5° C.) | Stable |
| Example 4 | rFC separated | With rFC | 25° C. | Sensitivity decrease |

TABLE 1-continued

Summary of Examples 2-11

| Example | Factors | Substrate | Temperature | Result |
|---|---|---|---|---|
| Example 5 | rFC separated | With rFC | Low (10° C.) | Stable |
| Example 6 | rFC separated | With rFC | 37° C. | Sensitivity decrease |
| Example 7 | rFB separated | With rFB | 25° C. | Sensitivity decrease |
| Example 8 | rFC separated | Separated | 25° C. | Stable |
| Example 9 | rFC separated | Separated | 25° C. | Stable |
| Example 10 | rFB separated | Separated | 25° C. | Stable |
| Example 11 | rPCE separated | Separated | 25° C. | Activated |

Application of these observations to preparation of an endotoxin detection cartridge also demonstrated the stabilizing effect of separation of rFC from rFB when preparing the initial factor solutions. Table 2 shows the results of cartridge preparations (Examples 12-14). The results demonstrate that rFC and rFB are preferably separated from one another when preparing an endotoxin detection cartridge with recombinant factors.

TABLE 2

Summary of Examples 12-14

| Example | Factors | Substrate | Result |
|---|---|---|---|
| Example 12 | 3 factor together | Separated | Not stable |
| Example 13 | rFC separated | Separated | Stable |
| Example 14 | rFB separated | Separated | Stable |

Collectively, the data in these Examples demonstrate that rFC, rFB and rPCE should be mixed together to form a cascade assay reagent immediately prior to conducting an endotoxin detection assay, and generally should not be combined together on a cartridge during fabrication; rather the rFC and rFB can be allowed to mix during the performance of the assay on the cartridge. However, when rFC was separated from rFB, stable cascade assay reagents were achieved.

For example, when designing an endotoxin detection cartridge it is beneficial to separate rFC from rFB at different positions on the cartridge to create stable assay reagents. rPCE may be mixed with another factor, e.g., rFB or rFC, and the factor that is not mixed with rPCE should be placed separately on the cartridge. rPCE may also be placed on the cartridge separate from rFB and rFC. Additional temperature-independent stability of solutions for production of cartridges or use in endotoxin detection assays may be obtained, if desired, by separating the substrate from the recombinant factors, on the cartridge production.

XVI. Example 15

Application of rFB Separation to Cartridge Technology rFB separation was applied to the cartridge technology. Cartridges were prepared as in Example 14, except that the solutions for the second and third stations were swapped. Accordingly, the first solution for the first station contained 3.3 mM substrate (S2423, Ac-Ile-Glu-Gly-Arg-pNA (SEQ ID NO:13)), 0.1% polyvinyl alcohol and 1% mannitol. The second solution for the second station contained 1.4% rFB, 63 mM $MgSO_4$, 50% 250 mM HEPES buffer pH 7.4 containing 1.6% Dextran and 5% NaCl. The third solution for the third station contained 6.0% rFC, 5.8% rPCE, 63 mM $MgSO_4$, 50% 250 mM HEPES buffer pH 7.4 containing 1.6% Dextran and 5% NaCl. Recombinant factors were prepared according to Example 1 including TFF purification and concentration.

Figure 17:
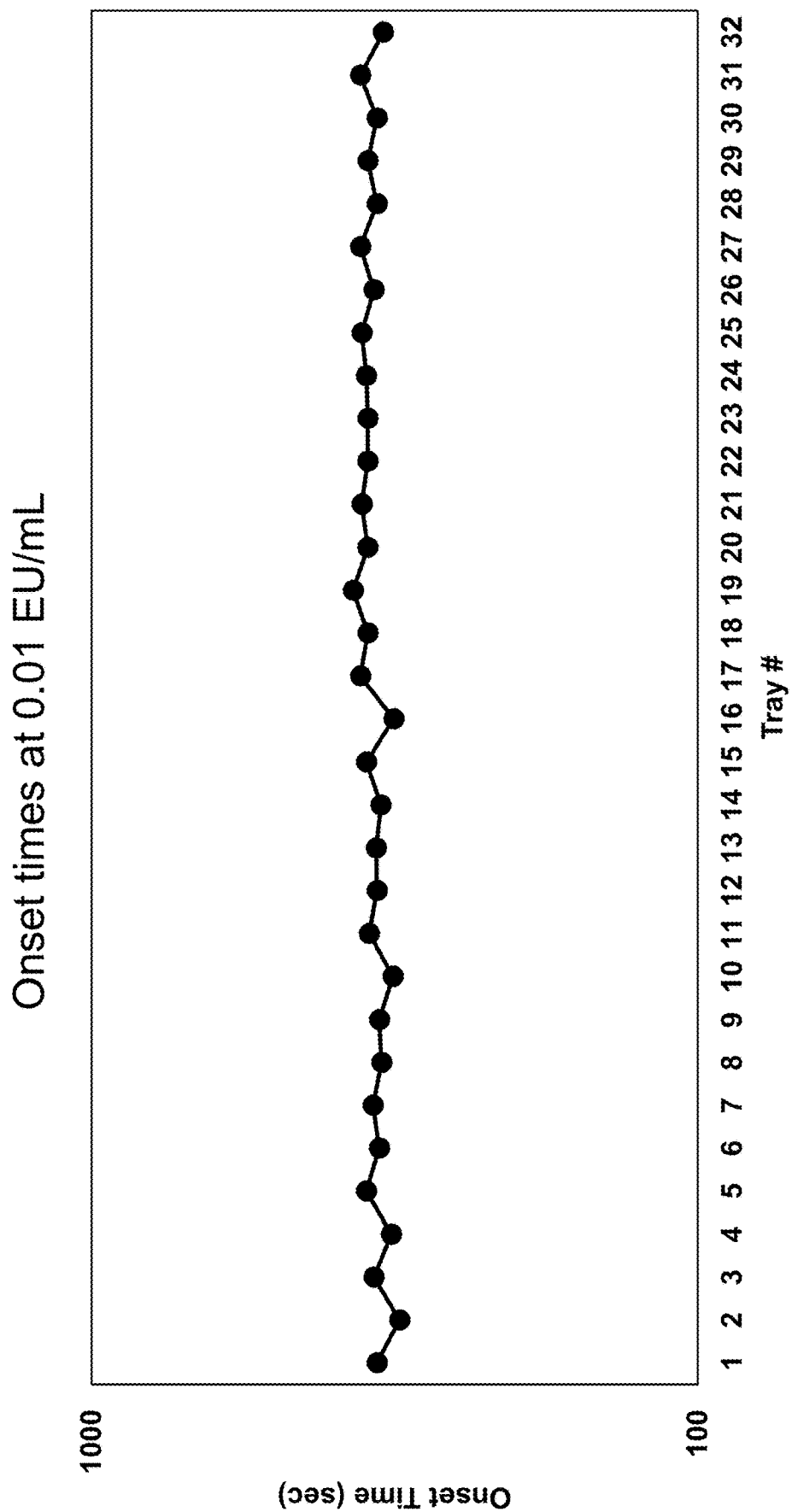
FIG. 17 is a graph showing the onset time (in seconds) for exemplary cartridges selected from a series of production trays (Tray #) with samples (0.01 EU/mL). The cartridges were prepared with different solutions, namely a first solution containing substrate was deposited at a first region of the cartridge, a second solution containing rFB was deposited at a separate second region of the cartridge and a solution containing rFC and rPCE was deposited at a separate third region of the cartridge. The onset times were stable across the production trays, showing that separation of rFC and rPCE from rFB was effective to produce stable cartridges.

Resulting cartridges were sampled from each tray. An endotoxin dilution (0.01 EU/mL) was measured with the sampled cartridges. FIG. 17 shows the onset times for each tray. The onset times were stable across the production trays demonstrating that the factor solutions were stable during the production. Therefore, the rFB separation from rFC and rPCE was effective to produce stable cartridges.

NUMBERED EMBODIMENTS

Embodiments disclosed herein include embodiments E1 to E58, as provided in the numbered embodiments of the disclosure:

Embodiment E1: A cartridge for bacterial endotoxin testing of a test sample comprising:
(a) a housing defining a test sample inlet area;
(a) a first composition comprising a first recombinant factor disposed on a first region of the cartridge;
(b) a second composition comprising a second recombinant factor disposed on a second region of the cartridge,
wherein the second region is spaced apart from the first region,
wherein the first region is in fluid flow communication with the test sample inlet area and the first and second regions are in fluid communication with one another to permit mixing of the first and second compositions in the presence of a test sample deposited on the test sample inlet area, and
wherein the first composition comprises recombinant Factor B or recombinant Factor C, and the second composition comprises recombinant Factor B or recombinant Factor C, but the first composition and second composition do not both contain recombinant Factor B or recombinant Factor C.

Embodiment E2: The cartridge of Embodiment E1, further comprising an optical cell in fluid flow communication with the test sample inlet area, first region, and second region.

Embodiment E3: A cartridge for bacterial endotoxin testing comprising:
(a) a housing defining a fluid inlet port, an optical cell, and a conduit having a fluid contacting surface providing fluid flow communication between the fluid inlet port and the optical cell;
(b) a first composition disposed on a first region of the fluid contacting surface of the conduit; and
(c) a second composition disposed on a second region of the fluid contacting surface of the conduit,
wherein the first region is spaced apart from the second region, such that, when a liquid sample is applied to the fluid inlet port, the sample traverses the first region and the second region and solubilizes the first and second compositions, during transport to the optical cell, and
wherein, the first and second compositions are selected from the group consisting of recombinant Factor B and recombinant Factor C, provided that the first composition is not the same as the second composition.

Embodiment E4: The cartridge of any one of Embodiments E1-E3, wherein the Factor C and/or Factor B remain substantially inactive until contacted with microbial endotoxin in a liquid sample introduced into the cartridge via test sample inlet area or fluid inlet port.

Embodiment E5: The cartridge of any one of Embodiments E1-E4, wherein the first composition further includes recombinant pro-clotting enzyme.

Embodiment E6: The cartridge of any one of Embodiments E1-E4, wherein the second composition further includes recombinant pro-clotting enzyme.

Embodiment E7: The cartridge of any one of Embodiments E1-E4, further comprising a third composition comprising recombinant pro-clotting enzyme disposed on a third region of the cartridge or the fluid contacting surface of the conduit spaced apart from the first and second regions, wherein the third region is in fluid communication with the first and/or second regions.

Embodiment E8: The cartridge of Embodiment E7, wherein the third composition further comprises a chromogenic substrate.

Embodiment E9: The cartridge of Embodiment E7, further comprising a fourth composition comprising a chromogenic substrate disposed on a fourth region of the cartridge or the fluid contacting surface of the conduit spaced apart from the first, second, and third regions, and wherein the fourth region is in fluid flow communication with the first, second, and/or third regions.

Embodiment E10: The cartridge of any one of Embodiments E1-E6, further comprising a third composition comprising a chromogenic substrate disposed on a third region of the cartridge or fluid contacting surface of the conduit spaced apart from the first and second regions and wherein the third region is in fluid flow communication with the first and/or second regions.

Embodiment E11: The cartridge of Embodiment E10, further comprising a fourth composition comprising a recombinant pro-clotting enzyme disposed on a fourth region of the cartridge or fluid contacting surface of the conduit spaced apart from the first, second, and third regions, and wherein the fourth region is in fluid flow communication with the first, second, and/or third regions.

Embodiment E12: The cartridge of any one of Embodiments E1-E11, wherein the first and second compositions are dried compositions.

Embodiment E13: The cartridge of any one of Embodiments E1-E12, wherein the first composition on the first region comprises recombinant Factor C and not recombinant Factor B and the second composition on the second region comprises recombinant Factor B and not recombinant Factor C.

Embodiment E14: The cartridge of any one of Embodiments E1-E12, wherein the first composition on the first region comprises recombinant Factor B and not recombinant Factor C and the second composition on the second region comprises recombinant Factor C and not recombinant Factor B.

Embodiment E15: The cartridge of Embodiment E10, wherein the third region of the cartridge or fluid contacting surface is positioned between the sample inlet area or fluid inlet port and the first region, and the second region is positioned on the cartridge or fluid contacting surface between the first region and the optical cell.

Embodiment E16: The cartridge of Embodiment E15, wherein the first composition on the first region comprises recombinant Factor B and not recombinant Factor C, and the second composition on the second region comprises recombinant Factor C and not recombinant Factor B, and a recombinant pro-clotting enzyme.

Embodiment E17: The cartridge of Embodiment E15, wherein the first composition on the first region comprises recombinant Factor C and not recombinant Factor B, and a recombinant pro-clotting enzyme, and the second composition on the second region comprises recombinant Factor B and not recombinant Factor C.

Embodiment E18: A cartridge for detecting bacterial endotoxin in a sample comprising:
(a) a housing defining a fluid inlet port, an optical cell, and a conduit having a fluid contacting surface providing fluid flow communication between the fluid inlet port and the optical cell;
(b) a chromogenic substrate disposed on a first region of the fluid contacting surface of the conduit;
(c) a first recombinant amebocyte factor disposed on a second region of the fluid contacting surface of the conduit, and
(d) a second recombinant amebocyte factor disposed on a third region of the fluid contacting surface;
wherein the second region is spaced apart from and downstream of the first region in the direction of fluid flow along the conduit, and the third region is spaced apart from and downstream of the second region and the first region in the direction of fluid flow along the conduit; and
wherein (i) the first recombinant amebocyte factor comprises recombinant Factor B, and the second recombinant amebocyte factor comprises recombinant Factor C, and recombinant pro-clotting enzyme is disposed on the third region with the recombinant Factor C; or (ii) the first recombinant amebocyte factor comprises recombinant Factor C and the second recombinant amebocyte factor comprises recombinant Factor B, and recombinant pro-clotting enzyme is disposed on the second region with the recombinant Factor C.

Embodiment E19: The cartridge of Embodiment E18, wherein the first recombinant amebocyte factor comprises recombinant Factor B, and the second recombinant amebocyte factor comprises recombinant Factor C, and recombinant pro-clotting enzyme is disposed on the third region with the recombinant Factor C.

Embodiment E20: The cartridge of Embodiment E18, wherein the first recombinant amebocyte factor comprises recombinant Factor C, and the second recombinant amebocyte factor comprises recombinant Factor B, and recombinant pro-clotting enzyme is disposed on the second region with the recombinant Factor C.

Embodiment E21: The cartridge of any one of Embodiments E8-E20, wherein the substrate is Ac-Ile-Glu-Gly-Arg-pNA (SEQ ID NO:13), wherein Ac is an acetyl group and pNA is a para-nitroaniline group.

Embodiment E22: The cartridge of any one of Embodiments E8-E20, wherein the substrate is Ac-Ile-Glu-Gly-Lys-pNA (SEQ ID NO:14), wherein Ac is an acetyl group and pNA is a para-nitroaniline group.

Embodiment E23: A method of producing a bacterial endotoxin testing composition, the method comprising:
(a) providing a first composition comprising recombinant Factor C, but free of Factor B;
(b) providing a second composition comprising recombinant Factor B, but free of Factor C; and
(c) mixing the first composition with the second composition in the presence of recombinant pro-clotting enzyme to form a third composition, wherein
(i) the first and second compositions remain separated until mixed together immediately prior to contact with a test sample; or
(ii) the first and second compositions remain separated until mixed with a test sample.

Embodiment E24: The method of Embodiment E23, wherein the first and second compositions remain separated until mixed together immediately prior to contact with a test sample.

Embodiment E25: The method of Embodiment E23 or E24, wherein the first and second compositions are mixed together no more than 30 minutes prior to contact with a test sample.

Embodiment E26: The method of Embodiment E23 or E24, wherein a chromogenic substrate is mixed with the third composition immediately prior to contact with the test sample.

Embodiment E27: The method of Embodiment E23, wherein the first and second compositions remain separated until mixed with a test sample.

Embodiment E28: The method of Embodiment E23 or E27, wherein a chromogenic substrate is mixed with the first and second compositions simultaneous with, or after, mixing with the test sample.

Embodiment E29: The method of any one of Embodiments E23-E28, wherein the first composition further comprises recombinant pro-clotting enzyme prior to mixing step (c).

Embodiment E30: The method of any one of Embodiments E23-E29, wherein the second composition further comprises recombinant pro-clotting enzyme prior to mixing step (c).

Embodiment E31: The method of any one of Embodiments E23-E25, or E27-E30, wherein the first composition further comprises a chromogenic substrate.

Embodiment E32: The method of any one of Embodiments E23-E25, E27, E29, or E30, wherein the second composition further comprises a chromogenic substrate.

Embodiment E33: The method of any one of Embodiments E23-E26, further comprising providing a fourth composition comprising recombinant pro-clotting enzyme, and wherein the first and second compositions are mixed together with the fourth composition immediately prior to contact with the test sample.

Embodiment E34: The method of any one of Embodiments E23-E27, further comprising providing a fourth composition comprising recombinant pro-clotting enzyme, and wherein the first, second and fourth compositions are mixed together upon contact with the test sample.

Embodiment E35: The method of any one of Embodiments E33 or E34, wherein the fourth composition further comprises a chromogenic substrate.

Embodiment E36: The method of any one of Embodiments E23-E30, or E33-E35, further comprising providing a composition comprising a chromogenic substrate which remains separated from the first and second compositions until mixed with the first and second compositions to form the third composition in step (c).

Embodiment E37: The method of any one of Embodiments E26, E28, E31, E32, E35, or E36, wherein the chromogenic substrate is Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

Embodiment E38: The method of any one of Embodiments E23-E37, wherein the first and second compositions are provided in steps (a) and (b) as dried compositions.

Embodiment E39: The method of Embodiment E38, wherein the first and second compositions are resolubilized prior to mixing in step (c).

Embodiment E40: The method of Embodiment E39, wherein the first and second compositions are resolubilized with a buffer.

Embodiment E41: The method of Embodiment E39, wherein the first and second compositions are resolubilized by the test sample.

Embodiment E42: The method of any one of Embodiments E23-E37, wherein the first and second compositions are provided in steps (a) and (b) as buffered solutions.

Embodiment E43: The method of any one of Embodiments E23-E42, wherein step (c) is performed on a cartridge.

Embodiment E44: The method of any one of Embodiments E23-E43, wherein the Factor C provided in step (a) is substantially inactive in the absence of exogenously added endotoxin from a sample or control.

Embodiment E45: The method of any one of Embodiments E23-E44, wherein the Factor B provided in step (b) is substantially inactive in the absence of exogenously added endotoxin from a sample or control.

Embodiment E46: A method of detecting bacterial endotoxin in a test sample comprising:
(a) contacting a bacterial endotoxin testing composition produced by the method of any one of Embodiments E23-E45 with the test sample in the presence of a chromogenic substrate; and
(b) determining the presence, absence and/or amount of bacterial endotoxin in the sample based on a chemically detectable change in the chromogenic substrate.

Embodiment E47: The method of Embodiment E46, wherein the substrate is Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

Embodiment E48: A method of detecting bacterial endotoxin in a test sample comprising:
(a) applying test sample to the test sample inlet area or the fluid inlet port of the cartridge of any one of Embodiments E1-E22;
(b) permitting the first and second compositions to contact the test sample in the presence of a chromogenic substrate; and
(c) determining the presence, absence, and/or amount of bacterial endotoxin in the test sample based on a chemically detectable change in the chromogenic substrate.

Embodiment E49: The method of Embodiment E48, wherein the chromogenic substrate is Ac-Ile-Glu-Gly-Arg-pNA (SEQ ID NO:13) or Ac-Ile-Glu-Gly-Lys-pNA (SEQ ID NO:14), wherein Ac is an acetyl group and pNA is a para-nitroaniline group.

Embodiment E50: A kit for determining the presence and/or amount of a bacterial endotoxin in a test sample, the kit comprising:
(a) a first composition comprising recombinant Factor C, which is free of recombinant Factor B;
(b) a second composition comprising a recombinant Factor B, which is free of recombinant Factor C, wherein the first and second compositions are physically separated; and
(c) a means for mixing the first and second compositions together in the presence of recombinant pro-clotting enzyme and a chromogenic substrate immediately prior to, or simultaneous with, contact with a test sample.

Embodiment E51: The kit of Embodiment E50, wherein the first composition and second composition are dried compositions and the kit further comprises a buffer for resolubilizing each of the first and second compositions.

Embodiment E52: The cartridge of any one of Embodiments E1-E22, the method of any one of Embodiments E23-E29, or the kit of Embodiments E50-E51, wherein the recombinant factor C lacks an (α-2,3)-linked terminal sialic acid.

Embodiment E53: The cartridge of any one of Embodiments E1-E22, or E52, the method of any one of Embodiments E23-E29, or E52 or the kit of Embodiments E50-E52, wherein the recombinant factor C is expressed in a GnTI⁻ HEK cell line.

Embodiment E54: The cartridge of any one of Embodiments E1-E22, E52, or E53, the method of any one of Embodiments E23-E29, E52, or E53, or the kit of Embodiments E50-E53, wherein the recombinant factor B and/or recombinant factor C is recombinant *Limulus polyphemus* recombinant factor B and/or recombinant *Limulus polyphemus* recombinant factor C.

Embodiment E55: The cartridge of any one of Embodiments E1-E22, or E52-E54, the method of any one of Embodiments E23-E49, or E52-E54, or the kit of Embodiments E50-E54, wherein, wherein the recombinant factor C comprises the amino acid sequence of SEQ ID NO:1.

Embodiment E56: The cartridge of any one of Embodiments E1-E22, or E52-E55, the method of any one of Embodiments E23-E49, or E52-E55, or the kit of Embodiments E50-E55, wherein the recombinant factor B comprises the amino acid sequence of SEQ ID NO:3.

Embodiment E57: The cartridge of any one of Embodiments E5-E17, E19-E22, or E52-E56, the method of any one of Embodiments E20-E46, or E52-E56, or the kit of any one of Embodiments E50-E56, wherein the recombinant pro-clotting enzyme is a recombinant *Limulus polyphemus* pro-clotting enzyme.

Embodiment E58: The cartridge of any one of Embodiments E5-E17, E19-E22, or E52-E57, the method of any one of Embodiments E20-E46, or E52-E57, or the kit of any one of Embodiments E50-E57, wherein the recombinant pro-clotting enzyme comprises the amino acid sequence of SEQ ID NO:5.

INCORPORATION BY REFERENCE

The entire disclosure of each of the patent and scientific documents referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

```
                          SEQUENCE LISTING

SEQ ID NO: 1:
RGVDLGLCDDTRFECKCGDPGYVFNVPAKQCTYFYRWRPYCKPCDKLEAKDVCPKYKRCQECRA
GLDSCVSCPPNKYGTWCSGECQCKNGGICDQRTGACTCRDRYEGVHCEILQGCPLLQSDPQVQE
VKNPPNDPQTIDYSCSPGFKLKGVARITCLPNGQWSSFPPKCIRECSMVSSLEHGKVNSPSADL
IEGATLRFSCDSPYYLIGQETLTCQGNGQWSGQIPQCQKLVFCPDLDPVSHAEHQVKIGLEQKY
GQFPQGTEVTYTCTGNYFLMGLDTLKCNPDGSWSGTQPSCVKVADREVNCDSKAVDFLDDVGEP
VRIHCPAGCSLTAGTVWGTAIYHELSSVCRAAIHAGKVPNSGGAVHVVNNGPYSDFLASDLNGI
KSDELKSLAQSFRFDYVSSSTAGRKSGCPDGWFEIEENCVYVTSKORAWERAQGVCTNMAARLA
VLDKDVIPSSLTETLRGKGLATTWIGLHRLDADNHFIWELMDRSSVALNDSLTFWAPGEPGNET
NCVYLDIQDQLQPVWKTKSCFQPSSFVCMMDLSDKNKAKCKDPGPLENGHAKLHGQSIDGFYAG
SSVRYSCEVLHYLSGTETVSCTSNGTWSAPKPRCIKVITCQTPPVPSYGSVDIKPPSRTNSISR
VGSPFLRLPRLPLPLARAAGPPPKPRSAPPSTVDLSSKVKLPEGHYRVGSQAIYTCESRYYELL
GSQGRRCDSNGKWSGRPASCIPVCGRSDSPRSPFIVNGNSTEIGOWPWQAGISRWLADHNMWFL
QCGGALLNEKWIITAAHCVTYSATAEIIDPSQFKFYLGKYYRDDSKDDDYVQVREAIEIHVNPN
YDPGNLNFDIALIQLKTSVALTTRVQPICLPTDLTTRENLKEGALAVVTGWGLNENNTYSEMIQ
QAVLPVVAASTCEQGYQDSGLPLTVTENMFCAGYKQGRYDACSGDSGGPLVFADDSRTDRRWVL
EGIVSWGSPNGCGKSNQYGGFTKVNVFLSWIRQFI

SEQ ID NO: 2 (Residues 1-25 shown in bold represent the signal sequence):
MVLASFLVSGLVLGLLAQKMRPVQSRGVDLGLCDDTRFECKCGDPGYVFNVPAKQCTYFYRWRP
YCKPCDKLEAKDVCPKYKRCQECRAGLDSCVSCPPNKYGTWCSGECQCKNGGICDQRTGACTCR
DRYEGVHCEILQGCPLLQSDPQVQEVKNPPNDPQTIDYSCSPGFKLKGVARITCLPNGQWSSFP
PKCIRECSMVSSLEHGKVNSPSADLIEGATLRFSCDSPYYLIGQETLTCQGNGQWSGQIPQCQK
LVFCPDLDPVSHAEHQVKIGLEQKYGQFPQGTEVTYTCTGNYFLMGLDTLKCNPDGSWSGTQPS
CVKVADREVNCDSKAVDFLDDVGEPVRIHCPAGCSLTAGTVWGTAIYHELSSVCRAAIHAGKVP
NSGGAVHVVNNGPYSDFLASDLNGIKSDELKSLAQSFRFDYVSSSTAGRKSGCPDGWFEIEENC
VYVTSKQRAWERAQGVCTNMAARLAVLDKDVIPSSLTETLRGKGLATTWIGLHRLDADNHFIWE
LMDRSSVALNDSLTFWAPGEPGNETNCVYLDIQDQLQPVWKTKSCFQPSSFVCMMDLSDKNKAK
CKDPGPLENGHAKLHGQSIDGFYAGSSVRYSCEVLHYLSGTETVSCTSNGTWSAPKPRCIKVIT
CQTPPVPSYGSVDIKPPSRTNSISRVGSPFLRLPRLPLPLARAAGPPPKPRSAPPSTVDLSSKV
KLPEGHYRVGSQAIYTCESRYYELLGSQGRRCDSNGKWSGRPASCIPVCGRSDSPRSPFIVNGN
STEIGQWPWQAGISRWLADHNMWFLQCGGALLNEKWIITAAHCVTYSATAEIIDPSQFKFYLGK
YYRDDSKDDDYVQVREAIEIHVNPNYDPGNLNFDIALIQLKTSVALTTRVQPICLPTDLTTREN
LKEGALAVVTGWGLNENNTYSEMIQQAVLPVVAASTCEQGYQDSGLPLTVTENMFCAGYKQGRY
DACSGDSGGPLVFADDSRTDRRWVLEGIVSWGSPNGCGKSNQYGGFTKVNVFLSWIRQFI SEQ ID NO: 3:
IIFPKTQNDNKQCTAKGGLKGSCKSLTDCPAVLATLKDSFPVVCSWNGRFQPIVCCPDAAAPSV
TTTVTTIVPTKETKIPRLHIPGCGKRKVNVDITTIGRSGSPILPPISTSQDLKGGRGIIAGGVE
AKIGAWPWMAAVFVKNFGIGRFHCAGSIISSKYILSAAHAFLIGGRKLTPTRLAVRVGGHYVKM
GQEYHVEDVIIHPDYVERENYNDIAIIVLKEELNFTDLVRPICLPDPEAVTDSLKGRRVTVAGW
```

```
GDLDFAGPRSQVLREVSIPVVPIGDCNKAYQKLNTLALKNGITKKFICAGLEEGGKDACQGDSG
GPLMLVNNSSWIVTGVVSFGHKCAEEGFPGVYTRVVSYLEWIAKVINSLDQTVTN

SEQ ID NO: 4 (Residues 1-25 shown in bold represent the signal sequence):
MAWICVITLFALASSTLSNKVSRVGIIFPKTQNDNKQCTAKGGLKGSCKSLTDCPAVLATLKDS
FPVVCSWNGRFQPIVCCPDAAAPSVTTTVITIVPTKETKIPRLHIPGCGKRKVNVDITTIGRSG
SPILPPISTSQDLKGGRGIIAGGVEAKIGAWPWMAAVFVKNFGIGRFHCAGSIISSKYILSAAH
AFLIGGRKLTPTRLAVRVGGHYVKMGQEYHVEDVIIHPDYVERENYNDIAIIVLKEELNFTDLV
RPICLPDPEAVTDSLKGRRVTVAGWGDLDFAGPRSQVLREVSIPVVPIGDQNKAYQKLNTLALK
NGITKKFICAGLEEGGKDACQGDSGGPLMLVNNSSWIVTGVVSFGHKCAEEGFPGVYTRVVSYL
EWIAKVINSLDQTVTN SEQ ID NO: 5
SSLGRQRRQFVFPDDEESCSNRFTNDGICKDVLNCRDLLQKNDYNLLKESICGFEGITPKVCCP
KQSIVNPITEAPPKTTTTERPPIRIPSNLPKQCGNRNITTTRIIGGQEATPGAWPWMAAVYIKQ
GGIRSVQCGGALVINRHVITASHCVVNSLGTDVMRADVFSVRLGEHNLYSINDSSDPIDFAVTS
VKHHENFVLATYLNDIAILKLNDTVTFTHKIKPICLPYESLRYEDLAMRNPFVAGWGTTAFNGP
SSAVLREVQLPIWGHEPCRQAYEKDLNITNVYMCAGYADGGKDACQGDSGGPMMLPDKSGNFYL
VGIVSFGKKCALPGFPGVYTKVTEFLDWIAVNMV SEQ ID NO: 6 (Residues 1-28 shown in bold represent the signal sequence):
MGILPSPGMPALLSLVSLLSVLLMGCVASSLGRQRRQFVFPDDEESCSNRFTNDGICKDVLNCR
DLLQKNDYNLIKESICGFEGITPKVCCPKQSIVNPITEAPPKTTTTERPPIRIPSNLPKQCGNR
NITTTRIIGGQEATPGAWPWMAAVYIKQGGIRSVQCGGALVTNRHVITASHCVVNSLGTDVMRA
DVFSVRLGEHNLYSINDSSDPIDFAVTSVKHHENFVLATYLNDIAILKLNDTVTFTHKIKPICL
PYESLRYEDLAMRNPFVAGWGTTAFNGPSSAVLREVQLPIWGHEPCRQAYEKDLNITNVYMCAG
YADGGKDACQGDSGGPMMLPDKSGNFYLVGIVSFGKKCALPGFPGVYTKVTEFLDWIAVNMV SEQ ID NO: 7:
RGVDLGLCDETRFECKCGDPGYVFNVPMKQCTYFYRWRPYCKPCDDLEAKDICPKYKRCQECKA
GLDSCVTCPPNKYGTWCSGECQCKNGGICDQRTGACTCRDRYEGAHCEILKGCPLLPSDSQVQE
VRNPPDNPQTIDYSCSPGFKLKGVARISCLPNGQWSSFPPKCIRECAKVSSPEHGKVNAPSGNM
IEGATLRFSCDSPYYLIGQETLTCQGNGQWSGQIPQCKKLVFCPDLDPVNHAEHQVKIGVEQKY
GQFPQGTEVTYTCSGNYFLMGFNTLKCNPDGSWSGSQPSCVKVADREVDCDSKAVDFLDDVGEP
VRIHCPAGCSLTAGTVWGTAIYHELSSVCRAAIHAGKLPNSGGAVHVVNNGPYSDFLGSDLNGI
KSEELKSLARSFRFDYVSSSTAGRSGCPDGWFEVEENCVYVTSKQRAWERAQGVCTNMAARLAV
LDKDLIPSSLTETLRGKGLTTTWIGLHRLDAEKPFVWELMDRSNVVLNDNLTFWASGEPGNETN
CVYLDIRDQLQPVWKTKSCFQPSSFACMMDLSDRNKAKCDDPGPLENGHATLHGQSIDGFYAGS
SIRYSCEVLHYLSGTETVTCTTNGTWSAPKPRCIKVITCQNPPVPSYGSVEIKPPSRINSISRV
GSPFLRLPRLPLPLARAAKPPPKPRSSQPSTVDLASKVKLPEGHYRVGSRAIYTCESRYYELLG
SQGRRCDSNGNWSGRPASCIPVCGRSDSPRSPFIWNGNSTEIGQWPWQAGISRWLADHNMWFLQ
CGGSLLNEKWIVTAAHCVTYSATAEIIDPSQFKIYLGKYYRDDSRDDDYVQVREALEIHVNPNY
DPGNLNFDIALIQLKTPVTLTTRVQPICLPTDITTREHLKEGTLAVVTGWGLNENNTYSEMIQQ
AVLPVVAASTCEEGYKEADLPLTVTENMFCAGYKKGRYDACSGDSGGPLVFADDSRTERRWVLE
GIVSWGSPSGCGKANQYGGFTKVNVFLSWIRQFI SEQ ID NO: 8 (Residues 1-21 in bold represent the signal sequence):
MKFLVNVALVFMVVYISYIYARGVDLGLCDETRFECKCGDPGYVFNVPMKQCTYFYRWRPYCKP
CDDLEAKDICPKYKRCQECKAGLDSCVTCPPNKYGTWCSGECQCKNGGICDQRTGACTCRDRYE
GAHCEILKGCPLLPSDSQVQEVRNPPDNPQTIDYSCSPGFKLKGVARISCLPNGQWSSFPPKCI
RECAKVSSPEHGKVNAPSGNMIEGATLRFSCDSPYYLIGQETLTCQGNGQWSGQIPQCKKLVFC
PDLDPVNHAEHQVKIGVEQKYGQFPQGTEVTYTCSGNYFLMGFNTLKCNPDGSWSGSQPSCVKV
ADREVDCDSKAVDFLDDVGEPVRIHCPAGCSLTAGTVWGTAIYHELSSVCRAAIHAGKLPNSGG
AVHVVNNGPYSDFLGSDLNGIKSEELKSLARSFRFDYVSSSTAGRSGCPDGWFEVEENCVYVTS
KQRAWERAQGVCTNMAARLAVLDKDLIPSSLTETLRGKGLTTTWIGLHRLDAEKPFVWELMDRS
NVVLNDNLTFWASGEPGNETNCVYLDIRDQLQPVWKTKSCFQPSSFACMMDLSDRNKAKCDDPG
PLENGHATLHGQSIDGFYAGSSIRYSCEVLHYLSGTETVTCTTNGTWSAPKPRCIKVITCQNPP
VPSYGSVEIKPPSRTNSISRVGSPFLRLPRLPLPLARAAKPPPKPRSSQPSTVDLASKVKLPEG
HYRVGSRAIYTCESRYYELLGSQGRRCDSNGNWSGRPASCIPVCGRSDSPRSPFIWNGNSTEIG
QWPWQAGISRWLADHNMWFLQCGGSLLNEKWIVTAAHCVTYSATAEIIDPSQFKIYLGKYYRDD
SRDDDYVQVREALEIHVNPNYDPGNLNFDIALIQLKTPVTLTTRVQPICLPTDITTREHLKEGT
LAVVTGWGLNENNTYSEMIQQAVLPVVAASTCEEGYKEADLPLTVTENMFCAGYKKGRYDACSG
DSGGPLVFADDSRTERRWVLEGIVSWGSPSGCGKANQYGGFTKVNVFLSWIRQFI SEQ ID NO: 9:
VGVLFPKTRNDNECTARGGLKGSCKSLIDCPSVLATLKDSFPVVCSWNGRFQPIVCCPDAIAPP
PVTTTAVTVISTKEPKLPRLHISGCGKRKVKIDITTVGRSGSPILPPISTPQNSTGGRGIIAGG
VEAKIGAWPWMAAVFVKNFGIGRFHCAGSIISNKYILSAAHAFLIGGRKLTPTRLAVRVGGHYI
KRGQEYPVKDVIIHPHYVEKENYNDIAIIELKEELNFTDLVNPICLPDPETVTDPLKDRIVTAA
GWGDLDFSGPRSQVLREVSIPVVPVDKCDQAYEKLNTPSLKNGITNNFLCAGLEEGGKDACQGD
SGGPLMLVNNTRWIVVGVVSFGHKCAEEGYPGVYSRVASYLDWIAKVTNSLDHAVTN SEQ ID NO: 10 (Residues 1-22 represent the signal sequence):
MDMRVPAQLLGLLLLWFPGSRCVGVLFPKTRNDNECTARGGLKGSCKSLIDCPSVLATLKDSFP
VVCSWNGRFQPIVCCPDAIAPPPVTTTAVTVISTKEPKLPRLHISGCGKRKVKIDITTVGRSGS
PILPPISTPQNSTGGRGIIAGGVEAKIGAWPWMAAVFVKNFGIGRFHCAGSIISNKYILSAAHA
FLIGGRKLTPTRLAVRVGGHYIKRGQEYPVKDVIIHPHYVEKENYNDIAIIELKEELNFTDLVN
```

SEQUENCE LISTING

```
PICLPDPETVTDPLKDRIVTAAGWGDLDFSGPRSQVLREVSIPVVPVDKCDQAYEKLNTPSLKN
GITNNFLCAGLEEGGKDACQGDSGGPLMLVNNTRWIVVGVVSFGHKCAEEGYPGVYSRVASYLD
WIAKVTNSLDHAVTN

SEQ ID NO: 11:
STLSRQRRQFVFPDEEELCSNRFTEEGTCKNVLDCRILLQKNDYNLLKESICGFEGITPKVCCP
KSSHVISSTQAPPETTTTERPPKQIPPNLPEVCGIHNTTTRIIGGREAPIGAWPWMTAVYIKQ
GGIRSVQCGGALVINRHVITASHCVVNSAGTDVMPADVFSVRLGEHNLYSTDDDSNPIDFAVTS
VKHHEHFVLATYLNDIAILTLNDTVTFTDRIRPICLPYRKLRYDDLAMRKPFITGWGTTAFNGP
SSAVLREVOLPIWEHEACRQAYEKDLNITNVYMCAGFADGGKDACQGDSGGPMMLPVKTGEFYL
IGIVSFGKKCALPGFPGVYTKVTEFLDWIAEHMV

SEQ ID NO: 12 (Residues 1-21 represent the signal sequence):
MLVNNVFSLLCFPLLMSVVRCSTLSRQRRQFVFPDEEELCSNRFTEEGTCKNVLDCRILLQKND
YNLLKESICGFEGITPKVCCPKSSHVISSTQAPPETTTTERPPKQIPPNLPEVCGIHNTTTTRI
IGGREAPIGAWPWMTAVYIKQGGIRSVQCGGALVTNRHVITASHCVVNSAGTDVMPADVFSVRL
GEHNLYSTDDDSNPIDFAVTSVKHHEHFVLATYLNDIAILTLNDTVTFTDRIRPICLPYRKLRY
DDLAMRKPFITGWGTTAFNGPSSAVLREVQLPIWEHEACRQAYEKDLNITNVYMCAGFADGGKD
ACQGDSGGPMMLPVKTGEFYLIGIVSFGKKCALPGFPGVYTKVTEFLDWIAEHMV
```

SEQUENCE LISTING

```
Sequence total quantity: 14
SEQ ID NO: 1             moltype = AA   length = 995
FEATURE                  Location/Qualifiers
source                   1..995
                         mol_type = protein
                         organism = Limulus polyphemus
SEQUENCE: 1
RGVDLGLCDD TRFECKCGDP GYVFNVPAKQ CTYFYRWRPY CKPCDKLEAK DVCPKYKRCQ    60
ECRAGLDSCV SCPPNKYGTW CSGECQCKNG GICDQRTGAC TCRDRYEGVH CEILQGCPLL   120
QSDPQVQEVK NPPNDPQTID YSCSPGFKLK GVARITCLPN GQWSSFPPKC IRECSMVSSL   180
EHGKVNSPSA DLIEGATLRF SCDSPYYLIG QETLTCQGNG QWSGQIPQCQ KLVFCPDLDP   240
VSHAEHQVKI GLEQKYGQFP QGTEVTYTCT GNYFLMGLDT LKCNPDGSWS GTQPSCVKVA   300
DREVNCDSKA VDFLDDVGEP VRIHCPAGCS LTAGTVWGTA IYHELSSVCR AAIHAGKVPN   360
SGGAVHVVNN GPYSDFLASD LNGIKSDELK SLAQSFRFDY VSSSTAGRKS GCPDGWFEIE   420
ENCVYVTSKQ RAWERAQGVC TNMAARLAVL DKDVIPSSLT ETLRGKGLAT TWIGLHRLDA   480
DNHFIWELMD RSSVALNDSL TFWAPGEPGN ETNCVYLDIQ DQLQPVWKTK SCFQPSSFVC   540
MMDLSDKNKA KCKDPGPLEN GHAKLHGQSI DGFYAGSSVR YSCEVLHYLS GTETVSCTSN   600
GTWSAPKPRC IKVITCQTPP VPSYGSVDIK PPSRTNSISR VGSPFLRLPR LPLPLARAAG   660
PPPKPRSAPP STVDLSSKVK LPEGHYRVGS QAIYTCESRY YELLGSQGRR CDSNGKWSGR   720
PASCIPVCGR SDSPRSPFIV NGNSTEIGQW PWQAGISRWL ADHNMWFLQC GGALLNEKWI   780
ITAAHCVTYS ATAEIIDPSQ FKFYLGKYYR DDSKDDDYVQ VREAIEIHVN PNYDPGNLNF   840
DIALIQLKTS VALTTRVQPI CLPTDLTTRE NLKEGALAVV TGWGLNENNT YSEMIQQAVL   900
PVVAASTCEQ GYQDSGLPLT VTENMFCAGY KQGRYDACSG DSGGPLVFAD DSRTDRRWVL   960
EGIVSWGSPN GCGKSNQYGG FTKVNVFLSW IRQFI                              995

SEQ ID NO: 2             moltype = AA   length = 1020
FEATURE                  Location/Qualifiers
source                   1..1020
                         mol_type = protein
                         organism = Limulus polyphemus
SEQUENCE: 2
MVLASFLVSG LVLGLLAQKM RPVQSRGVDL GLCDDTRFEC KCGDPGYVFN VPAKQCTYFY    60
RWRPYCKPCD KLEAKDVCPK YKRCQECRAG LDSCVSCPPN KYGTWCSGEC QCKNGGICDQ   120
RTGACTCRDR YEGVHCEILQ GCPLLQSDPQ VQEVKNPPND PQTIDYSCSP GFKLKGVARI   180
TCLPNGQWSS FPPKCIRECS MVSSLEHGKV NSPSADLIEG ATLRFSCDSP YYLIGQETLT   240
CQGNGQWSGQ IPQCQKLVFC PDLDPVSHAE HQVKIGLEQK YGQFPQGTEV TYTCTGNYFL   300
MGLDTLKCNP DGSWSGTQPS CVKVADREVN CDSKAVDFLD DVGEPVRIHC PAGCSLTAGT   360
VWGTAIYHEL SSVCRAAIHA GKVPNSGGAV HVVNNGPYSD FLASDLNGIK SDELKSLAQS   420
FRFDYVSSST AGRKSGCPDG WFEIEENCVY VTSKQRAWER AQGVCTNMAA RLAVLDKDVI   480
PSSLTETLRG KGLATTWIGL HRLDADNHFI WELMDRSSVA LNDSLTFWAP GEPGNETNCV   540
YLDIQDQLQP VWKTKSCFQP SSFVCMMDLS DKNKAKCKDP GPLENGHAKL HGQSIDGFYA   600
GSSVRYSCEV LHYLSGTETV SCTSNGTWSA PKPRCIKVIT CQTPPVPSYG SVDIKPPSRT   660
NSISRVGSPF LRLPRLPLPL ARAAGPPPKP RSAPPSTVDL SSKVKLPEGH YRVGSQAIYT   720
CESRYYELLG SQGRRCDSNG KWSGRPASCI PVCGRSDSPR SPFIVNGNST EIGQWPWQAG   780
ISRWLADHNM WFLQCGGALL NEKWIITAAH CVTYSATAEI IDPSQFKFYL GKYYRDDSKD   840
DDYVQVREAI EIHVNPNYDP GNLNFDIALI QLKTSVALTT RVQPICLPTD LTTRENLKEG   900
ALAVVTGWGL NENNTYSEMI QQAVLPVVAA STCEQGYQDS GLPLTVTENM FCAGYKQGRY   960
DACSGDSGGP LVFADDSRTD RRWVLEGIVS WGSPNGCGKS NQYGGFTKVN VFLSWIRQFI  1020

SEQ ID NO: 3             moltype = AA   length = 375
FEATURE                  Location/Qualifiers
```

-continued

```
source                          1..375
                                mol_type = protein
                                organism = Limulus polyphemus
SEQUENCE: 3
IIFPKTQNDN KQCTAKGGLK GSCKSLTDCP AVLATLKDSF PVVCSWNGRF QPIVCCPDAA    60
APSVTTTVTT IVPTKETKIP RLHIPGCGKR KVNVDITTIG RSGSPILPPI STSQDLKGGR   120
GIIAGGVEAK IGAWPWMAAV FVKNFGIGRF HCAGSIISSK YILSAAHAFL IGGRKLTPTR   180
LAVRVGGHYV KMGQEYHVED VIIHPDYVER ENYNDIAIIV LKEELNFTDL VRPICLPDPE   240
AVTDSLKGRR VTVAGWGDLD FAGPRSQVLR EVSIPVVPIG DCNKAYQKLN TLALKNGITK   300
KFICAGLEEG GKDACQGDSG GPLMLVNNSS WIVTGVVSFG HKCAEEGFPG VYTRVVSYLE   360
WIAKVTNSLD QTVTN                                                   375

SEQ ID NO: 4                    moltype = AA  length = 400
FEATURE                         Location/Qualifiers
source                          1..400
                                mol_type = protein
                                organism = Limulus polyphemus
SEQUENCE: 4
MAWICVITLF ALASSTLSNK VSRVGIIFPK TQNDNKQCTA KGGLKGSCKS LTDCPAVLAT    60
LKDSFPVVCS WNGRFQPIVC CPDAAAPSVT TTVTTIVPTK ETKIPRLHIP GCGKRKVNVD   120
ITTIGRSGSP ILPPISTSQD LKGGRGIIAG GVEAKIGAWP WMAAVFVKNF GIGRFHCAGS   180
IISSKYILSA AHAFLIGGRK LTPTRLAVRV GGHYVKMGQE YHVEDVIIHP DYVERENYND   240
IAIIVLKEEL NFTDLVRPIC LPDPEAVTDS LKGRRVTVAG WGDLDFAGPR SQVLREVSIP   300
VVPIGDCNKA YQKLNTLALK NGITKKFICA GLEEGGKDAC QGDSGGPLML VNNSSWIVTG   360
VVSFGHKCAE EGFPGVYTRV VSYLEWIAKV TNSLDQTVTN                        400

SEQ ID NO: 5                    moltype = AA  length = 354
FEATURE                         Location/Qualifiers
source                          1..354
                                mol_type = protein
                                organism = Limulus polyphemus
SEQUENCE: 5
SSLGRQRRQF VFPDDEESCS NRFTNDGICK DVLNCRDLLQ KNDYNLLKES ICGFEGITPK    60
VCCPKQSIVN PITEAPPKTT TTERPPIRIP SNLPKQCGNR TITTRIIGG QEATPGAWPW   120
MAAVYIKQGG IRSVQCGGAL VTNRHVITAS HCVVNSLGTD VMRADVFSVR LGEHNLYSTN   180
DSSDPIDFAV TSVKHHENFV LATYLNDIAI LKLNDTVTFT HKIKPICLPY ESLRYEDLAM   240
RNPFVAGWGT TAFNGPSSAV LREVQLPIWG HEPCRQAYEK DLNITNVYMC AGYADGGKDA   300
CQGDSGGPMM LPDKSGNFYL VGIVSFGKKC ALPGFPGVYT KVTEFLDWIA VNMV         354

SEQ ID NO: 6                    moltype = AA  length = 382
FEATURE                         Location/Qualifiers
source                          1..382
                                mol_type = protein
                                organism = Limulus polyphemus
SEQUENCE: 6
MGILPSPGMP ALLSLVSLLS VLLMGCVASS LGRQRRQFVF PDDEESCSNR FTNDGICKDV    60
LNCRDLLQKN DYNLLKESIC GFEGITPKVC CPKQSIVNPI TEAPPKTTTT ERPPIRIPSN   120
LPKQCGNRNI TTTRIIGGQE ATPGAWPWMA AVYIKQGGIR SVQCGGALVT NRHVITASHC   180
VVNSLGTDVM RADVFSVRLG EHNLYSTNDS SDPIDFAVTS VKHHENFVLA TYLNDIAILK   240
LNDTVTFTHK IKPICLPYES LRYEDLAMRN PFVAGWGTTA FNGPSSAVLR EVQLPIWGHE   300
PCRQAYEKDL NITNVYMCAG YADGGKDACQ GDSGGPMMLP DKSGNFYLVG IVSFGKKCAL   360
PGFPGVYTKV TEFLDWIAVN MV                                           382

SEQ ID NO: 7                    moltype = AA  length = 994
FEATURE                         Location/Qualifiers
source                          1..994
                                mol_type = protein
                                organism = Tachypleus tridentatus
SEQUENCE: 7
RGVDLGLCDE TRFECKCGDP GYVFNVPMKQ CTYFYRWRPY CKPCDDLEAK DICPKYKRCQ    60
ECKAGLDSCV TCPPNKYGTW CSGECQCKNG GICDQRTGAC TCRDRYEGAH CEILKGCPLL   120
PSDSQVQEVR NPPDNPQTID YSCSPGFKLK GVARISCLPN GQWSSFPPKC IRECAKVSSP   180
EHGKVNAPSG NMIEGATLRF SCDSPYYLIG QETLTCQGNG QWSGQIPQCK KLVFCPDLDP   240
VNHAEHQVKI GVEQKYGQFP QGTEVTYTCS GNYFLMGFNT LKCNPDGSWS GSQPSCVKVA   300
DREVDCDSKA VDFLDDVGEP VRIHCPAGCS LTAGTVWGTA IYHELSSVCR AAIHAGKLPN   360
SGGAVHVVNN GPYSDFLGSD LNGIKSEELK SLARSFRFDY VSSSTAGRSG CPDGWFEVEE   420
NCVYVTSKQR AWERAQGVCT NMAARLAVLD KDLIPSSLTE TLRGKGLTTT WIGLHRLDAE   480
KPFVWELMDR SNVVLNDNLT FWASGEPGNE TNCVYLDIRD KLQPVWKTKS CFQPSSFACM   540
MDLSDRNKAK CDDPGPLENG HATLHGQSID GFYAGSSIRY SCEVLHYLSG TETVTCTTNG   600
TWSAPKPRCI KVITCQNPPV PSYGSVEIKP PSRTNSISRV GSPFLRLPRL PLPLARAAKP   660
PPKPRSSQPS TVDLASKVKL PEGHYRVGSR AIYTCESRYY ELLGSQGRRC DSNGNWSGRP   720
ASCIPVCGRS DSPRSPFIWN GNSTEIGQWP WQAGISRWLA DHNMWFLQCG GSLLNEKWIV   780
TAAHCVTYSA TAEIIDPSQF KIYLGKYYRD DSRDDDYYQV REALEIHVNP NYDPGNLNFD   840
IALIQLKTPV TLTTRVQPIC LPTDITTREH LKEGTLAVVT GWGLNENNTY SEMIQQAVLP   900
VVAASTCEEG YKEADLPLTV TENMFCAGYK KGRYDACSGD SGGPLVFADD SRTERRWVLE   960
GIVSWGSPSG CGKANQYGGF TKVNVFLSWI RQFI                              994

SEQ ID NO: 8                    moltype = AA  length = 1015
FEATURE                         Location/Qualifiers
```

```
source                  1..1015
                        mol_type = protein
                        organism = Tachypleus tridentatus
SEQUENCE: 8
MKFLVNVALV FMVVYISYIY ARGVDLGLCD ETRFECKCGD PGYVFNVPMK QCTYFYRWRP    60
YCKPCDDLEA KDICPKYKRC QECKAGLDSC VTCPPNKYGT WCSGECQCKN GGICDQRTGA   120
CTCRDRYEGA HCEILKGCPL LPSDSQVQEV RNPPDNPQTI DYSCSPGFKL KGVARISCLP   180
NGQWSSFPPK CIRECAKVSS PEHGKVNAPS GNMIEGATLR FSCDSPYYLI GQETLTCQGN   240
GQWSGQIPQC KKLVFCPDLD PVNHAEHQVK IGVEQKYGQF PQGTEVTYTC SGNYFLMGFN   300
TLKCNPDGSW SGSQPSCVKV ADREVDCDSK AVDFLDDVGE PVRIHCPAGC SLTAGTVWGT   360
AIYHELSSVC RAAIHAGKLP NSGGAVHVVN NGPYSDFLGS DLNGIKSEEL KSLARSFRFD   420
YVSSSTAGRS GCPDGWFEVE ENCVYVTSKQ RAWERAQGVC TNMAARLAVL DKDLIPSSLT   480
ETLRGKGLTT TWIGLHRLDA EKPFVWELMD RSNVVLNDNL TFWASGEPGN ETNCVYLDIR   540
DQLQPVWKTK SCFQPSSFAC MMDLSDRNKA KCDDPGPLEN GHATLHGQSI DGFYAGSSIR   600
YSCEVLHYLS GTETVTCTTN GTWSAPKPRC IKVITCQNPP VPSYGSVEIK PPSRTNSISR   660
VGSPFLRLPR LPLPLARAAK PPPKPRSSQP STVDLASKVK LPEGHYRVGS RAIYTCESRY   720
YELLGSQGRR CDSNGNWSGR PASCIPVCGR SDSPRSPFIW NGNSTEIGQW PWQAGISRWL   780
ADHNMWFLQC GGSLLNEKWI VTAAHCVTYS ATAEIIDPSQ FKIYLGKYYR DDSRDDDYVQ   840
VREALEIHVN PNYDPGNLNF DIALIQLKTP VTLTTRVQPI CLPTDITTRE HLKEGTLAVV   900
TGWGLNENNT YSEMIQQAVL PVVAASTCEE GYKEADLPLT VTENMFCAGY KKGRYDACSG   960
DSGGPLVFAD DSRTERRWVL EGIVSWGSPS GCGKANQYGG FTKVNVFLSW IRQFI       1015

SEQ ID NO: 9            moltype = AA  length = 377
FEATURE                 Location/Qualifiers
source                  1..377
                        mol_type = protein
                        organism = Tachypleus tridentatus
SEQUENCE: 9
VGVLFPKTRN DNECTARGGL KGSCKSLIDC PSVLATLKDS FPVVCSWNGR FQPIVCCPDA    60
IAPPPVTTTA VTVISTKEPK LPRLHISGCG KRKVKIDITI VGRSGSPILP PISTPQNSTG   120
GRGIIAGGVE AKIGAWPWMA AVFVKNFGIG RFHCAGSIIS NKYILSAAHA FLIGGRKLTP   180
TRLAVRVGGH YIKRGQEYPV KDVIIHPHYV EKENYNDIAI IELKEELNFT DLVNPICLPD   240
PETVTDPLKD RIVTAAGWGD LDFSGPRSQV LREVSIPVVP VDKCDQAYEK LNTPSLKNGI   300
TNNFLCAGLE EGGKDACQGD SGGPLMLVNN TRWIVVGVVS FGHKCAEEGY PGVYSRVASY   360
LDWIAKVTNS LDHAVTN                                                  377

SEQ ID NO: 10           moltype = AA  length = 399
FEATURE                 Location/Qualifiers
source                  1..399
                        mol_type = protein
                        organism = Tachypleus tridentatus
SEQUENCE: 10
MDMRVPAQLL GLLLLWFPGS RCVGVLFPKT RNDNECTARG GLKGSCKSLI DCPSVLATLK    60
DSFPVVCSWN GRFQPIVCCP DAIAPPPVTT TAVTVISTKE PKLPRLHISG CGKRKVKIDI   120
TTVGRSGSPI LPPISTPQNS TGGRGIIAGG VEAKIGAWPW MAAVFVKNFG IGRFHCAGSI   180
ISNKYILSAA HAFLIGGRKL TPTRLAVRVG GHYIKRGQEY PVKDVIIHPH YVEKENYNDI   240
AIIELKEELN FTDLVNPICL PDPETVTDPL KDRIVTAAGW GDLDFSGPRS QVLREVSIPV   300
VPVDKCDQAY EKLNTPSLKN GITNNFLCAG LEEGGKDACQ GDSGGPLMLV NNTRWIVVGV   360
VSFGHKCAEE GYPGVYSRVA SYLDWIAKVT NSLDHAVTN                          399

SEQ ID NO: 11           moltype = AA  length = 354
FEATURE                 Location/Qualifiers
source                  1..354
                        mol_type = protein
                        organism = Tachypleus tridentatus
SEQUENCE: 11
STLSRQRQF VFPDEEELCS NRFTEEGTCK NVLDCRILLQ KNDYNLLKES ICGFEGITPK     60
VCCPKSSHVI SSTQAPPETT TTERPPKQIP PNLPEVCGIH NTTTTRIIGG REAPIGAWPW   120
MTAVYIKQGG IRSVQCGGAL VTNRHVITAS HCVVNSAGTD VMPADVFSVR LGEHNLYSTD   180
DDSNPIDFAV TSVKHHEHFV LATYLNDIAI LTLNDTVTFT DRIRPICLPY RKLRYDDLAM   240
RKPFITGWGT TAFNGPSSAV LREVQLPIWE HEACRQAYEK DLNITNVYMC AGFADGGKDA   300
CQGDSGGPMM LPVKTGEFYL IGIVSFGKKC ALPGFPGVYT KVTEFLDWIA EHMV         354

SEQ ID NO: 12           moltype = AA  length = 375
FEATURE                 Location/Qualifiers
source                  1..375
                        mol_type = protein
                        organism = Tachypleus tridentatus
SEQUENCE: 12
MLVNNVFSLL CFPLLMSVVR CSTLSRQRRQ FVFPDEEELC SNRFTEEGTC KNVLDCRILL    60
QKNDYNLLKE SICGFEGITP KVCCPKSSHV ISSTQAPPET TTTERPPKQI PPNLPEVCGI   120
HNTTTTRIIG GREAPIGAWP WMTAVYIKQG GIRSVQCGGA LVTNRHVITA SHCVVNSAGT   180
DVMPADVFSV RLGEHNLYST DDDSNPIDFA VTSVKHHEHF VLATYLNDIA ILTLNDTVTF   240
TDRIRPICLP YRKLRYDDLA MRKPFITGWG TTAFNGPSSA VLREVQLPIW EHEACRQAYE   300
KDLNITNVYM CAGFADGGKD ACQGDSGGPM MLPVKTGEFY LIGIVSFGKK CALPGFPGVY   360
TKVTEFLDWI AEHMV                                                    375

SEQ ID NO: 13           moltype = AA  length = 4
FEATURE                 Location/Qualifiers
```

```
source              1..4
                    mol_type = protein
                    organism = synthetic construct
MOD_RES             1
                    note = Acetylated isoleucine
SITE                4
                    note = Arginine para-nitroaniline
SEQUENCE: 13
IEGR                                                            4

SEQ ID NO: 14       moltype = AA  length = 4
FEATURE             Location/Qualifiers
source              1..4
                    mol_type = protein
                    organism = synthetic construct
MOD_RES             1
                    note = Acetylated isoleucine
SITE                4
                    note = Lysine para-nitroaniline
SEQUENCE: 14
IEGK                                                            4
```

What is claimed is:

1. A cartridge for bacterial endotoxin testing comprising:
   (a) a housing defining a fluid inlet port, an optical cell, and a conduit having a fluid contacting surface providing fluid flow communication between the fluid inlet port and the optical cell;
   (b) a first composition dried on a first region of the fluid contacting surface of the conduit; and
   (c) a second composition dried on a second region of the fluid contacting surface of the conduit;
   wherein the first region is spaced apart from the second region, such that, when a liquid sample is applied to the fluid inlet port, the sample traverses the first region and solubilizes the first composition, and then traverses the second region and solubilizes the second composition during transport to the optical cell; and
   wherein, the first and second compositions are selected from the group consisting of recombinant Factor B and recombinant Factor C, provided that the first composition is not the same as the second composition.

2. The cartridge of claim 1, wherein the Factor C, the Factor B, or the Factor B and Factor C remain substantially inactive until contacted with microbial endotoxin in a liquid sample introduced into the cartridge via the fluid inlet port.

3. The cartridge of claim 1, wherein the first or second composition further includes recombinant pro-clotting enzyme.

4. The cartridge of claim 3, wherein (i) the recombinant pro-clotting enzyme is a recombinant *Limulus polyphemus* pro-clotting enzyme; (ii) the recombinant pro-clotting enzyme comprises the amino acid sequence of SEQ ID NO:5; or (iii) the recombinant pro-clotting enzyme is a combination of elements (i) and (ii).

5. The cartridge of claim 1, further comprising a third composition comprising recombinant pro-clotting enzyme dried on a third region of the fluid contacting surface of the conduit spaced apart from the first and second regions, wherein the third region is in fluid communication with the first region, the second region, or the first and second regions.

6. The cartridge of claim 5, further comprising a fourth composition comprising a chromogenic substrate dried on a fourth region of the fluid contacting surface of the conduit spaced apart from the first, second, and third regions, and wherein the fourth region is in fluid flow communication with one or more of the first region, the second region, or the third region.

7. The cartridge of claim 6, wherein the chromogenic substrate is selected from Ac-Ile-Glu-Gly-Arg-pNA (SEQ ID NO:13), wherein Ac is an acetyl group and pNA is a para-nitroaniline group, or Ac-Ile-Glu-Gly-Lys-pNA (SEQ ID NO:14), wherein Ac is an acetyl group and pNA is a para-nitroaniline group.

8. The cartridge of claim 1, further comprising a third composition comprising a chromogenic substrate dried on a third region of the fluid contacting surface of the conduit spaced apart from the first and second regions and wherein the third region is in fluid flow communication with the first region, the second region, or the first and second regions.

9. The cartridge of claim 8, further comprising a fourth composition comprising a recombinant pro-clotting enzyme dried on a fourth region of the fluid contacting surface of the conduit spaced apart from the first, second, and third regions, and wherein the fourth region is in fluid flow communication with one or more of the first region, the second region, or the third region.

10. The cartridge of claim 8, wherein the third region of the fluid contacting surface is positioned between the fluid inlet port and the first region, and the second region of the fluid contacting surface is positioned between the first region and the optical cell.

11. The cartridge of claim 10, wherein the first composition on the first region comprises recombinant Factor B and not recombinant Factor C; and the second composition on the second region comprises recombinant Factor C and not recombinant Factor B, and a recombinant pro-clotting enzyme.

12. The cartridge of claim 11, wherein (i) the recombinant factor B is a recombinant *Limulus polyphemus* factor B, (i) the recombinant factor C is a recombinant *Limulus polyphemus* factor C, and (iii) the recombinant pro-clotting enzyme is a recombinant *Limulus polyphemus* pro-clotting enzyme; or the cartridge comprises one or more of elements (i), (ii), and (iii).

13. The cartridge of claim 11, wherein (i) the recombinant factor B comprises the amino acid sequence of SEQ ID NO:3, (ii) the recombinant factor C comprises the amino acid sequence of SEQ ID NO:1, and (iii) the recombinant pro-clotting enzyme comprises the amino acid sequence of SEQ ID NO:5; or the cartridge comprises one or more of elements (i), (ii) and (iii).

14. The cartridge of claim 11, wherein the chromogenic substrate is selected from Ac-Ile-Glu-Gly-Arg-pNA (SEQ ID NO:13), wherein Ac is an acetyl group and pNA is a para-nitroaniline group, or Ac-Ile-Glu-Gly-Lys-pNA (SEQ ID NO:14), wherein Ac is an acetyl group and pNA is a para-nitroaniline group.

15. The cartridge of claim 8, wherein the chromogenic substrate is selected from Ac-Ile-Glu-Gly-Arg-pNA (SEQ ID NO:13), wherein Ac is an acetyl group and pNA is a para-nitroaniline group, or Ac-Ile-Glu-Gly-Lys-pNA (SEQ ID NO:14), wherein Ac is an acetyl group and pNA is a para-nitroaniline group.

16. The cartridge of claim 1, wherein the first composition on the first region comprises recombinant Factor C and not recombinant Factor B and the second composition on the second region comprises recombinant Factor B and not recombinant Factor C.

17. The cartridge of claim 1, wherein the first composition on the first region comprises recombinant Factor B and not recombinant Factor C and the second composition on the second region comprises recombinant Factor C and not recombinant Factor B.

18. The cartridge of claim 1, wherein the recombinant factor C:
(i) lacks an (α-2,3)-linked terminal sialic acid;
(ii) is expressed in a GnTI⁻HEK cell line;
(iii) is recombinant *Limulus polyphemus* factor C;
(iv) comprises the amino acid sequence of SEQ ID NO:1; or
(v) is a combination of any of elements (i)-(iv).

19. The cartridge of claim 1, wherein:
(i) the recombinant factor B is recombinant *Limulus polyphemus* factor B;
(ii) the recombinant factor B comprises the amino acid sequence of SEQ ID NO:3; or
(iii) the recombinant factor B comprises a combination of elements (i) and (ii).

20. A cartridge for bacterial endotoxin testing comprising:
(a) a housing defining a fluid inlet port, an optical cell, and a conduit having a fluid contacting surface providing fluid flow communication between the fluid inlet port and the optical cell;
(b) (i) a first composition dried on a first region of the fluid contacting surface of the conduit, the first composition comprising recombinant Factor B, but not recombinant Factor C; and a second composition dried on a second region of the fluid contacting surface of the conduit, the second composition comprising recombinant Factor C and recombinant pro-clotting enzyme, but not recombinant Factor B; or
(ii) a first composition dried on a first region of the fluid contacting surface of the conduit, the first composition comprising recombinant Factor C, but not recombinant Factor B; and a second composition dried on a second region of the fluid contacting surface of the conduit, the second composition comprising recombinant Factor B and recombinant pro-clotting enzyme, but not recombinant Factor C; and
(c) a third composition dried on a third region of the fluid contacting surface of the conduit, the third composition comprising a chromogenic substrate;
wherein the first region is spaced apart from the second region, such that, when a liquid sample is applied to the fluid inlet port, the sample traverses the first region and solubilizes the first composition, and then traverses the second region and solubilizes the second composition during transport to the optical cell;
wherein the third region of the fluid contacting surface is positioned between the fluid inlet port and first region, and the second region is positioned on the cartridge or fluid contacting surface between the first region and the optical cell;
wherein the recombinant factor B is a recombinant *Limulus polyphemus* factor B, the recombinant factor C is a recombinant *Limulus polyphemus* factor C, and the recombinant pro-clotting enzyme is a recombinant *Limulus polyphemus* pro-clotting enzyme.

21. The cartridge of claim 20, wherein the first composition dried on the first region of the fluid contacting surface of the conduit comprises recombinant Factor B, but not recombinant Factor C, and the second composition dried on the second region of the fluid contacting surface of the conduit comprises recombinant Factor C and recombinant pro-clotting enzyme, but not recombinant Factor B.

22. The cartridge of claim 21, wherein the chromogenic substrate is selected from Ac-Ile-Glu-Gly-Arg-pNA (SEQ ID NO:13), wherein Ac is an acetyl group and pNA is a para-nitroaniline group; or Ac-Ile-Glu-Gly-Lys-pNA (SEQ ID NO:14), wherein Ac is an acetyl group and pNA is a para-nitroaniline group.

23. The cartridge of claim 20, wherein the first composition dried on the first region of the fluid contacting surface of the conduit comprises recombinant Factor C, but not recombinant Factor B, and the second composition dried on the second region of the fluid contacting surface of the conduit comprises recombinant Factor B and recombinant pro-clotting enzyme, but not recombinant Factor C.

24. The cartridge of claim 23, wherein the chromogenic substrate is selected from Ac-Ile-Glu-Gly-Arg-pNA (SEQ ID NO:13), wherein Ac is an acetyl group and pNA is a para-nitroaniline group; or Ac-Ile-Glu-Gly-Lys-pNA (SEQ ID NO:14), wherein Ac is an acetyl group and pNA is a para-nitroaniline group.

* * * * *